(12) United States Patent
Stern-Berkowitz et al.

(10) Patent No.: US 12,407,554 B2
(45) Date of Patent: Sep. 2, 2025

(54) UPLINK SOUNDING REFERENCE SIGNALS CONFIGURATION AND TRANSMISSION

(71) Applicant: InterDigital Patent Holdings, Inc., Wilmington, DE (US)

(72) Inventors: Janet A. Stern-Berkowitz, Little Neck, NY (US); Chang-Soo Koo, Melville, NY (US); Peter S. Wang, E. Setauket, NY (US); Sung-Hyuk Shin, Northvale, NY (US); John W. Haim, Baldwin, NY (US); Stephen G. Dick, Nesconset, NY (US); Mihaela C. Beluri, New York, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/427,060

(22) Filed: Jan. 30, 2024

(65) Prior Publication Data

US 2024/0323069 A1    Sep. 26, 2024

Related U.S. Application Data

(63) Continuation of application No. 17/887,846, filed on Aug. 15, 2022, now Pat. No. 11,929,860, which is a
(Continued)

(51) Int. Cl.
*H04W 4/00* (2018.01)
*H04L 5/00* (2006.01)
(Continued)

(52) U.S. Cl.
CPC ........ *H04L 27/2613* (2013.01); *H04L 5/0048* (2013.01); *H04W 52/325* (2013.01)

(58) Field of Classification Search
None
See application file for complete search history.

(56) References Cited

U.S. PATENT DOCUMENTS

| 7,352,824 B2 | 4/2008 | Vrazel et al. |
| 7,986,959 B2 | 7/2011 | Malladi et al. |
| (Continued) | | |

FOREIGN PATENT DOCUMENTS

| CA | 2 727 699 | 12/2009 |
| CN | 101540631 | 9/2009 |
| (Continued) | | |

OTHER PUBLICATIONS

Alcatel Lucent Shanghai Bell et al., "PUSCH Power Control for Carrier Aggregation," 3GPP TSG RAN WG1 Meeting #58bis, R1-093770, Miyazaki, Japan (Oct. 12-16, 2009).
(Continued)

*Primary Examiner* — Zewdu A Beyen
(74) *Attorney, Agent, or Firm* — Volpe Koenig

(57) ABSTRACT

A wireless transmit/receiver unit (WTRU) is configured to receive sounding reference signal (SRS) configuration information. The SRS configuration information indicates a plurality of SRS configurations and indicates antenna transmission information. The WTRU is configured to receive SRS trigger information. The SRS trigger information comprises an indication to trigger transmission of one of the plurality of SRS configurations. The WTRU is configured to transmit a plurality of SRS associated with the indication in the SRS trigger information and based on the SRS configuration information. At least a first SRS of the plurality of SRS is transmitted over a first antenna port in a first symbol and at least a second SRS of the plurality of SRS is transmitted over a second antenna port in a second symbol.

18 Claims, 9 Drawing Sheets

Related U.S. Application Data continuation of application No. 16/792,579, filed on Feb. 17, 2020, now Pat. No. 11,419,063, which is a continuation of application No. 15/684,407, filed on Aug. 23, 2017, now Pat. No. 10,568,048, which is a continuation of application No. 13/078,531, filed on Apr. 1, 2011, now Pat. No. 9,749,968.

(60) Provisional application No. 61/388,992, filed on Oct. 1, 2010, provisional application No. 61/330,158, filed on Apr. 30, 2010, provisional application No. 61/320,576, filed on Apr. 2, 2010.

(51) Int. Cl.
*H04L 27/26* (2006.01)
*H04W 52/32* (2009.01)

(56) References Cited

U.S. PATENT DOCUMENTS

| | | |
|---|---|---|
| 8,077,594 B2 | 12/2011 | Iwai et al. |
| 8,107,987 B2 | 1/2012 | Malladi et al. |
| 8,180,009 B2 | 5/2012 | McCoy |
| 8,203,987 B2 | 6/2012 | Ishii et al. |
| 8,208,435 B2 | 6/2012 | Higuchi et al. |
| 8,391,190 B2 | 3/2013 | Pan et al. |
| 8,437,792 B2 | 5/2013 | Malladi et al. |
| 8,447,344 B2 | 5/2013 | Ratasuk et al. |
| 8,676,223 B2 | 3/2014 | Montojo et al. |
| 2008/0045259 A1 | 2/2008 | Shen et al. |
| 2008/0045260 A1 | 2/2008 | Muharemovic et al. |
| 2008/0268857 A1 | 10/2008 | McCoy et al. |
| 2009/0042615 A1 | 2/2009 | Teo et al. |
| 2009/0088195 A1* | 4/2009 | Rosa ............... H04W 72/21 455/507 |
| 2009/0181687 A1 | 7/2009 | Tiirola et al. |
| 2009/0196372 A1 | 8/2009 | Zhang et al. |
| 2009/0232118 A1 | 9/2009 | Wang et al. |
| 2009/0238165 A1 | 9/2009 | Cai et al. |
| 2009/0323664 A1 | 12/2009 | Li et al. |
| 2010/0080155 A1 | 4/2010 | Suzuki et al. |
| 2010/0080187 A1 | 4/2010 | Papasakellariou et al. |
| 2010/0246463 A1 | 9/2010 | Papasakellariou et al. |
| 2010/0285762 A1 | 11/2010 | Ko et al. |
| 2011/0058505 A1 | 3/2011 | Pan et al. |
| 2011/0096815 A1 | 4/2011 | Shin et al. |
| 2011/0199944 A1 | 8/2011 | Chen et al. |
| 2011/0200135 A1 | 8/2011 | Sorrentino et al. |
| 2011/0275335 A1 | 11/2011 | Luo et al. |
| 2011/0280169 A1 | 11/2011 | Seo et al. |
| 2012/0252474 A1 | 10/2012 | Tiirola et al. |
| 2013/0034066 A1 | 2/2013 | Kakishima et al. |

FOREIGN PATENT DOCUMENTS

| | | | |
|---|---|---|---|
| EP | 2 169 974 | 3/2010 | |
| WO | 2008/132073 | 11/2008 | |
| WO | 2008/156293 | 12/2008 | |
| WO | 2010/091425 | 8/2010 | |
| WO | 2010/107880 | 9/2010 | |
| WO | WO-2011050856 A1 * | 5/2011 | ............ H04L 5/0048 |

OTHER PUBLICATIONS

Alcatel-Lucent et al., "PUSCH and PUCCH Power Scaling for Carrier Aggregation," 3GPP TSG RAN WG1 #59bis, R1-100414 (Jan. 2010).
ASUSTeK, "Discussion on Dynamic Aperiodic Sounding," R1-102357, 3GPP TSG RAN WG1 Meeting #60bis, Beijing, China, Apr. 12-16, 2010.
CATT et al., "Sounding reference signals in UpPTS for TDD," 3GPP TSG RAN WG1 meeting #52bis, R1-081327, Shenzhen, China (Mar. 31-Apr. 4, 2008).
CATT, "SRS Transmission in LTE-A," R1-101773, 3GPP TSG RAN WG1 Meeting #60bis, Beijing, China, Apr. 12-16, 2010.
Ericsson et al., "Proposal on implicit derivation of comb per antenna port for SRS," 3GPP TSG RAN WG1 #63bis, R1-110587 (Jan. 2011).
Ericsson et al., "Uplink Power Control for Carrier Aggregation," 3GPP TSG RAN WG1 Meeting #59bis, R1-100045, Valencia, Spain (Jan. 18-22, 2009).
Ericsson, St-Ericsson, "Further Details on SRS for Release 10," R1-101746, 3GPP TSG RAN WG1 Meeting #60bis, Beijing, China, Apr. 12-16, 2010.
Fujitsu, "On SRS Enhancements for LTE-Advanced," R1-102360, 3GPP TSG RAN WG1 Meeting #60bis, Beijing, China, Apr. 12-16, 2010.
LG Electronics, "UL SRS Enhancement for LTE-Advanced," R1-102389, 3GPP TSG RAN WG1 Meeting #60bis, Beijing, China, Apr. 12-16, 2010.
MCC Support, "Final Report of 3GPP TSG RAN WG1 #58 v1.0.0 (Shenzhen, China, Aug. 24-28, 2009)," R1-093746, 3GPP TSG RAN WG1 Meeting #58bis, Miyazaki, Japan, Oct. 12-16, 2009.
Mediatek Inc., "Further Discussion on Aperiodic Sounding," R1-101985, 3GPP TSG RAN WG1 Meeting #60bis, Beijing, China, Apr. 12-16, 2010.
Mitsubishi Electric, "SRS Assignment for UL MIMO," 3GPP TSG RAN WG1 #61 meeting, R1-103241 (May 10-14, 2010).
Motorola, "Aperiodic SRS for LTE-A," R1-102114, 3GPP TSG RAN WG1 Meeting #60bis, Beijing, China, Apr. 12-16, 2010.
Motorola, "Views on SRS Enhancements for LTE-A," 3GPP TSG-RAN WG1 Meeting #60, R1-101134, San Francisco, USA (Feb. 22-26, 2010).
Motorola, "Views on SRS Enhancements for LTE-A," R1-102142, 3GPP TSG RAN WG1 Meeting #60bis, Beijing, China, Apr. 12-16, 2010.
Nokia Siemens Networks et al., "PUSCH Power Control for LTE-Advanced," 3GPP TSG RAN WG1 #57bis Meeting, R1-092574, Los Angeles, CA, USA (Jun. 29-Jul. 3, 2009).
Nokia Siemens Networks, Nokia, "Channel Sounding Enhancements for LTE-Advanced Uplink," R1-101438, 3GPP TSG RAN WG1 Meeting #60, San Francisco, US, Feb. 22-26, 2010.
Nokia Siemens, Nokia, "Channel Sounding Enhancements for LTE-Advanced Uplink," R1-101911, 3GPP TSG RAN WG1 Meeting #60bis, Beijing, China, Apr. 12-16, 2010.
NTT DOCOMO, "Views on SRS Enhancement for LTE-Advanced," 3GPP TSG RAN WG1 Meeting #60, R1-101224, San Francisco, USA (Feb. 22-26, 2010).
NTT DOCOMO, "Views on SRS Enhancement for LTE-Advanced," R1-102305, 3GPP TSG RAN WG1 Meeting #60bis, Beijing, China, Apr. 12-16, 2010.
Panasonic, "SRS Enhancement for LTE-Advanced," R1-102040, 3GPP TSG RAN WG1 Meeting #60bis, Beijing, China, Apr. 12-16, 2010.
Pantech, "Further Consideration on Aperiodic SRS Solutions," R1-102542, 3GPP TSG RAN WG1 Meeting #60bis, Beijing, China, Apr. 12-16, 2010.
Potevio, "Proposal for an Enhanced SRS Scheme for Comp," 3GPP TSG-RAN WG1 #59bis, R1-100616, Valencia, Spain (Jan. 18-22, 2010).
Qualcomm Incorporated, "SRS Enhancements for LTE-A," R1-102341, 3GPP TSG RAN WG1 Meeting #60bis, Beijing, China, Apr. 12-16, 2010.
Research in Motion, UK Limited, "Design and Configuration Considerations on Aperiodic SRS for LTE-A," R1-102054, 3GPP TSG RAN WG1 Meeting #60bis, Beijing, China, Apr. 12-16, 2010.
Samsung, "Resource Allocation for Dynamic SRS Activation and SRS Multiplexing," R1-102215, 3GPP TSG RAN WG1 Meeting #60bis, Beijing, China, Apr. 12-16, 2010.
Samsung, "SRS Transmission in LTE-A," R1-094576, 3GPP TSG RAN WG1 #59, Jeju, Korea, Nov. 9-13, 2009.
Samsung, "SRS Transmission Issues for LTE-A," R1-090617, 3GPP TSG RAN WG1 #56, Athens, Greece, Feb. 9-13, 2009.
Samsung, "UL Transmission Power Control in LTE-A," 3GPP TSG RAN WG1 #58bis, R1-094086, Miyazaki, Japan (Oct. 12-16, 2009).

(56) References Cited

OTHER PUBLICATIONS

Sharp, "Design Criteria of Dynamic Aperiodic SRS," R1-102400, 3GPP TSG RAN WG1 Meeting #60bis, Beijing, China, Apr. 12-16, 2010.
Texas Instruments, "Design Considerations for Aperiodic SRS," R1-102110, 3GPP TSG RAN WG1 Meeting #60bis, Beijing, China, Apr. 12-16, 2010.
Texas Instruments, "UE Specific SRS Configuration," 3GPP TSG RAN WG1 #53, R1-081992, Kansas City, MO, USA (May 5-May 9, 2008).
Third Generation Partnership Project, "Technical Specification Group Radio Access Network; Evolved Universal Terrestrial Radio Access (E-UTRA); Multiplexing and Channel Coding (Release 8)," 3GPP TS 36.212 v8.8.0, Dec. 2009.
Third Generation Partnership Project, "Technical Specification Group Radio Access Network; Evolved Universal Terrestrial Radio Access (E-UTRA); Multiplexing and Channel Coding (Release 9)," 3GPP TS 36.212 v9.1.0, Mar. 2010.
Third Generation Partnership Project, "Technical Specification Group Radio Access Network; Evolved Universal Terrestrial Radio Access (E-UTRA); Multiplexing and Channel Coding (Release 9)," 3GPP TS 36.212 v9.3.0, Sep. 2010.
Third Generation Partnership Project, "Technical Specification Group Radio Access Network; Evolved Universal Terrestrial Radio Access (E-UTRA); Multiplexing and Channel Coding (Release 10)," 3GPP TS 36.212 v10.1.0, Mar. 2011.
Third Generation Partnership Project, "Technical Specification Group Radio Access Network; Evolved Universal Terrestrial Radio Access (E-UTRA); Physical Channels and Modulation (Release 8)," 3GPP TS 36.211 v8.9.0, Dec. 2009.
Third Generation Partnership Project, "Technical Specification Group Radio Access Network; Evolved Universal Terrestrial Radio Access (E-UTRA); Physical Channels and Modulation (Release 9)," 3GPP TS 36.211 v9.1.0, Mar. 2010.
Third Generation Partnership Project, "Technical Specification Group Radio Access Network; Evolved Universal Terrestrial Radio Access (E-UTRA); Physical Channels and Modulation (Release 10)," 3GPP TS 36.211 v10.1.0, Mar. 2011.
Third Generation Partnership Project, "Technical Specification Group Radio Access Network; Evolved Universal Terrestrial Radio Access (E-UTRA); Physical Layer Procedures (Release 8)," 3GPP TS 36.213 v8.8.0, Sep. 2009.
Third Generation Partnership Project, "Technical Specification Group Radio Access Network; Evolved Universal Terrestrial Radio Access (E-UTRA); Physical Layer Procedures (Release 9)," 3GPP TS 36.213 v9.1.0, Mar. 2010.
Third Generation Partnership Project, "Technical Specification Group Radio Access Network; Evolved Universal Terrestrial Radio Access (E-UTRA); Physical Layer Procedures (Release 9)," 3GPP TS 36.213 v9.3.0, Sep. 2010.
Third Generation Partnership Project, "Technical Specification Group Radio Access Network; Evolved Universal Terrestrial Radio Access (E-UTRA); Physical Layer Procedures (Release 10)," 3GPP TS 36.213 v10.1.0, Mar. 2011.
Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 v8.8.0, Dec. 2009.
Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 v8.13.0, Mar. 2011.
Third Generation Partnership Project, "Technical Specification Group Radio Access Network; Evolved Universal Terrestrial Radio Access (E-UTRA) Radio Resource Control (RRC); Protocol Specification (Release 9)," 3GPP TS 36.331 v9.1.0, Dec. 2009.
Third Generation Partnership Project, "Technical Specification Group Radio Access Network; Evolved Universal Terrestrial Radio Access (E-UTRA) Radio Resource Control (RRC); Protocol Specification (Release 9)," 3GPP TS 36.331 v9.6.0, Mar. 2011.
Third Generation Partnership Project, "Technical Specification Group Radio Access Network; Evolved Universal Terrestrial Radio Access (E-UTRA) Radio Resource Control (RRC); Protocol Specification (Release 10)," 3GPP TS 36.331 v10.1.0, Mar. 2011.
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.9.0 (Mar. 2010).
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.12.0 (Dec. 2010).
Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.3.0 (Mar. 2010).
Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.6.0 (Dec. 2010).
Third Generation Partnership Project, "Technical Specification Group Radio Access Network; Evolved Universal Terrestrial Radio Access (E-UTRA); User Equipment (UE) radio transmission and reception (Release 10)," 3GPP TS 36.101 V10.1.1 (Jan. 2011).
Third Generation Partnership Project, "Technical Specification Group Radio Access Network; Evolved Universal Terrestrial Radio Access (E-UTRA); Physical layer; Measurements (Release 9)," 3GPP TS 36.214 V9.1.0 (Mar. 2010).
Third Generation Partnership Project, "Technical Specification Group Radio Access Network; Evolved Universal Terrestrial Radio Access (E-UTRA); Physical layer; Measurements (Release 9)," 3GPP TS 36.214 V9.2.0 (Jun. 2010).
Third Generation Partnership Project, "Technical Specification Group Radio Access Network; Evolved Universal Terrestrial Radio Access (E-UTRA); Physical layer; Measurements (Release 10)," 3GPP TS 36.214 V10.1.0 (Mar. 2011).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.3.0 (Mar. 2010).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.6.0 (Dec. 2010).
Third Generation Partnership Project, "Technical Specification Group Radio Access Network; Evolved Universal Terrestrial Radio Access (E-UTRA); Requirements for support of radio resource management (Release 10)," 3GPP TS 36.133 V10.1.0 (Dec. 2010).
Third Generation Partnership Project, "Technical Specification Group Radio Access Network; Evolved Universal Terrestrial Radio Access (E-UTRA) Medium Access Control (MAC) protocol specification (Release 9)," 3GPP TS 36.321 V9.1.0 (Dec. 2009).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.0.0 (Dec. 2010).
ZTE, "Consideration on Dynamic Aperiodic Sounding," R1-101819, 3GPP TSG RAN WG1 Meeting #60bis, Beijing, China, Apr. 12-16, 2010.

* cited by examiner

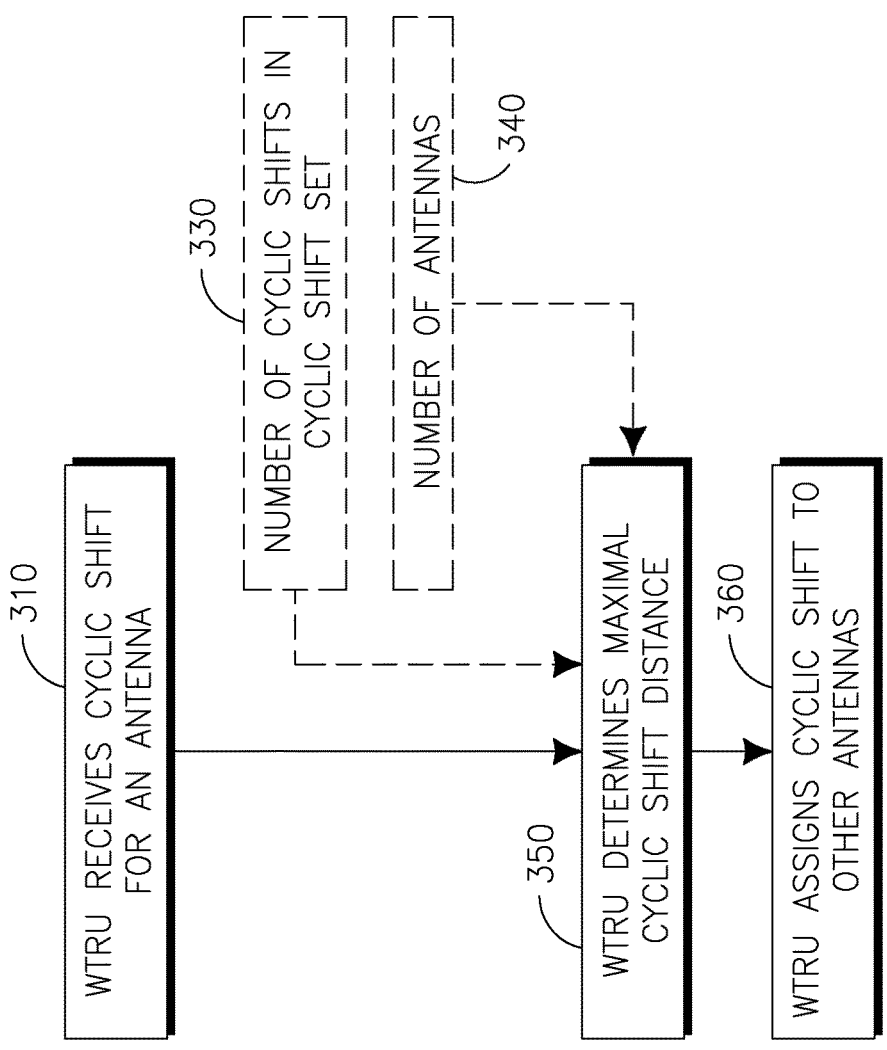

UPLINK SOUNDING REFERENCE SIGNALS CONFIGURATION AND TRANSMISSION

CROSS REFERENCE TO RELATED APPLICATIONS

This application is a continuation of U.S. patent application Ser. No. 17/887,846, filed Aug. 15, 2022, which is a continuation of U.S. patent application Ser. No. 16/792,579, filed Feb. 17, 2020 which issued on Aug. 16, 2022 as U.S. Pat. No. 11,419,063; which is a continuation of U.S. patent application Ser. No. 15/684,407, filed Aug. 23, 2017, which issued as U.S. Pat. No. 10,568,048 on Aug. 23, 2017, which is a continuation of U.S. patent application Ser. No. 13/078,531, filed Apr. 1, 2011, which issued on Aug. 29, 2017 as U.S. Pat. No. 9,749,968, which claims the benefit of U.S. Provisional Application No. 61/320,576 filed Apr. 2, 2010; U.S. Provisional Application No. 61/330,158 filed Apr. 30, 2010; and U.S. Provisional Application No. 61/388,992 filed Oct. 1, 2010, the contents of which are hereby incorporated by reference herein.

FIELD OF THE INVENTION

This application is related to wireless communications.

BACKGROUND

For Long Term Evolution (LTE) Release 8 (R8) and Release 9 (R9), wireless transmit/receive units (WTRUs) transmit sounding reference signals (SRS) periodically based on a schedule and transmission parameters that are provided semi-statically to the WTRU by the evolved Node B (eNB) via a combination of broadcast and radio resource control (RRC) dedicated signaling. Cell-specific SRS configurations define the subframes in which SRS are permitted to be transmitted by WTRUs for a given cell. WTRU-specific SRS configurations define the subframes and the transmission parameters to be used by a specific WTRU. These configurations are provided to the WTRU via RRC signaling. In its WTRU-specific subframes, a WTRU may transmit SRS in the last symbol across the entire frequency band of interest with a single SRS transmission, or across part of the band with hopping in the frequency domain in such a way that a sequence of SRS transmissions jointly covers the frequency band of interest. The cyclic shift and the transmission comb are configurable by higher layer signaling. In LTE R8/9, a maximum of eight different cyclic shifts are possible and two different transmission combs. The transmission comb is a frequency multiplexing scheme; each comb includes every other subcarrier over the band of interest. In contrast to the multiplexing of SRS transmission by means of different cyclic shifts, frequency multiplexing of SRS transmissions does not require the transmissions to cover identical frequency bands.

LTE-Advanced (LTE-A), (referring to at least LTE Release 10 (LTE R10)), may provide aperiodic SRS transmissions to reduce the number of unnecessary SRS transmissions and to alleviate the potential problem of not having enough SRS resources to support the added SRS transmissions needed for WTRUs with multiple antennas. In particular, dynamic aperiodic SRS may be provided but signaling and other aspects have not been identified. For aperiodic SRS transmission, a WTRU may need to know in what subframe(s) to transmit the SRS and with what parameters. In addition to the LTE R8 parameters, such as cyclic shift and transmission comb, the WTRU may also need to know on which component carrier (CC) and with which antenna(s) to transmit. In order for the WTRU to know when to transmit the aperiodic SRS, several triggering mechanisms may be used including uplink (UL) grants, downlink (DL) grants, RRC signaling, medium access control (MAC) control elements and group-based or individual-based physical downlink control channels (PDCCH). With respect to the use of UL or DL grants, activation bit(s) may be used as well as having the grant alone be the trigger but no particulars have been provided. Mechanisms for configuring the SRS transmission resources/parameters may include semi-static configuration via RRC signaling as well as PDCCH based configuration being included with the trigger but again no particulars have been provided.

SUMMARY

Methods and apparatus for uplink sounding reference signals (SRS) configuration and transmission. The methods include receiving configuration of wireless transmit/receive unit (WTRU)-specific SRS subframes for transmitting SRS and upon receipt of a trigger from a base station, transmitting the SRS for a given number of antennas. The SRS transmissions may occur in each subframe of a duration of WTRU-specific SRS subframes that start a number of WTRU-specific SRS subframes after a triggering subframe. For multiple SRS transmissions from multiple antennas, cyclic shift multiplexing and different transmission combs may be used. The cyclic shift for an antenna may be determined from a cyclic shift reference value, where the cyclic shift determined for each antenna provides a maximum distance or even distribution between cyclic shifts for the antennas transmitting SRS in a same WTRU-specific subframe. SRS transmissions from multiple antennas in the WTRU-specific subframe may be done in parallel and the number of antennas may be less than the number of antennas available on the WTRU. Methods for handling collisions between SRS, physical uplink shared channel, and physical uplink control channel are also presented.

BRIEF DESCRIPTION OF THE DRAWINGS

A more detailed understanding may be had from the following description, given by way of example in conjunction with the accompanying drawings wherein:

FIG. 2 is a flowchart of an example sounding reference signals (SRS) configuration and transmission;

FIG. 3 is a flowchart of an example procedure for determining maximal cyclic shift separation;

DETAILED DESCRIPTION

Figure 1A:
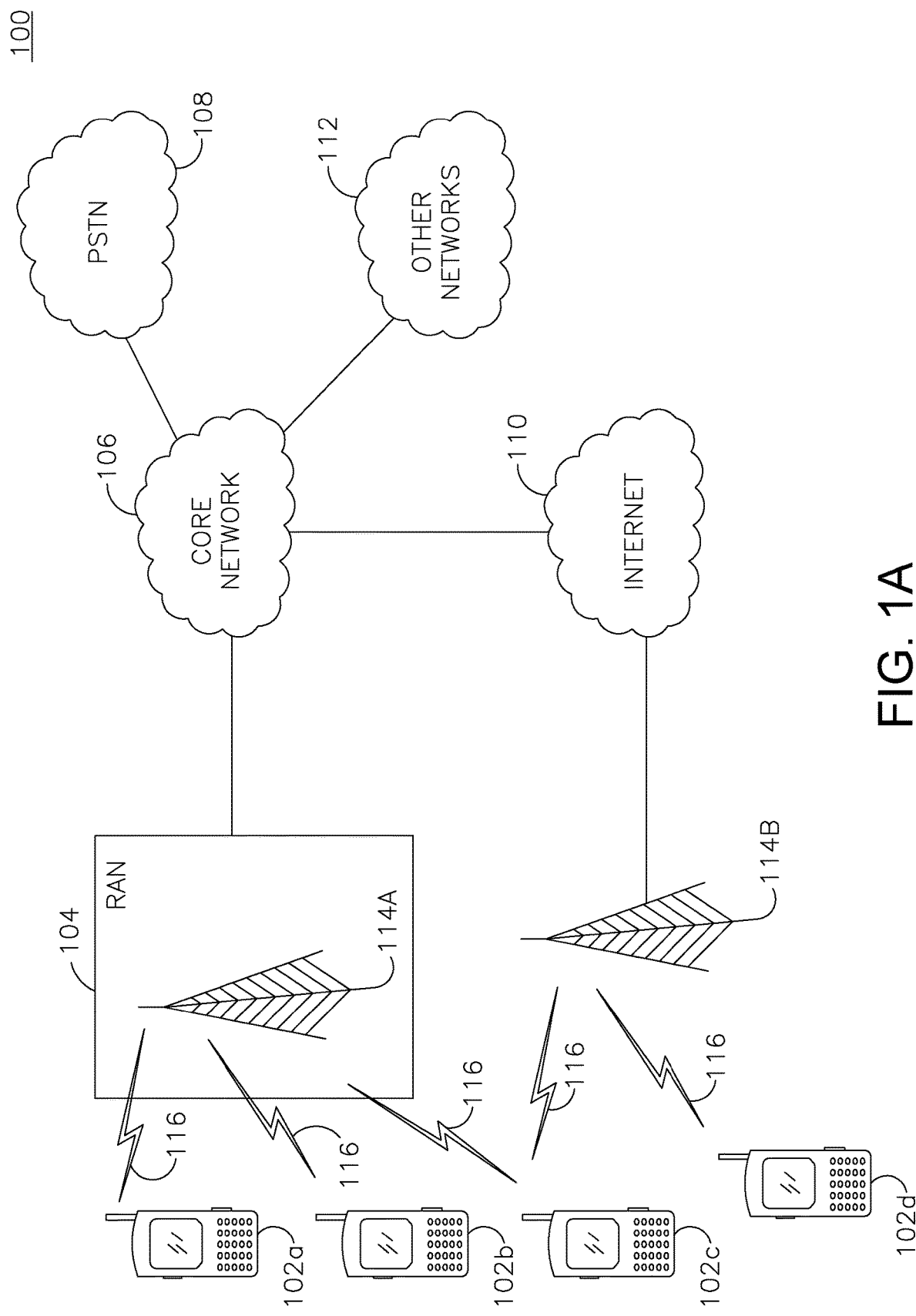
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a relay node, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, a relay node, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
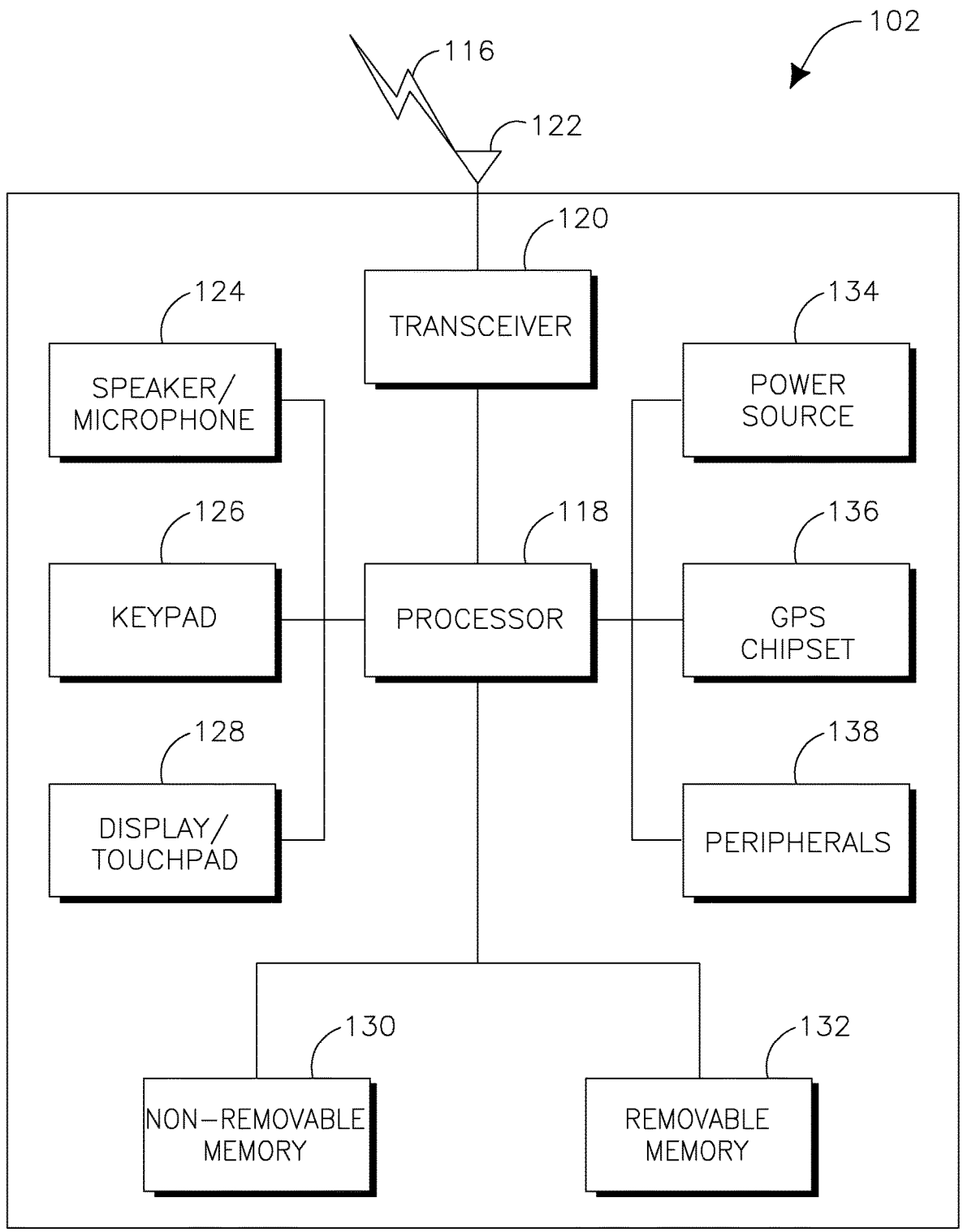
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
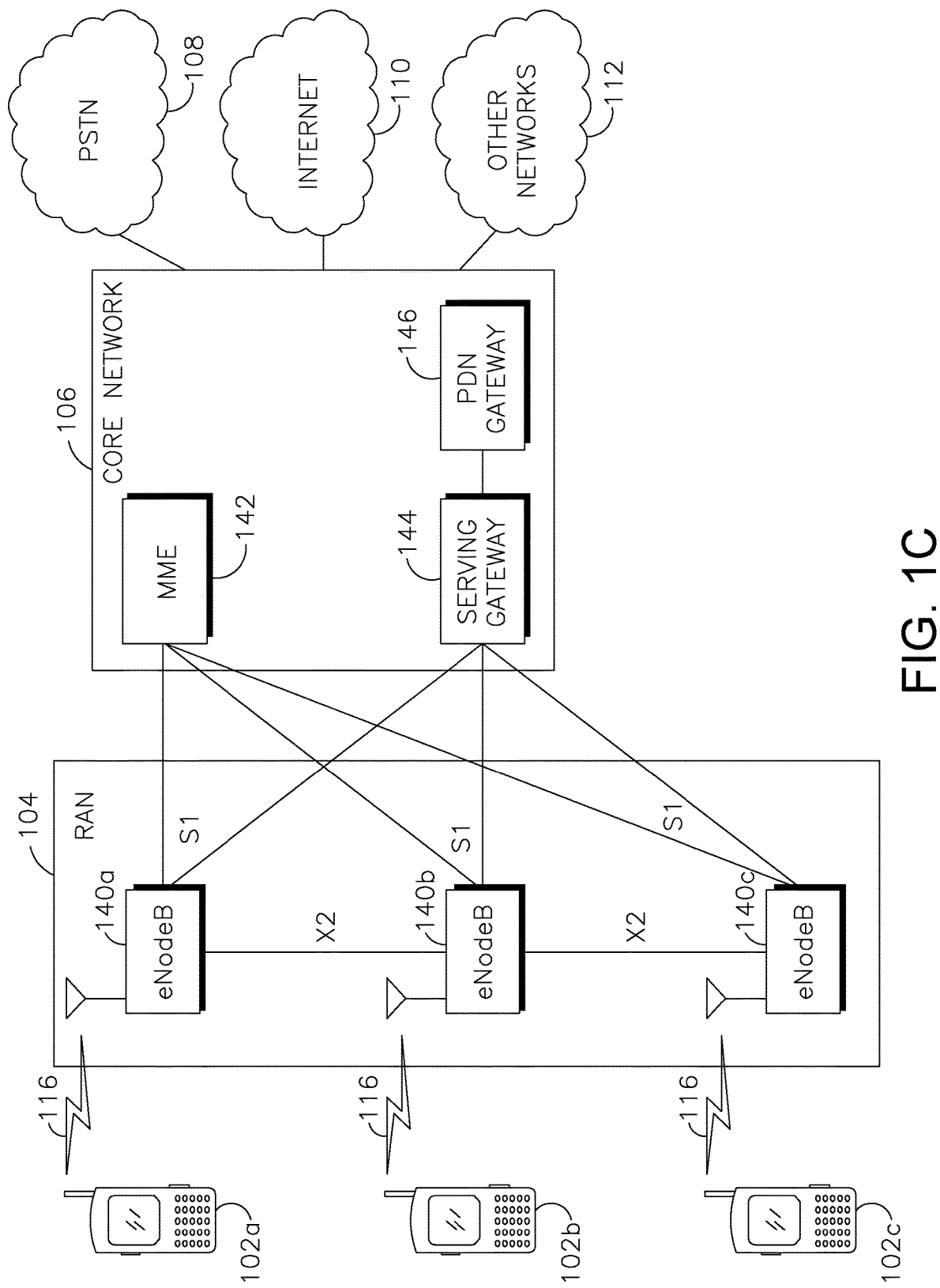
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In LTE Release 8 and Release 9 (LTE R8/9), cell-specific sounding reference signals (SRS) configurations define the subframes in which SRS are permitted to be transmitted by WTRUs for a given cell. WTRU-specific SRS configurations define the subframes and the transmission parameters to be used by a specific WTRU. These configurations are provided to the WTRU via radio resource control (RRC) signaling. The cell-specific subframe configuration is provided to the WTRU in the form of a configuration number with possible integer values of 0, 1, 2, . . . 15. The number, srs-SubframeConfig, is provided by higher layers. Each configuration number corresponds to a configuration period in subframes, $T_{SFC}$, and a set of one or more cell-specific transmission offsets in subframes $\Delta_{SFC}$ for the SRS transmission. The configuration period $T_{SFC}$ is selected from the set $\{1, 2, 5, 10\}$ ms or subframes for frequency division duplex (FDD) and from the set $\{5, 10\}$ ms or subframes for time division duplexing (TDD). The transmission offset $\Delta_{SFC}$ identifies the subframe(s) in each configuration period that may be used in the cell for SRS. The relationship between srs-SubframeConfig, $T_{SFC}$ and $\Delta_{SFC}$ is provided in Table 1 for FDD and Table 2 for TDD. SRS subframes are the subframes satisfying $\lfloor n_s/2 \rfloor$ mod $T_{SFC} \in \Delta_{SFC}$ where $n_s$ is the slot number within the frame. For frame structure type 2, SRS may be transmitted only in configured uplink (UL) subframes or an uplink pilot timeslot (UpPTS).

TABLE 1

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

TABLE 2

| srs-SubframeConfig | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |

TABLE 2-continued

| srs-SubframeConfig | Binary | Configuration Period $T_{SFC}$ (subframes) | Transmission offset $\Delta_{SFC}$ (subframes) |
|---|---|---|---|
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

The following SRS parameters are WTRU-specific semi-statically configurable by higher layers: Transmission comb $k_{TC}$; starting physical resource block assignment $n_{RRC}$; duration: single or indefinite (until disabled); SRS configuration index, srs-ConfigIndex or $I_{SRS}$ which corresponds to an SRS periodicity $T_{SRS}$ and an SRS subframe offset $T_{offset}$; SRS bandwidth $B_{SRS}$; frequency hopping bandwidth, $b_{hop}$; and cyclic shift $n_{SRS}^{cs}$.

The correspondence between the WTRU-specific SRS configuration index and SRS periodicity $T_{SRS}$ and SRS subframe offset $T_{offset}$ is defined in Table 3 and Table 4 below, for FDD and TDD, respectively. The periodicity $T_{SRS}$ of the SRS transmission is selected from the set {2, 5 (5 is FDD only), 10, 20, 40, 80, 160, 320} ms or subframes. For the SRS periodicity $T_{SRS}$ of 2 ms in TDD, two SRS resources may be configured in a half frame containing UL subframe(s).

SRS transmission instances for TDD with $T_{SRS}>2$ and for FDD are the subframes satisfying $(10 \cdot n_f + k_{SRS} - T_{offset})$ mod $T_{SRS}=0$, where $n_f$ is the system frame number; for FDD $k_{SRS}=\{0, 1 \ldots, 9\}$ is the subframe index within the frame, and for TDD $k_{SRS}$ is defined in Table 5 below. The SRS transmission instances for TDD with $T_{SRS}=2$ are the subframes satisfying $(k_{SRS} - T_{offset})$ mod 5=0.

TABLE 3

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-36 | 20 | $I_{SRS}$ − 17 |
| 37-76 | 40 | $I_{SRS}$ − 37 |
| 77-156 | 80 | $I_{SRS}$ − 77 |
| 157-316 | 160 | $I_{SRS}$ − 157 |
| 317-636 | 320 | $I_{SRS}$ − 317 |
| 637-1023 | reserved | reserved |

TABLE 4

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |

TABLE 4-continued

| SRS Configuration Index $I_{SRS}$ | SRS Periodicity $T_{SRS}$ (ms) | SRS Subframe Offset $T_{offset}$ |
|---|---|---|
| 10-14 | 5 | $I_{SRS}$ − 10 |
| 15-24 | 10 | $I_{SRS}$ − 15 |
| 25-44 | 20 | $I_{SRS}$ − 25 |
| 45-84 | 40 | $I_{SRS}$ − 45 |
| 85-164 | 80 | $I_{SRS}$ − 85 |
| 165-324 | 160 | $I_{SRS}$ − 165 |
| 325-644 | 320 | $I_{SRS}$ − 325 |
| 645-1023 | reserved | reserved |

TABLE 5

| | subframe index n | | | | | | | | |
|---|---|---|---|---|---|---|---|---|---|
| | 1 | | | | | 6 | | | |
| | 1st symbol of UpPTS | 2nd symbol of UpPTS | | | | 1st symbol of UpPTS | 2nd symbol of UpPTS | | |
| | 0 | | 2 | 3 | 4 | 5 | | 7 | 8 | 9 |
| $k_{SRS}$ incase UpPTS length of 2 symbols | 0 | 1 | 2 | 3 | 4 | 5 | 6 | 7 | 8 | 9 |
| $k_{SRS}$ incase UpPTS length of 1 symbol | 1 | | 2 | 3 | 4 | | 6 | 7 | 8 | 9 |

The cell-specific subframe configuration may be signaled (to all WTRUs) via broadcast system information. What is actually signaled is srs-SubframeConfig which provides the period $T_{SFC}$ and the transmission offset(s) $\Delta_{SFC}$ within the period. The WTRU-specific subframe configuration is signaled to each individual WTRU via dedicated signaling. What is actually signaled is the SRS Configuration Index $I_{SRS}$ which provides the WTRU-specific period $T_{SRS}$ and the set of one or two (only for TDD with $I_{SRS}=2$) WTRU-specific subframe offsets $T_{offset}$.

In LTE R8, a WTRU may support SRS transmission from only one antenna port in an allowed SRS subframe and may be targeted towards operation in macro-cells where few WTRUs are assumed to be deployed with large signal to interference and noise ratio (SINR) to benefit from wideband SRS transmission. As such, SRS overhead may not be a significant part of the total uplink (UL) overhead. In LTE R8, (for WTRUs with a single UL transmit antenna), no more than $1/12^{th}$ of the UL capacity, (in the extended cyclic prefix (CP) case) may be lost due to SRS transmission overhead. For most configurations, the loss is less than $1/12^{th}$.

However, in LTE-Advanced (LTE-A), (referring to at least LTE Release 10 (LTE R10)), UL multiple input multiple output (MIMO) with up to four antennas, the SRS overhead may increase by a factor of 4. Furthermore, in LTE-A with non-contiguous resource allocation (RA) within one component carrier (CC), carrier aggregation (CA) with multiple CCs, UL coordinated multiple transmit (CoMP), and expanded deployment in hot-spot/indoor environments, the SRS overhead may increase significantly.

SRS capacity may be defined as the maximum number of sounding reference signals that may be transmitted over a predefined sounding bandwidth and channel coherence time.

Following LTE R8/9 rules for assigning sounding reference signals to multiple antennas without considering additional sounding resources, SRS capacity may not be enough to fulfill LTE R10 requirements in any of the narrowband and wideband sounding cases.

Described herein are methods and apparatus for UL SRS configuration and transmission. Methods and procedures are provided so that WTRUs know when to transmit SRSs for each antenna port and with what time/frequency/code resource assignments. In particular, methods to assign resources for UL SRS transmission for WTRUs with multiple UL antenna ports, in time domain (SRS subframes), frequency domain (transmission combs "TC") and code domain (cyclic shifts, CS). The terms "antenna" and "antenna port" may be used interchangeably with respect to SRS transmissions. Some of the methods or solutions described illustrate 2 cell examples, Cell 1 and Cell 2. However, these solutions may be applicable to any number of serving cells. Cell 1 may be any one of the serving cells and Cell 2 may be any other of the serving cells. The methods or solutions may be used individually or in any combination. The applicable solutions, methods, and the like that may be used may depend on whether a scheduled SRS is a periodic SRS or an aperiodic SRS.

Described herein are methods for resource assignment of SRS subframes. In LTE R8/9, a R8/9 WTRU may transmit SRS in the last orthogonal frequency division multiplexing (OFDM) symbol of the second time slot of one SRS subframe per SRS periodicity $T_{SRS}$ for FDD and for one or two SRS subframes per SRS periodicity $T_{SRS}$ for TDD. In an example method for LTE R10, a WTRU with multiple antennas may perform SRS transmission in one or more subframes per SRS periodicity $T_{SRS}$ including subframes that are not WRTU-specific subframes. The WTRU may determine cell specific subframes occurring within a given SRS periodicity, $T_{SRS}$, and may use some of those subframes for transmission of SRS.

In LTE R8, the WTRU may be provided with a WTRU-specific configuration of subframes for SRS transmission to use once or until the configuration is disabled. In another example method for LTE R10, an additional duration, D, may be provided such that given the duration D, the WTRU may transmit SRS in each of the next D WTRU-specific SRS subframes. This may be referred to as multiple transmission SRS or multi-shot SRS and other details are described herein below. For example, multi-shot SRS may be helpful for frequency hopping. For WTRUs with multiple antennas, the WTRU may transmit SRS for a different antenna (or multiple antennas) in each of the D subframes. The maximum number of antennas (or antenna ports) for SRS transmission may be configured by higher layer signaling or may be signaled through Layer 1 (L1) signaling such as a downlink control information (DCI) format in a physical downlink control channel (PDCCH).

An activation time may be included with the configuration. Alternatively, an activation time and/or a trigger may be provided separately such as by higher layers, (RRC signaling or medium access control (MAC) signaling), or by Layer 1 (L1) signaling such as through a DCI format in PDCCH. An activation time may indicate when to begin transmitting SRS. A trigger may indicate a request for SRS transmission which, as a result of the trigger, may occur at a predefined or configured time relative to when the trigger was received. An activation time may specify a specific subframe or system frame number, a subframe within a system frame number, a subframe offset relative to the subframe in which the activation time was received, or a subframe offset relative to when a trigger is received.

As an alternative to modifying the existing WTRU-specific SRS configuration, a new SRS configuration may be defined which includes the duration and, optionally, an activation time.

In another example method for LTE R10, the WTRU may receive an indication from a base station, for example, $N_{subframes}^{SRS}$, which defines the number of subframes that the WTRU may use for SRS transmission for all its antennas. This indication, $N_{subframes}^{SRS}$, may be configurable by higher layer signaling or may be signaled through a DCI format in the PDCCH. A different $N_{subframes}^{SRS}$ value may be provided for periodic SRS and aperiodic SRS. For $1 <= N_{subframes}^{SRS} <=$ the number of transmit antennas the WTRU has, multiple antenna ports may be mapped to an SRS subframe. For example, which antenna(s) to transmit in each subframe may be based on a pre-defined rule (e.g., in order of antenna 1, 2, 3, 4). Alternatively, there may be no rule, since the base station may not know which antenna is which. In this case, the WTRU may choose an order and may use the same order all the time. An exception to this may be when an SRS transmission in a subframe is skipped due to a higher priority transmission. The SRS for the antenna planned for the next opportunity may be transmitted in that opportunity (not the skipped antenna).

For illustrative purposes, if the indication $N_{subframes}^{SRS}=1$, this may mean the WTRU may transmit SRS for all antennas in one subframe. If the indication $N_{subframes}^{SRS}=2$, this may mean that the WTRU may transmit SRS for its antennas over two subframes. For a WTRU with two antennas, this may mean to transmit SRS for each antenna in a different subframe. For a WTRU with four antennas, this may mean transmit SRS for two antennas in one subframe and the other two antennas in a different subframe. If the indication $N_{subframes}^{SRS}=4$, this may mean the WTRU may transmit the SRS for its antennas over four subframes. For a WTRU with four antennas, this may mean to transmit SRS for the four antennas over four subframes, i.e., transmit SRS for each antenna in a different subframe. In the case where the indication $N_{subframes}^{SRS}$ is greater than the number of WTRU transmit antennas, multiple SRS subframes may be mapped to one antenna and there may be a predefined rule as to on which antenna to transmit in each subframe. For example, if $N_{subframes}^{SRS}$ is twice the number of antennas and the WTRU has two antennas, the rule may be to transmit on antenna 1, then antenna 2, then antenna 1, then antenna 2.

In another example method for LTE R10, given a trigger from the base station to transmit SRS, the WTRU may transmit the SRS in either the next cell-specific SRS subframe, the next WTRU-specific subframe, or the next subframe of a set of subframes specifically assigned to the WTRU for "on-demand" (also called aperiodic) type SRS transmission. The trigger may be via L1 signaling such as a DCI format or via higher layer signaling, (e.g., an RRC message). For higher layer signaling, an activation time may need to be provided.

The WTRU may also receive an indication, together with the trigger, or separately, indicating whether to transmit on all antennas, N, simultaneously, N/2 antennas in sequence, or N/4 antennas in sequence, (or N/X antennas where the value of X is known in some way). Alternatively, the number of antennas (or antenna ports) on which to transmit in sequence may be equal to the rank currently used for the physical uplink shared channel (PUSCH). The rank, also known as the number of layers for MIMO transmission, may be derived from information signaled in an uplink (UL)

grant DCI, for example an UL grant DCI that is being used to trigger aperiodic SRS transmission.

FIG. 2 shows an example flowchart 200 for SRS transmission in response to a trigger. A WTRU may receive a trigger from a base station (210). The WTRU may then transmit a SRS in a predetermined subframe in accordance with the configuration (220). The trigger to transmit SRS may come with an indication of how many subframes to use for the transmission, (or the WTRU may receive this indication separately). A WTRU with N antennas may, if simultaneous transmission is indicated, send SRS on all N antennas at the next SRS transmission opportunity. If the number of subframes to use is two, the WTRU may transmit on N/2 antennas on the next SRS transmission opportunity, (e.g., antenna 1 and 2 for N=4) and the other N/2 antennas on the second next SRS transmission opportunity, (e.g., antenna 3 and 4 for N=4). This may be applicable for N even and >=2. If the number of subframes to use is four, the WTRU may transmit on one antenna in each of the next four SRS transmission opportunities, cycling through each of the four transmit antennas in sequence. This may be applicable for N equal to a multiple of 4. The next SRS transmission opportunity may be the next cell-specific SRS subframe, the next subframe in a new SRS configuration to be used for on-demand/aperiodic type SRS transmission, or the next WTRU-specific SRS subframe. The method may be extended to more than four antennas.

In another example method for LTE R10, if a WTRU skips a planned SRS transmission for a particular antenna, for example due to a conflict with another transmission with a higher priority, the WTRU may in the next SRS opportunity for this WTRU transmit the SRS for the antenna due for that transmission (i.e., not transmit a SRS for the antenna belonging to the skipped opportunity).

In LTE R8, a WTRU may transmit SRS in the last OFDM symbol of the second timeslot, (i.e., the 14$^{th}$ OFDM symbol in the normal CP mode), per SRS subframe. In another example method for LTE R10, a R10 WTRU may use the last OFDM symbol of both time slots, (i.e., the 7$^{th}$ and 14$^{th}$ OFDM symbols in the normal CP mode), per SRS subframe.

For illustrative purposes only, an example of how the WTRU may use the cell-specific subframes between the WTRU-specific subframes with the number of subframes to use for multiple antenna SRS transmission specified is described. In a given WTRU-specific SRS period, the WTRU may determine all of the cell-specific subframes in that period. For example, for srs-SubframeConfig=7, from Table 1, the cell-specific subframes are specified by $T_{SFC}=5$ and $\Delta_{SFC}=\{0,1\}$ which corresponds to subframes $\{0,1,5,6, 10,11,15,16,20,21, \ldots\}$. For $I_{SRS}=7$, from Table 3, $T_{SRS}=10$ and $T_{offset}=0$ which corresponds to the WTRU-specific subframes $\{0, 10, 20, 30, \ldots\}$. The cell-specific subframes in the first WTRU-specific period are $\{0,1,5,6\}$; and in the next WTRU-specific period they are $\{10,11,15,16\}$. These will be referred to as the WTRU-permissable SRS subframes.

The WTRU may determine which of the WTRU-permissable SRS subframes to use for SRS transmission by a predetermined rule. For example, a rule may select the first (or last) $N_{subframes}^{SRS}$ elements from the set. Another rule may select the first (or last) $N_{subframes}^{SRS}$ even (or odd) elements from the set. Another rule may select the $N_{subframes}^{SRS}$ elements evenly distributed within the set. Another rule may use some combination of the previous rules. Yet another rule may select $N_{subframes}^{SRS}$ elements from the set according to a predetermined pattern. The predetermined pattern may be configurable by higher layer signaling or signaled through L1 signaling, for example, a DCI format in PDCCH.

If srs-ConfigIndex $I_{SRS}$, (which provides SRS periodicity $T_{SRS}$ and SRS subframe offset $T_{offset}$) and/or $N_{subframes}^{SRS}$ is/are provided separately for periodic and aperiodic SRS transmission, the WTRU may use the appropriate parameters according to the nature of the SRS transmission (periodic or aperiodic).

For the case of $N_{subframes}^{SRS}<=N_{Ant}^{SRS}$, (i.e., where the number of SRS subframes is less than or equal to the number of antennas), then in each of the selected $N_{subframes}^{SRS}$ subframes, the WTRU may transmit SRS on the appropriate antenna(s). Let $N_{Ant}^{SRS}$ be defined as the total number of antenna ports for a SRS WTRU, then $n_{Ant}$, the number of antenna ports from which SRSs are transmitted simultaneously in one SRS subframe, may be determined as $n_{Ant}=\lfloor N_{Ant}^{SRS}/N_{subframes}^{SRS} \rfloor$. If there are SRS transmissions in both time slots in one SRS subframe, $n_{Ant}=\lfloor N_{Ant}^{SRS}/(2*N_{subframes}^{SRS}) \rfloor$.

If $N_{subframes}^{SRS}>N_{Ant}^{SRS}$, then multiple SRS subframes may be mapped to an antenna port depending on a predetermined rule. For example, one to one mapping sequentially, i.e., the first subframe to the first antenna port and so on, and then cycling through, eventually transmitting SRS subsequent times for a given antenna port in one SRS periodicity $T_{SRS}$.

Described herein are example methods for resource assignment of cyclic shifts (CS) and transmission combs (TC). In an example method, a WTRU may implicitly determine pairs of CSs and TCs for multiple antenna ports from a pair of CS and TC for a single antenna port. A WTRU with $N_{Ant}^{SRS}$ antennas, $N_{Ant}^{SRS}>1$, may derive the CS and/or TC for $N_{Ant}^{SRS}-1$ of the antennas from the CS and/or TC the WTRU SRS receives for one of the antennas. When a WTRU will transmit SRS simultaneously on a number of antennas, $n_{Ant}$, which may be fewer than the number it physically has, the WTRU may instead derive CS and/or TC for $n_{Ant}-1$ of the antennas from the CS and/or TC the WTRU receives for one of the antennas. The number of antennas on which to transmit SRS simultaneously may be given or configured. It is noted that a cyclic shift may be defined by two values, one being an integer which identifies a CS in a set of $N_{CS}$ cyclic shifts and the actual CS which may be defined in terms of the integer identifier. If the integer identifier is $n_{SRS}$ and the actual cyclic shift is $\alpha_{SRS}$, the relationship between the two may be defined as $\alpha_{SRS}=2\Pi \times n_{SRS}/N_{CS}$. The term cyclic shift or CS may be used herein to represent the identifier or the actual cyclic shift. Based on the context, it will be clear to one skilled in the art which one is intended.

In another example method, a cyclic shift assigned to an antenna (or antenna port) may be based on a predefined rule. A predefined rule may assign a cyclic shift to each antenna (or antenna port) to achieve the largest distance between the cyclic shifts of the antennas (or antenna ports). For example, for a set of cyclic shifts $\{0,1,2,3,4,5,6,7\}$ and $N_{Ant}^{SRS}=2$, if CS=2 for antenna port 1, then CS=6 for antenna port 2. Maximal separation may be accomplished with the rule $CS_m=(CS_{ref}+m\times\gamma)mod(N_{cs})$, $m=0, \ldots, N_{Ant}^{SRS}-1$, where $CS_{ref}$ is the cyclic shift for a reference antenna (or antenna port) for which the WTRU receives the CS from the base station, $N_{cs}$ is the total number of cyclic shifts in a given CS set, $CS_m$ is the cyclic shift for each antenna (antenna port) m, and $\gamma$ may be defined as $N_{cs}/N_{Ant}^{SRS}$ in order to achieve the maximal separation. When the WTRU will transmit SRS simultaneously on fewer antennas than its total number of antennas, maximal separation between the cyclic shifts of those antennas may be achieved by replacing the total number of antennas with the number of antennas used for transmission, i.e., $N_{Ant}^{SRS}$ may be replaced by the number of antennas on which SRS will be transmitted simultaneously, $n_{Ant}$. Maximal distance between cyclic shifts may maximize orthogonality and reduce interference. The above may be further illustrated with respect to flowchart 300 shown in FIG. 3. A WTRU may receive a CS for a given antenna/antenna port (310). The total number of cyclic shifts in a set may be signaled, given or configured (330). The total number of antennas or the number of antennas on which to transmit SRS simultaneously, may be predetermined, given or configured (340). The WTRU may then determine the maximal separation between CSs in the cyclic shift set based on the received CS, the total number of cyclic shifts and the number of antennas (350). The WTRU may then assign a cyclic shift to an antenna based on the maximal or optimal cyclic shift separation (360).

Another predefined rule may assign the next to the current element in a set/group. For example, given a set of cyclic shifts {0,1,2,3,4,5,6,7} and $N_{Ant}^{SRS}=2$, if CS=2 for antenna port 1, then CS=3 for antenna port 2. Another predefined rule may use a predetermined pattern, which may be configurable by higher layer signaling or signaled through L1 signaling, for example, a DCI format in PDCCH.

In another example method, transmission combs may be assigned first against a given cyclic shift and then the cyclic shifts next for all transmit antenna ports, i.e., a new cyclic shift may be used after all transmission combs are used for a given a given cyclic shift. Alternatively, the cyclic shifts may be assigned first for a given transmission comb.

In another example method, the CSs and/or TCs for multiple antenna ports may be cycled or hopped with a predetermined rule/pattern per subframe or per slot if two slots in one SRS subframe are used. Activation of hopping and the predetermined rule/pattern may be configurable by higher layer signaling or signaled through L1 signaling, for example, a DCI format in PDCCH.

In another example method, one set of CSs may be assigned to periodic SRS and a second set may be assigned to aperiodic SRS. This may also be implemented for TCs. The methods for assigning CS and TC may be predetermined by a rule. For example, one rule may state that from all CS and/or TC, select the first n to be the set for periodic SRS and the remainder for aperiodic SRS. For illustrative purposes only, CS=0, 1, 2, 3 and TC=0 for periodic SRS and CS=4, 5, 6, 7 and TC=1 for aperiodic SRS. Another rule may state that from all CS and/or TC, select the even numbers for periodic SRS and the odd numbers for aperiodic SRS. Another rule may be a combination of the above. Another rule may select elements from the set according to a predetermined pattern separately for both periodic and aperiodic SRS. The predetermined pattern may be configurable by higher layer signaling or signaled through L1 signaling, for example, a DCI format in PDCCH.

The following are illustrative examples for assigning subframes, cyclic shifts, and transmission combs in accordance with the example methods described herein above. In an aperiodic trigger example, a SRS indicator/request may be used for triggering aperiodic SRS transmission and may, for example, be included with an UL grant. The parameter $N_{subframes}^{SRS}$ may be combined with the SRS indicator/request. An example is shown in Table 6 where two bits may be used to both trigger the SRS transmission and to indicate how many subframes to use for SRS transmission.

TABLE 6

| Value | 00 | 01 | 10 | 11 |
|---|---|---|---|---|
| Action | No aperiodic SRS (no aperiodic SRS/deactivate dynamic aperiodic SRS transmission) | Trigger aperiodic SRS transmission with $N_{subframe}^{SRS}=1$ | Trigger aperiodic SRS transmission with $N_{subframe}^{SRS}=2$ | Trigger aperiodic SRS transmission with $N_{subframe}^{SRS}=4$ |

The following are examples of resource assignment of SRS subframes. In these examples, SRS transmissions for multiple antenna ports are spread over multiple subframes, (or one subframe), within WTRU-specific SRS periodicity $T_{SRS}$ and SRSs are transmitted in the last OFDM symbol(s), ($14^{th}$ OFDM symbol or $7^{th}$ and $14^{th}$ in the normal CP mode), of one SRS transmission subframe. To obtain SRS transmission instances, SRS subframe offsets, $T_{offset-R10}$, for multiple antenna ports are determined from the SRS subframe offset, $T_{offset}$, configured by higher layer signaling for a single antenna port, as follows.

First, compute cell-specific transmission offsets $\Delta_{SFC}^{UE-specific}$ within a given WTRU-specific SRS periodicity $T_{SRS}$ from the tables above (Table 1 and Table 3 for FDD), since WTRU-specific subframes must be within the cell-specific subframes allowed for SRS transmission. The number of cell configuration periods within a SRS periodicity $T_{SRS}$ is computed as $n_{SFC}^{SRS}=\lfloor T_{SRS}/T_{SFC}\rfloor$ where $T_{SFC}$ is defined as a configuration period in Table 1 and $T_{SFC}\leq T_{SRS}$. Then the possible transmission offsets for a WTRU-specific SRS periodicity $T_{SRS}$ are $\Delta_{SFC}^{UE-specific}\in\{\Delta_{SFC}, T_{SFC}+\Delta_{SFC}, 2*T_{SFC}+\Delta_{SFC}, \ldots, (n_{SFC}^{SRS}-1)*T_{SFC}+\Delta_{SFC}\}$ where $i*T_{SFC}+\Delta_{SFC}$ represents that all elements of a set $\Delta_{SFC}$ are added by $i*T_{SFC}$. In example 1, srsSubframeConfiguration=0 (i.e. $T_{SFC}=1$, $\Delta_{SFC}=\{0\}$ in Table 1) and $I_{SRS}=7$ (i.e. $T_{SRS}=10$ and $T_{offset}=0$ from Table 3), then $\Delta_{SFC}^{UE-specific}\in\{0,1,2,3,4,5,6,7,8,9\}$ and in example 2, srsSubframeConfiguration=7 (i.e. $T_{SFC}=5$, $\Delta_{SFC}=\{0,1\}$ in Table 1) and $I_{SRS}=7$ (i.e. $T_{SRS}=10$ and $T_{offset}=0$ from Table 3), then $\Delta_{SFC}^{UE-specific}\in\{0,1,5,6\}$ for $n_{SFC}^{SRS}=\lfloor T_{SRS}/T_{SFC}\rfloor=2$.

Then, select $d_{subframe-offset}(i)$ for i=0, 1, ..., $N_{subframes}^{SRS}-1$ out of $\Delta_{SFC}^{UE-specific}$ based on predetermined rules. Examples of predetermined rules are described herein. One rule may select first $N_{subframes}^{SRS}$ elements from the set of $\Delta_{SFC}^{UE-specific}$, for example $d_{subframe-offset}(0)=0$, $d_{subframe-offset}(1)=1$ for $N_{subframe}^{SRS}=2$ and $\Delta_{SFC}^{UE-specific}\in\{0,1,5,6\}$. Another rule may select $N_{subframes}^{SRS}$ even elements from $\Delta_{SFC}^{UE-specific}$, for example $d_{subframe-offset}(0)=0$, $d_{subframe-offset}(1)=5$ for $N_{subframe}^{SRS}=2$ and $\Delta_{SFC}^{UE-specific}\in\{0,1,5,6\}$. Another rule may select $N_{subframes}^{SRS}$ odd elements from $\Delta_{SFC}^{UE-specific}$, for example $d_{subframe-offset}(0)=1$, $d_{subframe-offset}(1)=6$ for $N_{subframe}^{SRS}=2$ and $\Delta_{SFC}^{UE-specific}\in\{0,1,5,6\}$. Another rule may select $N_{subframes}^{SRS}$ elements evenly distributed within $\Delta_{SFC}^{UE\text{-}specific}$, for example $d_{subframe\text{-}offset}(0)=0$, $d_{subframe\text{-}offset}(1)=5$ for $N_{subframes}^{SRS}=2$ and $\Delta_{SFC}^{UE\text{-}specific} \in \{0,1,2,3,4,5,6,7,8,9\}$.

Then, compute SRS transmission subframes within UE-specific SRS periodicity $T_{SRS}$, $T_{offset\text{-}R10}$: $T_{offset\text{-}R10}(i)= (T_{offset}+d_{subframe\text{-}offset}(i))$ mod $T_{SRS}$, where i=0, 1, . . . , $N_{subframes}^{SRS}-1$.

Described herein are examples of CS and TC assignments. A first illustrative example assigns CS first and then TC. In this method, the transmission combs for simultaneous SRS transmission from $n_{Ant}$ may be kept the same as $k_{TC}$ configured semi-statically by higher layer signaling for a single antenna port until all cyclic shifts are exhausted. The actual cyclic shifts $\alpha_{SRS\text{-}R10}$ for simultaneous SRS transmission from $n_{Ant}$ are implicitly determined from $n_{SRS}^{cs}$, a reference cyclic shift identifier, which may be configured semi-statically by higher layer signaling for a single antenna port.

An example for assigning CS in a manner which achieves an even distribution of cyclic shifts is as follows. A delta between CS offsets, $d_{offset}^{CS}=N_{CS}/n_{Ant}$, may be computed, where $N_{CS}$ is the total number of cyclic shifts, for example $N_{CS}=8$, $\{0,1,\ldots,7\}$ or 12 for the extended CS. Then the actual cyclic shifts $\alpha_{SRS\text{-}R10}$ for $n_{Ant}$ are computed as follows:

$$n_{SRS\text{-}R10}^{cs}(i) = [n_{SRS}^{cs} + (i * d_{offset}^{cs})] \bmod N_{CS} \quad \text{Equation 1}$$

$$\alpha_{SRS\text{-}R10}(i) = 2\pi \frac{n_{SRS\text{-}R10}^{cs}(i)}{N_{cs}} \quad \text{Equation 2}$$

where i=0, 1, 2, . . . , ($n_{Ant}-1$). This determination results in maximally spacing cyclic shifts as shown herein above in FIG. 3.

Another example is to select CS offsets based on a predetermined rule/pattern from a predetermined set, for example, assign even cyclic shifts (e.g., 0,2,4,6) for periodic SRS and odd cyclic shifts (e.g., 1,3,5,7) for aperiodic SRS.

The following are examples illustrating the combination of CS assignment with using subframes between WTRU-specific subframes for SRS transmission on multiple antennas. For illustrative purposes, the following WTRU-specific parameters and example values are used: $N_{TC}^{UE}$ is the total number of transmission combs, $k_{TC\text{-}R10}$ identifies which transmission comb in a set of transmission combs to use, $n_{SRS}^{cs}$ is a reference cyclic shift to use for SRS transmission. For $N_{TC}^{UE}=2$, $k_{TC\text{-}R10} \in \{0,1\}$, (or for extended TCs, $N_{TC}^{UE}=4$, and $k_{TC\text{-}R10} \in \{0, 1, 2, 3\}$); for $N_{CS}=8$, $n_{SRS}^{cs} \in \{0, 1, \ldots, 7\}$; in the examples, we will use $I_{SRS}=7$ which corresponds to $T_{SRS}=10$ and $T_{offset}=0$ from Table 3, srs-SubframeConfig=0 which corresponds to $\Delta_{SFC}=0$ from Table 1, $k_{TC\text{-}R10}=0$ (unless another TC is needed, and $n_{SRS}^{cs}=2$.

Throughout the following examples, assignment of cyclic shifts to multiple antenna ports may use the even distribution method noted above. Selection of the subframes to use between the WTRU-specific subframes may be based on a predetermined rule such as one described herein or another rule. Note that all figures represent two or three SRS periodicities. Only one SRS periodicity $T_{SRS}$ is needed for "one shot" dynamic aperiodic SRS.

Figure 4:
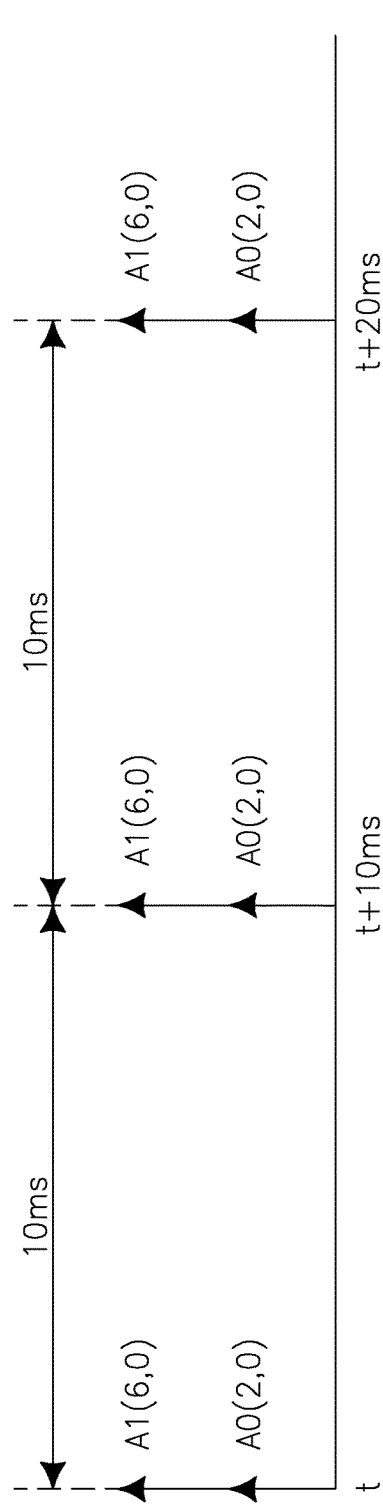
FIG. 4 is a diagram of sounding reference signals (SRS) transmission subframes, cyclic shift (CS) and transmission comb (TC) for $N_{Ant}^{SRS}=2$ and $N_{subframes}^{SRS}=1$.

In one example, SRS multiplexing by cyclic shifts using the same subframes and same TC used for all antenna ports is described for the case of 2 antennas. In this case, transmission is only in the WTRU-specific subframes. For $N_{Ant}^{SRS}=2$ and $N_{subframes}^{SRS}=1$, $n_{Ant}=2$. Using the even distribution rule noted above, the (CS, TC) pair is (2, 0) for antenna port 0 (A0), and (6, 0) for antenna port 1 (A1) as illustrated in FIG. 4.

Figure 5:
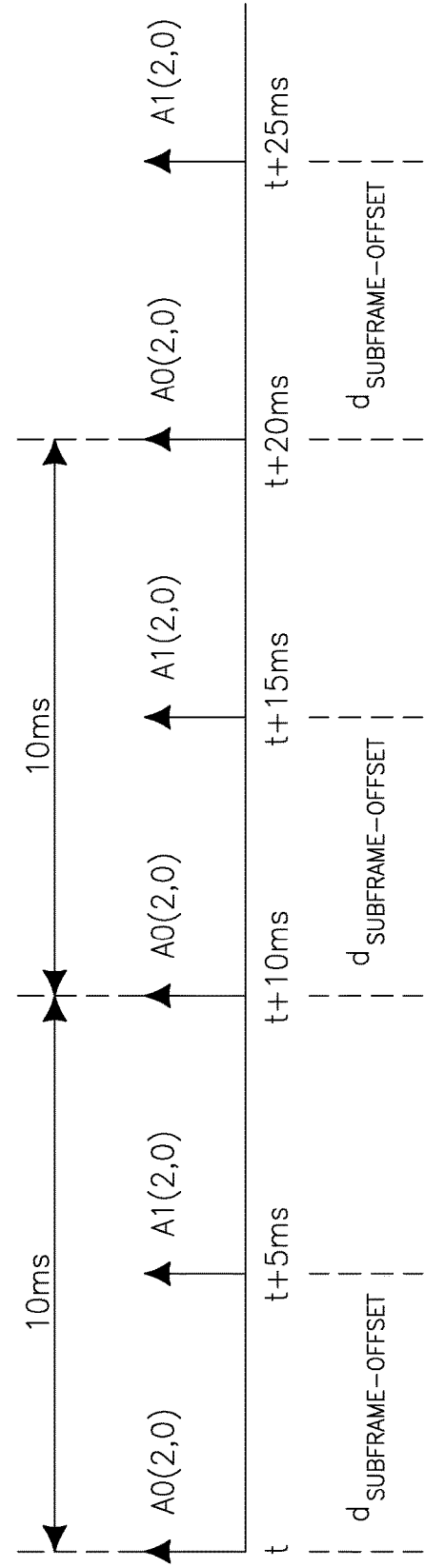
FIG. 5 is a diagram of SRS transmission subframes, CS and TC for $N_{Ant}^{SRS}=2$ and $N_{subframes}^{SRS}=2$.

For the example of 2 antennas, SRS multiplexing and capacity increase may be accomplished by using time division multiplexing (TDM), wherein different subframes are used for SRS transmission while using the same TC and CS. For $N_{Ant}^{SRS}=2$ and $N_{subframes}^{SRS}=2$, $n_{Ant}=1$. Based on a predefined rule such as even separation in time, $T_{offset\text{-}R10}(0)=0$ and $T_{offset\text{-}R10}(1)=5$. Using the even distribution rule noted above, the (CS, TC) pair for each antenna port is (2, 0) as shown in FIG. 5.

Figure 6:
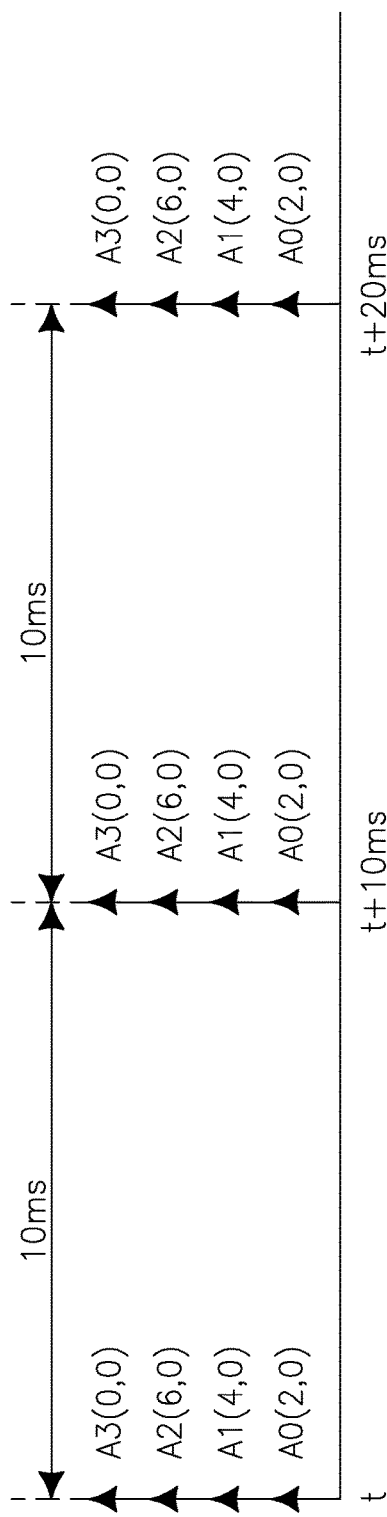
FIG. 6 is a diagram of SRS transmission subframes, CS and TC for $N_{Ant}^{SRS}=4$ and $N_{subframes}^{SRS}=1$.

In another example, SRS multiplexing by CS using the same subframe and the same TC for all antennas is described for the case of 4 antennas. For $N_{Ant}^{SRS}=4$ and $N_{subframe}^{SRS}=1$, $n_{Ant}=4$. Using the even distribution rule above, the (CS, TC) pairs for the antenna ports are (2, 0) for antenna port 0 (A0), (4, 0) for antenna port 1 (A1), (6, 0) for antenna port 2 (A2), and (0, 0) for antenna port 3 (A3) as illustrated in FIG. 6.

Figure 7:
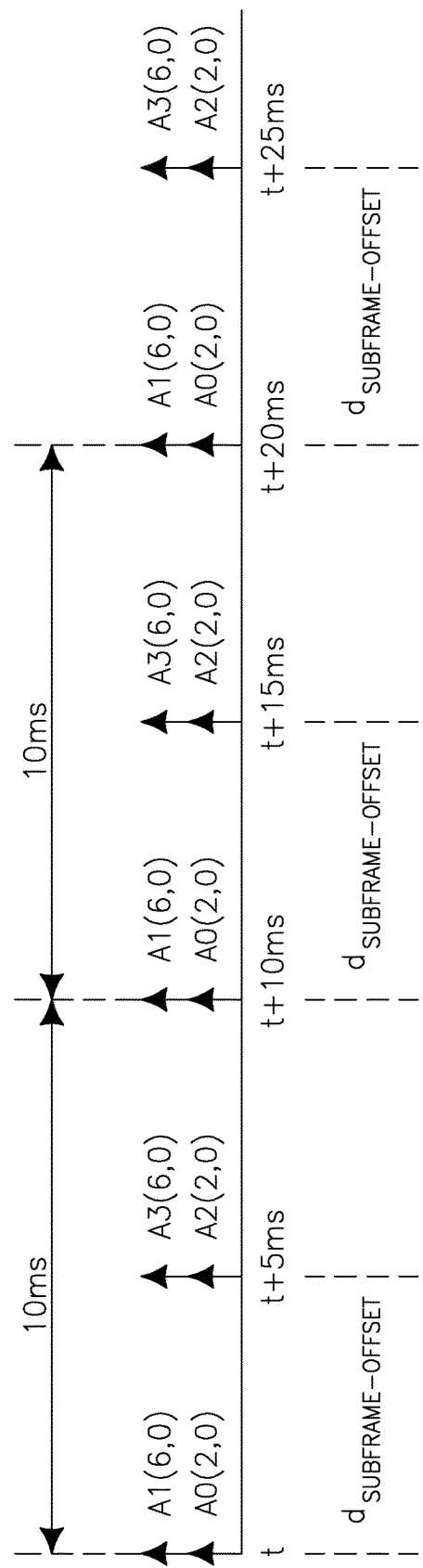
FIG. 7 is a diagram of SRS transmission subframes, CS and TC for $N_{Ant}^{SRS}=4$ and $N_{subframes}^{SRS}=2$.

In another example, SRS multiplexing by TDM and CS while using the same TC for the case of 4 antennas is described. For $N_{Ant}^{SRS}=4$ and $N_{subframes}^{SRS}=2$, $n_{Ant}=2$. Based on a predefined rule such as even separation in time, $T_{offset\text{-}R10}(0)=0$ and $T_{offset\text{-}R10}(1)=5$. Using the even distribution rule noted above and $n_{Ant}=2$, the (CS, TC) pairs for the antenna ports are (2, 0) for antenna ports 0 and 2 (A0 and A2) and (6, 0) for antenna ports 1 and 3 (A1 and A3) as shown in FIG. 7.

Figure 8:
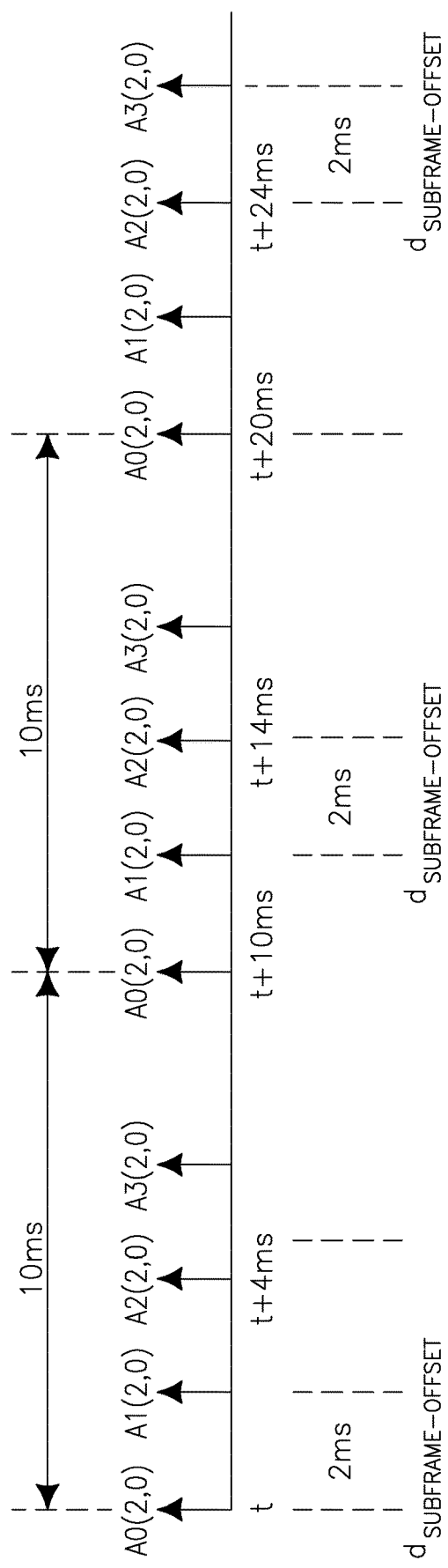
FIG. 8 is a diagram of SRS transmission subframes, CS and TC for $N_{Ant}^{SRS}=4$ and $N_{subframes}^{SRS}=4$.

In another example, SRS multiplexing by TDM using the same CS and the same TC for all antennas is described for the case of 4 antennas. For $N_{Ant}^{SRS}=4$ and $N_{subframes}^{SRS}=4$, $n_{Ant}=1$. This corresponds to transmitting SRS on one antenna in a subframe. Using a predefined rule may result in $T_{offset\text{-}R10}(0)=0$, $T_{offset\text{-}R10}(1)=2$, $T_{offset\text{-}R10}(2)=4$, and $T_{offset\text{-}R10}(3)=6$. Using the even distribution rule noted above, and $n_{Ant}=1$, the (CS, TC) pairs for the antenna ports are all (2, 0) as shown in FIG. 8.

Described herein are illustrative examples for assigning TC first and then CS. In this method, the transmission combs for all transmit antenna ports are implicitly determined from the transmission comb $k_{TC}$ configured by higher layer signaling for a single antenna port or predetermined by a rule. For example, if the total number of transmission combs defined as $N_{TC}^{UE}$ is 2, $k_{TC\text{-}R10} \in \{0, 1\}$, then the rule may be $k_{TC\text{-}R10}(0)=k_{TC}$ and $k_{TC\text{-}R10}(1)=(k_{TC}+1)$ mod 2.

SRS subframe offsets $T_{offset\text{-}R10}$ for multiple antenna ports may be determined from $T_{offset}$ configured by higher layer signaling for a single antenna port in the same way as described above.

To assign a pair of orthogonal resources of CS and TC to each antenna port, TCs are assigned for a given CS until all TCs are exhausted. For the examples associated with FIGS. 4 and 7, the (CS, TC) pairs would become (2, 0) for antenna 0 and (2, 1) for antenna 1. For the example associated with FIG. 6, the (CS, TC) pairs would become (2, 0) for antenna 0 (A0), (2, 1) for antenna 1 (A1), (6, 0) for antenna 2 (A2), and (6, 1) for antenna 3 (A3).

Described herein are methods for using different types of UL grants as triggers for aperiodic SRS transmissions. In a solution for a non-semi-persistent scheduling case, a WTRU may receive both explicit and implicit UL grants. The WTRU may interpret one or more of these grants as an aperiodic SRS trigger without the need for additional signaling, (e.g., added trigger bit(s)), being provided with the grant.

The WTRU may determine which UL grant type(s) to interpret as the aperiodic SRS trigger based on the configuration provided by the base station, for example, via RRC signaling. Alternatively, it may be predefined as to which UL grant types(s) are to be interpreted as aperiodic SRS triggers. For example, the network may transmit a new RRC message or add a field in an existing RRC message to define an instruction that indicates whether an UL grant with new transmission and/or an UL grant with only retransmission, and/or an implicit UL grant via physical hybrid automatic repeat request (ARQ) indicator channel (PHICH) negative acknowledgement (NACK) is to be interpreted as the aperiodic SRS trigger. The WTRU then acts accordingly when receiving an UL grant.

A new field, for example UL-Grant-Type, may be added as a LTE R10 extension to the SoundingRS-UL-ConfigDedicated information element (IE) to indicate for aperiodic SRS which type(s) of UL grant trigger aperiodic SRS. For example, the new field may indicate which of UL grant with new transmission, UL grant with only retransmission, and UL grant via PHICH NACK will trigger aperiodic SRS. Alternatively, if a new IE is defined for aperiodic SRS, then the new field may be added to that IE.

In an example of the first solution, a new data grant may trigger aperiodic SRS. The WTRU may interpret a PDCCH with UL grant as an aperiodic SRS trigger if there is new data to be transmitted for at least one of the codewords, for example, when at least one of the new data indicator (NDI) bits indicates new data. When the PDCCH UL grant indicates retransmission for all the codewords, the WTRU does not interpret the PDCCH with UL grant to be an aperiodic SRS trigger. The WTRU does not interpret the implicit resource assignment by way of PHICH NACK as a trigger for aperiodic SRS.

In another example of the first solution, an explicit retransmission request may trigger aperiodic SRS. The WTRU may interpret PDCCH with UL grant as an aperiodic SRS trigger if the UL grant indicates retransmission only, (for all of the codewords). In this case all NDI bits may indicate retransmission, (no new data). The base station may choose to set the NDI bits in this manner to "force" an aperiodic SRS with a small penalty of an unnecessary retransmission. In this example, the UL grant indicating retransmission for all may be the only UL grant that triggers aperiodic SRS. Alternatively, the WTRU may also interpret PDCCH UL grant with new data, (for one or more code words) as an aperiodic SRS trigger. In another alternative, the WTRU may also interpret an implicit UL grant via PHICH NACK as an aperiodic SRS trigger.

In another example of the first solution, a PHICH NACK may trigger aperiodic SRS. The WTRU may only interpret an implicit PHICH NACK grant as an aperiodic SRS trigger. Alternatively, the WTRU may also interpret a PDCCH UL grant with new data, (for one or more code words), as an aperiodic SRS trigger. In another alternative, the WTRU may also interpret a PDCCH UL grant indicating retransmission for all code words as an aperiodic SRS trigger.

In another example of the first solution, any UL grant may trigger aperiodic SRS. The WTRU may interpret a PDCCH UL grant with new data, (for one or more code words), as an aperiodic SRS trigger. The WTRU may also interpret a PDCCH UL grant indicating retransmission for all code words as an aperiodic SRS trigger. The WTRU may also interpret an implicit PHICH NACK grant as an aperiodic SRS trigger.

In a second solution, for the case of semi-persistent scheduling (SPS), the network may send the WTRU a first transmission grant and a periodic allocation. After that point, the WTRU may not receive any more explicit UL grants. Grants may be implicit by the SPS allocation and by PHICH NACK. Interpretation of these UL grants may be as follows. For the case of SPS, the WTRU may interpret some combination of the first transmission grant, the subsequent implicit UL grants based on the SPS schedule, and each PHICH NACK as an aperiodic SRS trigger. In another example for the case of SPS, the WTRU may interpret only the first transmission grant as an aperiodic SRS trigger. In another example for the case of SPS, the WTRU may interpret the first transmission grant and each subsequent implicit UL grant based on the SPS schedule as an aperiodic SRS trigger. In another example for the case of SPS, the WTRU may interpret the first transmission grant and each PHICH NACK as an aperiodic SRS trigger. In another example for the case of SPS, the WTRU may interpret the first transmission grant, each subsequent implicit UL grant based on the SPS schedule and each PHICH NACK as an aperiodic SRS trigger.

In a third solution, for the case where an explicit trigger is included with the initial UL grant and that explicit trigger requested SRS, then the WTRU may interpret subsequent UL grants, (via PDCCH and/or PHICH NACK) to be aperiodic SRS trigger.

Described herein are methods for scheduling SRS in the absence of data, (a dummy grant). It may be necessary to schedule aperiodic SRS in the absence of physical uplink shared channel (PUSCH) data to transmit in the UL. This may be useful, for example, if it has been a long time since the last SRS transmission and the base station may want sounding measurements to effectively allocate resources. Having measurements from SRS may help the base station make a better decision.

In a first solution, the base station may send a downlink control information (DCI) format, for example, an UL PUSCH grant message, with codepoints indicating SRS only. For example, the modulation and coding set (MCS) index for each codeword (CW) may be set to a reserved value, (e.g., 29 to 31), while the NDI for each CW is toggled, indicating a new transmission. In LTE R8/9, this is an invalid combination since the MCS needs to be signaled for a new transmission. This combination may be specified in LTE R10 to indicate that a CW is disabled. If the WTRU receives an UL grant with field(s) set to indicate that both codewords are disabled, the WTRU may interpret that as an SRS trigger.

The WTRU may use the existing content of the UL grant to obtain other configuration information. For example, the WTRU may determine the component carrier (CC) on which to transmit the SRS from the UL grant in the same manner that the WTRU determines what CC the UL grant is for. Alternatively, the CC on which to transmit may be fixed as all UL CCs, all active UL CCs, or the UL CCs may be designated in some other manner such as by higher layer signaling. The WTRU may obtain additional configuration data from bits in the DCI format whose purpose may have been modified from their original purpose in the UL grant.

In another solution, the UL grant DCI format for LTE R10 may need to be a modified version of the LTE R8/9 UL grant format, (DCI format 0), in order to at least accommodate multiple antennas. There may be two NDI bits to indicate whether the grant is for new or retransmitted data for each of the two codewords. For the case of using the UL grant as an SRS trigger in the absence of data, the WTRU may interpret the 2 NDI bits to indicate on which antenna to transmit the SRS.

Described herein are methods for handling multiple antennas. In LTE R10, a WTRU may support up to 4 antennas. The first set of solutions may use antenna-specific configurations and SRS triggers. In the first solution, a WTRU may receive antenna-specific subframe and transmission parameter configurations from the base station, for example, by RRC signaling. These antenna-specific configuration(s) may be similar in definition and content to the WTRU-specific SRS configuration currently defined for LTE R8 periodic SRS.

A LTE R8/9 WTRU-specific subframe configuration consists of a table which maps an SRS configuration index to a period in subframes and a subframe offset. In one example of the first solution, the same, or a similar, table may be used or LTE R10. The WTRU may then receive an index into the table for each antenna instead of a single WTRU-specific value. Using this index the WTRU knows the SRS subframe allocation for each antenna.

LTE R8/9 WTRU-specific parameters are provided to the WTRU using the IE shown in Table 7, received via dedicated RRC signaling.

antennas. The values may be the same or different for each of the antennas. The parameter srs-ConfigIndex may be set to the same value for one or more antennas to configure SRS transmission for those antennas in the same subframe, (assuming simultaneous transmission is allowed and if necessary, configured).

The duration parameter in this IE is intended for periodic SRS, not aperiodic SRS and, therefore has a BOOLEAN value of single or indefinite. For aperiodic SRS, this value may be eliminated if only one-shot aperiodic transmissions are allowed. If multi-shot aperiodic transmissions are allowed, the duration may be used to indicate the number of transmissions, for example, one for one-shot, two for two transmissions, Ns for Ns transmissions or a value to represent each of the allowed number of transmissions. It may also include a value to indicate continuous until deactivation.

An example of the IE for antenna-specific aperiodic SRS configuration, called here SoundingRS-UL-ConfigDedi-

TABLE 7

```
SoundingRS-UL-ConfigDedicated : :=   CHOICE {
    release                              NULL,
    setup                                SEQUENCE {
        srs-Bandwidth                        ENUMERATED {bw0, bw1, bw2, bw3},
        srs-HoppingBandwidth                 ENUMERATED {hbw0, hbw1, hbw2,
hbw3},
        freqDomainPosition                   INTEGER (0..23),
        duration                             BOOLEAN,
        srs-ConfigIndex                      INTEGER (0..1023),
        transmissionComb                     INTEGER (0..1),
        cyclicShift                          ENUMERATED {cs0, cs1, cs2, cs3,
cs4, cs5, cs6, cs7}
    }
```

In another example of the first solution, in order for antenna-specific configurations in LTE R10 to provide the most flexibility, the WTRU may receive a separate value of each of the applicable parameters in this IE for each of its cated-r10, is shown in Table 8. It may consist of a separate set of parameters for each of the WTRU's antennas. The definitions of the parameters, as modified from LTE R8, are provided below after the examples.

TABLE 8

```
SoundingRS-UL-ConfigDedicated-r10 ::= CHOICE{
    release                              NULL,
    Setup                                SEQUENCE {
        Num-WTRU-Ant-v10-x0                  ENUMERATED { ant-2, ant-4},
OPTIONAL -- Cond multiAnt
        Setup-r10-multi-Ant-List :=          SEQUENCE (SIZE (1..maxWTRUAnt))
OF Setup-r10-multi-Ant-r10
    }
}
Setup-r10-multi-Ant-r10              SEQUENCE {
    srs-Bandwidth                        ENUMERATED {bw0, bw1, bw2, bw3},
OPTIONAL -- Cond MultiAnt
    srs-HoppingBandwidth                 ENUMERATED {hbw0, hbw1, hbw2, hbw3},
OPTIONAL -- Cond MultiAnt
    freqDomainPosition                   INTEGER (0..23), OPTIONAL -- Cond
MultiAnt
    srs-ConfigIndex                      INTEGER (0..1023), OPTIONAL -- Cond
MultiAnt
    transmissionComb                     INTEGER (0..1), OPTIONAL -- Cond
MultiAnt
    cyclicShift                          ENUMERATED {cs0, cs1, cs2, cs3, cs4,
cs5, cs6, cs7} OPTIONAL -- Cond MultiAnt
    duration-Aperiodic-v10-x0            ENUMERATED (Ap-1, Ap-2, Ap-3, Ap-4,
Ap-5,..., Ap-Ns), OPTIONAL -- Cond MultiAnt
}
```

Another example of the IE for antenna-specific aperiodic SRS configuration, called here SoundingRS-UL-ConfigDedicated-r10, is shown in Table 9. It may consist of a set of common parameters that are the same for all the antennas. For the parameters which may be different for each antenna, the IE may include separate parameters for each of the WTRU's antennas. In this example, only the subframe configuration index, the cyclic shift, and the transmission comb may be different for each of the antennas. The definitions of the parameters, as modified from LTE R8, are given after the examples.

TABLE 9

```
SoundingRS-UL-ConfigDedicated-r10 ::= CHOICE{
    release                         NULL,
    Setup                           SEQUENCE {
        srs-Bandwidth               ENUMERATED {bw0, bw1, bw2, bw3},
        srs-HoppingBandwidth        ENUMERATED {hbw0, hbw1, hbw2, hbw3},
        freqDomainPosition          INTEGER (0..23) ,
        duration-Aperiodic-v10-x0   ENUMERATED (Ap-1, Ap-2, Ap-3, Ap-4,
Ap-5,..., Ap-Ns ),
        Num-WTRU-Ant-v10-x0         ENUMERATED { ant-2, ant-4}, OPTIONAL -
- Cond multiAnt
        WTRU-Ant-Specific-List :=   SEQUENCE (SIZE (1.. maxWTRUAnt) ) OF
WTRU-Ant-Specific-r10,
}
WTRU-Ant-Specific-r10               SEQUENCE {
    srs-ConfigIndex                     INTEGER (0..1023), OPTIONAL --
Cond MultiAnt
    transmissionComb                INTEGER (0..1), OPTIONAL -- Cond
MultiAnt
    cyclicShift                     ENUMERATED (cs0, cs1, cs2, cs3,
cs4, cs5, cs6, cs7} OPTIONAL -- Cond MultiAnt
```

Another example of the IE for antenna-specific aperiodic SRS configuration, called here SoundingRS-UL-ConfigDedicated-r10, is shown in Table 10. It may consist of a set of common parameters that are the same for all the antennas. For the parameters which may be different for each antenna, the IE may include separate parameters for each of the WTRU's antennas. In this example, only the cyclic shift, and the transmission comb may be different for each of the antennas. The definitions of the parameters, as modified from LTE R8, are given after the examples.

TABLE 10

```
SoundingRS-UL-ConfigDedicated-r10 : := CHOICE{
    release                         NULL,
    Setup                           SEQUENCE {
        srs-Bandwidth               ENUMERATED {bw0, bw1, bw2, bw3},
        srs-HoppingBandwidth        ENUMERATED {hbw0, hbw1, hbw2, hbw3},
        freqDomainPosition          INTEGER (0..23),
        srs-ConfigIndex             INTEGER (0..1023),
        duration-Aperiodic-v10-x0   ENUMERATED (Ap-1, Ap-2, Ap-3, Ap-4,
Ap-5,..., Ap-Ns),
        Num-WRU-Ant-v10-x0          ENUMERATED { ant-2, ant-4},
OPTIONAL -- Cond multiAnt
        WTRU-Ant-Specific-List :=   SEQUENCE (SIZE (1..maxWTRUAnt) ) OF
WTRU-Ant-Specific-r10,
}
WTRU-Ant-Specific-r10               SEQUENCE {
    transmissionComb                INTEGER (0..1), OPTIONAL -- Cond
MultiAnt
    cyclicShift                     ENUMERATED {cs0, cs1, cs2, cs3,
cs4 , cs5, cs6, cs7} OPTIONAL -- Cond MultiAnt
```

The parameter field descriptions shown in Table 11 may apply to the above examples.

TABLE 11

SoundingRS-UL-ConfigDedicated-R10 field descriptions

Num-WTRU-Ants-v10-x0
The number of WTRU antennas to be activated, 2 or 4. Default is 1 and the parameter will not be transmitted.
srs-Bandwidth TABLE 11-continued SoundingRS-UL-ConfigDedicated-R10 field descriptions Parameter: $B_{SRS}$, see TS 36.211 [21, tables 5.5.3.2-1, 5.5.32-2, 5.5.32-3 and 5.5.3.2-4].
In case of multiple WTRU antenna case, see Conditional Presence explanation below.
freqDomainPosition
Parameter: $n_{RRC}$, see TS 36.211 [21, 5.5.3.2].
In case of multiple WTRU antenna case, see Conditional Presence explanation below.
srs-HoppingBandwidth
Parameter: SRS hopping bandwidth $b_{hop} \in \{0,1,2,3\}$, see TS 36.211 [21, 5.5.3.2] where hbw0 corresponds to value 0, hbw1 to value 1
and so on.
In case of multiple WTRU antenna case, see Conditional Presence explanation below.
Duration-Aperiodic-v10-x0
Parameter: Duration. See TS 36.213 [21, 8.2]. for periodic SRS, oneP, corresponds to "single" and value InfiP to "indefinite". For aperiodic SRS,
Ap-1 indicates one-transmission, Ap-2 means 2 and so on. In case of multiple WTRU antenna case, see Conditional Presence explanation
below.
srs-ConfigIndex
Parameter: $I_{SRS}$. See TS 36.213 [23, table8.2-1].
In case of multiple WTRU antenna case, see Conditional Presence explanation below.
transmissionComb
Parameter: $k_{TC} \in \{0,1\}$, see TS 36.211 [21, 5.5.3.2].
In case of multiple WTRU antenna case, see Conditional Presence explanation below.
cyclicShift
Parameter: n_SRS. See TS 36.211 [21, 5.5.3.1], where cs0 corresponds to 0 etc.
In case of multiple WTRU antenna case, see Conditional Presence explanation below.

| Conditional presence | Explanation |
|---|---|
| multiAnt | For multiple WTRU antenna list Setup-r10-multi-Ant-List or WTRU-Ant-Specific-List case, the value of this parameter for the first list entry must be present for antenna-1; it will be present for subsequent activating antenna(s) only if the parameter value is different than that in the previous entry. In absence of the parameter value, the value of it in a previous list entry is applied. |

In LTE R8, the IE SoundingRS-UL-ConfigDedicated may be included in the IE PhysicalConfigDedicated of the RadioResourceConfigDedicated structure. The RadioResourceConfigDedicated is called on by the RRCConnectionSetup message, the RRCConnectionReconfiguration message and the RRCReestablishmentRequest message.

The LTE R10 WTRU antenna-specific configurations may be included in the RRC configuration messages by including the new structure, called SoundingRS-UL-ConfigDedicated-r10 herein, into the IE PhysicalConfigDedicated, which may then be included in the RRC downlink configuration messages as in the above LTE R8 case. The changes to the IE PhysicalConfigDedicated may be as shown in Table 12.

TABLE 12

PhysicalConfigDedicated information element

```
-- ASN1START
PhysicalConfigDedicated ::=           SEQUENCE {
    pdsch-ConfigDedicated             PDSCH-ConfigDedicated              OPTIONAL,    -- Need ON
    pucch-ConfigDedicated             PUCCH-ConfigDedicated              OPTIONAL,    -- Need ON
    pusch-ConfigDedicated             PUSCH-ConfigDedicated              OPTIONAL,    -- Need ON
    uplinkPowerControlDedicated       UplinkPowerControlDedicated        OPTIONAL,    -- Need ON
    tpc-PDCCH-ConfigPUCCH             TPC-PDCCH-Config                   OPTIONAL,    -- Need ON
    tpc-PDCCH-ConfigPUSCH             TPC-PDCCH-Config                   OPTIONAL,    -- Need ON
    cqi-ReportConfig                  CQI-ReportConfig                   OPTIONAL,    -- Need ON
    soundingRS-UL-ConfigDedicated     SoundingRS-UL-ConfigDedicated      OPTIONAL,    -- Need ON
    antennaInfo                       CHOICE {
        explicitValue                     AntennaInfoDedicated,
        defaultValue                      NULL
    }     OPTIONAL,                                                                   -- Need ON
    schedulingRequestConfig           SchedulingRequestConfig            OPTIONAL,    -- Need ON
    ...,
    physicalConfigDedicated-v9x0      PhysicalConfigDedicated-v9x0-IEs   OPTIONAL     -- Need ON
    physicalConfigDedicated-v10x0     PhysicalConfigDedicated-v10x0-IEs  OPTIONAL     -- Need ON
}
PhysicalConfigDedicated-v10x0-IEs ::=    SEQUENCE {
    SoundingRS-UL-ConfigDedicated-v10x0   SoundingRS-UL-ConfigDedicated-r10      OPTIONAL,-- Need
ON
}
```

In another example, the antenna-specific configuration may include the parameters for one antenna and then parameters for any or all of the other antennas only if they were different from the parameters for one antenna.

If frequency hopping is not used for aperiodic SRS, the related parameters may be excluded from the IE.

In a second solution, a WTRU may receive antenna-specific subframe and transmission parameter configurations from the base station. Given a trigger, the WTRU may transmit SRS in the next antenna-specific subframe for each of the antennas for which SRS transmission is configured. The antenna-specific subframes may be the same or different for the different antennas. When certain parameters are the same for different antennas, those parameters may need to be signaled once, (i.e., as common for all antennas), and then be used for all the antennas.

In an example of the second solution, a WTRU may be configured for transmission of SRS on Na antennas. Let the subframe configuration for each antenna be defined for LTE R10 SRS in a manner similar to LTE R8 SRS in that subframe periodicity $T_{SRS}(i)$ and subframe offset $T_{offset}(i)$ are provided for each antenna i=0, 1, . . . Na−1. Then for the frequency division duplex (FDD) case, given an SRS trigger in subframe 'n' the WTRU may transmit SRS for each antenna i, where i=0, 1, . . . Na−1, in subframe '$k_{SRS}(i)$' such that $k_{SRS}(i)>=n+1$ and also satisfies the antenna-specific SRS subframe offset and SRS periodicity configuration parameters $(10 \cdot n_f + k_{SRS}(i) - T_{offset}(i))$ mod $T_{SRS}(i)=0$.

If $T_{SRS}(i)$ and $T_{offset}(i)$ are the same for all antennas, their SRS transmissions may all occur in the same subframe. If there are Na antennas and their offsets are all different, the trigger may result in SRS transmissions in Na separate subframes.

In a third solution, a WTRU may receive antenna-specific subframe and transmission parameter configurations from the base station. Given a trigger, the WTRU may transmit SRS in the next antenna-specific subframe that is at least four subframes from the triggering subframe for each of the antennas for which SRS transmission is configured. The antenna-specific subframes may be the same or different for the different antennas. When certain parameters are the same for different antennas, those parameters may be signaled once, (i.e., as common for all antennas), and then be used for all the antennas.

In an example of the third solution, a WTRU may be configured for transmission of SRS on Na antennas. Let the subframe configuration for each antenna be defined for LTE R10 SRS in a manner similar to LTE R8 SRS in that a subframe periodicity $T_{SRS}(i)$ and subframe offset $T_{offset}(i)$ are provided for each antenna i=0, 1, . . . Na−1. Then for the FDD case, given an SRS trigger in subframe 'n', the WTRU may transmit SRS for each antenna i, where i=0, 1, . . . Na−1, in subframe '$k_{SRS}(i)$' such that $k_{SRS}(i)>=n+4$ and also satisfies the antenna-specific SRS subframe offset and SRS periodicity configuration parameters $(10 \cdot n_f + k_{SRS}(i) - T_{offset}(i))$ mod $T_{SRS}(i)=0$.

If $T_{SRS}(i)$ and $T_{offset}(i)$ are the same for all antennas, their SRS transmissions will all occur in the same subframe. If there are Na antennas and their offsets are all different, the trigger will result in SRS transmissions in Na separate subframes.

In a fourth solution, a WTRU may receive WTRU-specific subframes from the base station to use for all antennas for aperiodic SRS. These subframes may be the same or different from the subframes to use for periodic SRS. The transmission parameters such as cyclic shift and transmission comb may be the same or different for the different antennas. In case of simultaneous transmission from multiple antennas in a subframe, orthogonality may be achieved by cyclic shift multiplexing and/or different transmission comb assignments. Given a trigger, the WTRU may determine on which antenna(s) to transmit SRS and in which subframes based on the defined antenna designation method and the defined trigger to transmission subframe relationship.

In an example of the fourth solution, a trigger, such as an UL grant or other DCI format, may explicitly specify on which antenna(s) to transmit SRS. In this case the WTRU may transmit SRS for the designated antenna(s) in the next subframe that satisfies the defined trigger to transmission subframe relationship. Alternatively, higher layer configuration, such as via RRC signaling, may define on what antenna(s) to transmit SRS for each trigger.

For instance, given a trigger in subframe n, the WTRU may transmit SRS for the designated antenna(s) in one of: 1) the next subframe (n+1); 2) the next cell-specific subframe, (for example subframe '$k_{SRS}$' such that $k_{SRS}>=n+1$ and also satisfies the cell-specific SRS subframe offset and SRS periodicity configuration parameters $\lfloor n_s/2 \rfloor$ mod $T_{SFC} \in \Delta_{SFC}$); 3) the next WTRU-specific subframe, (for example for FDD, subframe '$k_{SRS}$' such that $k_{SRS}>=n+1$ and also satisfies the WTRU-specific SRS subframe offset and SRS periodicity configuration parameters $(10 \cdot n_f + k_{SRS} - T_{offset})$ mod $T_{SRS}=0$); 4) the next cell-specific subframe at least four subframes after the triggering subframe, (for example subframe '$k_{SRS}$' such that $k_{SRS}>=n+4$ and also satisfies the cell-specific SRS subframe offset and SRS periodicity configuration parameters $\lfloor n_s/2 \rfloor$ mod $T_{SFC} \in \Delta_{SFC}$); or 5) the next WTRU-specific subframe at least four subframes after the triggering subframe, (for example for FDD, subframe '$k_{SRS}$' such that $k_{SRS}>=n+4$ and also satisfies the WTRU-specific SRS subframe offset and SRS periodicity configuration parameters $(10 \cdot n_f + k_{SRS} - T_{offset})$ mod $T_{SRS}=0$).

In another example of the fourth solution, a trigger, such as an UL grant or other DCI format, or higher layer signaling may designate that transmission of SRS may be cycled through the antennas configured for SRS transmission. In this case, the WTRU may transmit SRS for the configured antennas, cycling through the antennas, in the next subframes that satisfy the defined trigger to transmission subframe relationship.

Given a trigger in subframe n, the WTRU may transmit SRS for each of the Na configured antenna(s) in sequence according to one of the methods described below. In an example method, the WTRU may transmit SRS for the first configured antenna in the next cell-specific subframe, (for example subframe '$k_{SRS}$' such that $k_{SRS}>=n+1$ and also satisfies the cell-specific SRS subframe offset and SRS periodicity configuration parameters $\lfloor n_s/2 \rfloor$ mod $T_{SFC} \in \Delta_{SFC}$). The WTRU may transmit SRS for each additional configured antenna, in each of the next cell specific subframes.

In another example method, the WTRU may transmit SRS for the first configured antenna in the next WTRU-specific subframe, (for example for FDD, subframe '$k_{SRS}$' such that $k_{SRS}>=n+1$ and also satisfies the WTRU-specific SRS subframe offset and SRS periodicity configuration parameters $(10 \cdot n_f + k_{SRS} - T_{offset})$ mod $T_{SRS}=0$). The WTRU may transmit SRS for each additional configured antenna, in each of the next WTRU-specific subframes.

In another example method, the WTRU may transmit SRS for the first configured antenna in the next cell-specific subframe, (for example, subframe '$k_{SRS}$' such that $k_{SRS}>=n+4$ and also satisfies the cell-specific SRS subframe offset and SRS periodicity configuration parameters $\lfloor n_s/2 \rfloor$ mod $T_{SFC} \in \Delta_{SFC}$). The WTRU may transmit SRS for each additional configured antenna, in each of the next cell specific subframes.

In another example method, the WTRU may transmit SRS for the first configured antenna in the next WTRU-specific subframe, (for example for FDD, subframe '$k_{SRS}$' such that $k_{SRS}>=n+4$ and also satisfy the WTRU-specific SRS subframe offset and SRS periodicity configuration parameters $(10 \cdot n_f + k_{SRS} - T_{offset})$ mod $T_{SRS}=0$). The WTRU may transmit SRS for each additional configured antenna, in each of the next WTRU-specific subframes.

As an alternative to the WTRU transmitting the SRS for the antennas in sequence, the antenna for which the WTRU transmits SRS may be in accordance with a predefined pattern, for example, based on frequency hopping parameters, (similar to LTE R8).

As an alternative to transmitting in every cell-specific subframe or WTRU-specific subframe, the WTRU may transmit SRS in every Nth cell-specific subframe or WTRU-specific subframe.

Described herein are series and parallel transmission schemes that may be used for SRS transmissions on multiple antennas. The schemes may include 1) parallel transmissions where all SRS transmissions are in the same subframe; 2) series transmissions where all SRS transmissions are in different subframes, such as in sequence or according to a predefined pattern based on for example, frequency hopping parameters; or 3) either parallel or series transmissions based on a given criteria such as pathloss. Selection of parallel or series transmission may be determined by the network, (i.e., the base station) or the WTRU.

Described herein are methods for determining or switching the transmission scheme. In a first solution, the base station may decide and inform the WTRU what to do. The network may determine the SRS transmission scheme, (series or parallel), and send an indication to the WTRU to tell it which transmission scheme to use. Upon receipt of the indication from the base station, the WTRU may set its SRS transmission scheme to series or parallel as requested and transmit accordingly in the next subframe in which it will transmit SRS. Alternatively, the message may explicitly identify the time at which the change occurs and, in this case, the WTRU may use the time explicitly defined. The indication from the base station may be included in a DCI format such as an UL grant. The indication may be included in the trigger for aperiodic SRS. The indication may be included in higher layer signaling such as an RRC message from the base station.

In a second solution, the WTRU may make a decision as to a transmission scheme and the WTRU or a base station may control the selection of the transmission scheme. In one variation, the WTRU may determine its preferred SRS transmission scheme, (series or parallel) and send an indication to the network to tell it which transmission scheme it prefers. The indication of the preferred scheme may be an explicit indication of preferred scheme, (i.e., series or parallel) or other indication(s) of WTRU status, (such as power headroom, an alert of reaching maximum power, and the like) which implies the preferred scheme. In response to the indication from the WTRU, the base station may send an indication to the WTRU to use a different transmission scheme, such as to change from a parallel scheme to a series scheme. The indication from the base station may be included in a DCI format such as an UL grant, in the trigger for aperiodic SRS or in higher layer signaling such as an RRC message from the base station.

Upon receipt of the indication from the base station, the WTRU may set its SRS transmission scheme to series or parallel as requested and transmit accordingly in, for example, the next subframe in which it transmits SRS. Alternatively, the message/indication from the base station may explicitly identify the time at which the change occurs and, in this case the WTRU may use the time explicitly defined.

Thresholding may be used such that the WTRU informs the base station of a newly preferred scheme after the newly preferred scheme remains the preferred scheme for some amount of time or for some number of SRS transmissions.

In another variation of the second solution, the WTRU may determine its preferred SRS transmission scheme (series or parallel). The preferred transmission scheme may be based on the WTRU's determination of required power for SRS transmission using its current SRS transmission scheme or using SRS parallel transmission scheme. The basic premise is that it is preferred to have the WTRU transmit in parallel and that it switches to series if and only if parallel operation requires more than the permitted power, based on the WTRU's ratings.

The WTRU may determine if parallel transmission is supportable. If not, it notifies the network, (for example, the base station). If the WTRU is already in the series transmission mode, then, it may continue to test to see if it can return to parallel transmission mode and may notify the network when it determines that it can.

There are several approaches for interoperating with the base station. The WTRU may announce that it will switch and switches at a predefined time. Alternatively, the WTRU may announce that it will switch and wait for an acknowledgement from the base station before switching. Alternatively, the WTRU may announce that it recommends a switch and sends a message to the base station. The base station may send a response that confirms the change, (or it may not). The WTRU may wait for the message from the base station to switch, and, if it gets the message, it may switch at the designated time. The designated time may be implied, e.g., a fixed defined time after the message. Alternatively, it may be defined explicitly in the message from the base station to the WTRU.

Described herein are examples that may use the above selection or switching approaches with respect to parallel and series transmission schemes. In an example, while using the SRS parallel transmission scheme, the WTRU may determine whether or not transmission of all its antennas in parallel, (i.e., in one symbol of one subframe), would result in exceeding maximum power, (before employing power reduction techniques to avoid exceeding maximum power). If the WTRU determines that it will exceed maximum power, the WTRU may send an indication to the network to inform it of the situation. The indication may be included in an RRC message, a MAC control element, or physical layer signaling, and may be a single bit, a headroom value, or other indication. The base station may subsequently send an indication to the WTRU to switch to series transmission.

In another example, while using the SRS series transmission scheme, the WTRU may determine whether or not transmission of all its antennas in parallel, (i.e., in one symbol of one subframe), would result in exceeding maximum power, (before employing power reduction techniques to avoid exceeding maximum power). If the WTRU determines that it will not exceed maximum power, the WTRU may send an indication to the network to inform it of the situation. The indication may be included in an RRC message, a MAC control element, or physical layer signaling, and may be a single bit, a headroom value, or other indication. The base station may subsequently send an indication to the WTRU to switch to parallel transmission.

In another example, while using the SRS parallel transmission scheme, the WTRU may determine whether or not transmission of all its antennas in parallel, (i.e., in one symbol of one subframe), would result in exceeding maximum power, (before employing power reduction techniques to avoid exceeding maximum power). If the WTRU determines that it will exceed maximum power, the WTRU may send an indication to the network to inform it that the WTRU will switch to SRS series transmission scheme. The indication may be included in an RRC message, a MAC control element, or physical layer signaling, and may be a single bit, a headroom value, or other indication. The WTRU may then set its SRS transmission scheme to series and begin using series transmission at a predefined time after it sent the change indication to the base station, such as four subframes later.

In another example, while using the SRS series transmission scheme, the WTRU may determine whether or not transmission of all its antennas in parallel, (i.e., in one symbol of one subframe), would result in exceeding maximum power, (before employing power reduction techniques to avoid exceeding maximum power). If the WTRU determines that it will not exceed maximum power, the WTRU may send an indication to the network to inform it that the WTRU will switch to SRS parallel transmission scheme. The indication may be included in an RRC message, a MAC control element, or physical layer signaling, and may be a single bit, a headroom value, or other indication. The WTRU may then set its SRS transmission scheme to parallel and begin using parallel transmission at a predefined time after it sent the change indication to the base station, such as four subframes later.

In all cases, thresholding may be used such that the WTRU may inform the base station of a newly preferred scheme after the newly preferred scheme remains the preferred scheme for some amount of time or for some number of SRS transmissions.

Described herein are methods for using the SRS transmission schemes. In an example configuration method, the subframes that may be used for SRS parallel transmission schemes and SRS series transmission schemes may be the same subframes, i.e., a WTRU may receive a configuration from the base station to use for both series and parallel transmission schemes. For example, the WTRU may receive an SRS configuration index into the SRS configuration table, (e.g., the same one as that used for LTE R8 WTRU-specific SRS or a similar one), that provides a subframe periodicity $T_{SRS}$ and subframe offset $T_{offset}$ to be used for both parallel and series transmission schemes.

The WTRU may receive a cyclic shift and/or transmission comb for one antenna from the base station. The WTRU may receive a separate cyclic shift and transmission comb for each antenna or the WTRU may derive the cyclic shift and/or transmission comb for each additional antenna from the cyclic shift and/or transmission comb of the first antenna. Derivation may be in accordance with one of the methods provided earlier herein.

The WTRU may receive additional transmission parameters from the base station such as those defined in the SoundingRS-UL-ConfigDedicated. These SRS transmission parameters such as the frequency hopping parameters, may be the same or different for the different antennas. For aperiodic SRS, duration meaning single or infinite may be unnecessary or may be replaced by a duration meaning the number of subframes in which to transmit SRS (for multi-shot).

In a second configuration method, when the parallel SRS transmission scheme is used, given the transmission subframes and the transmission parameters for the antennas, upon receipt of a trigger or while transmission is activated, the WTRU may transmit on all its antennas simultaneously using the configured parameters in the appropriate subframe(s) according to the trigger or activation to transmission rules such as those described herein.

When the series SRS transmission scheme is used, given the transmission subframes and the transmission parameters for the antennas, upon receipt of a trigger or while transmission is activated, the WTRU may transmit on one antenna in each of the subframes according to the trigger or activation to transmission rules such as those described herein. For each SRS transmission on a particular antenna, the WTRU may use the configured parameters for that antenna. Alternatively, for each SRS transmission on a particular antenna, the WTRU may use the configured parameters for the first antenna.

Described herein are methods for using parallel transmission schemes. For the parallel SRS transmission scheme for the case where a trigger results in a single transmission, given a trigger in subframe n, the WTRU may transmit SRS for all its antennas simultaneously in one of the subsequent subframes based on one of the following rules. In accordance with a rule, the WTRU may transmit in the next subframe (n+1). In accordance with another rule, it may transmit in the next cell-specific subframe, (for example, subframe '$k_{SRS}$' such that $k_{SRS}$>=n+1 and also satisfies the cell-specific SRS subframe offset and SRS periodicity configuration parameters $\lfloor n_s/2 \rfloor \mod T_{SFC} \in \Delta_{SFC}$).

In accordance with another rule, the WTRU may transmit in the next WTRU-specific subframe, (for example for FDD, subframe '$k_{SRS}$' such that $k_{SRS}$>=n+1 and also satisfies the WTRU-specific SRS subframe offset and SRS periodicity configuration parameters $(10 \cdot n_f + k_{SRS} - T_{offset}) \mod T_{SRS}=0$). These WTRU-specific subframes for aperiodic SRS may be the same as or different from those configured for periodic SRS transmission.

In accordance with another rule, the WTRU may transmit in the next cell specific subframe at least four subframes after the triggering subframe, (for example, subframe '$k_{SRS}$' such that $k_{SRS}$>=n+4 and also satisfies the cell-specific SRS subframe offset and SRS periodicity configuration parameters $\lfloor n_s/2 \rfloor \mod T_{SFC} \in \Delta_{SFC}$).

In accordance with another rule, the WTRU may transmit in the next WTRU-specific subframe at least four subframes after the triggering subframe, (for example, for FDD, subframe '$k_{SRS}$' such that $k_{SRS}$>=n+4 and also satisfies the WTRU-specific SRS subframe offset and SRS periodicity configuration parameters $(10 \cdot n_f + k_{SRS} - T_{offset}) \mod T_{SRS}=0$). These WTRU-specific subframes for aperiodic SRS may be the same as or different from those configured for periodic SRS transmission.

For the parallel SRS transmission scheme for the case where a trigger may result in multiple transmissions (i.e., multi-shot SRS transmission), given a duration of Ns subframes for transmission and a trigger in subframe n, the WTRU may transmit SRS for all of its antennas simultaneously in Ns subframes according to one of the following rules. In accordance with a rule, the WTRU may transmit in each of the next Ns subframes where the starting subframe is subframe n+1. In accordance with another rule, the WTRU may transmit in each of the next Ns cell-specific subframes where, for example, each subframe '$k_{SRS}$' is such that $k_{SRS}$>=n+1 and also satisfies the cell-specific SRS subframe offset and SRS periodicity configuration parameters $\lfloor n_s/2 \rfloor \mod T_{SFC} \in \Delta_{SFC}$.

In accordance with another rule, the WTRU may transmit in each of the next Ns WTRU-specific subframes where, for example, for FDD, each subframe '$k_{SRS}$' is such that $k_{SRS}$>=n+1 and also satisfies the WTRU-specific SRS subframe offset and SRS periodicity configuration parameters $(10 \cdot n_f + k_{SRS} - T_{offset}) \mod T_{SRS}=0$. These WTRU-specific subframes may be the same as or different from those configured for periodic SRS transmission.

In accordance with another rule, the WTRU may transmit in each of the next Ns cell specific subframes at least four subframes after the triggering subframe, where, for example, for FDD, each subframe '$k_{SRS}$' is such that $k_{SRS} \geq n+4$ and also satisfies the cell-specific SRS subframe offset and SRS periodicity configuration parameters $\lfloor n_s/2 \rfloor$ mod $T_{SFC} \in \Delta_{SFC}$.

In accordance with another rule, the WTRU may transmit in each of the next Ns WTRU-specific subframes at least four subframes after the triggering subframe, where, for example for FDD, each subframe '$k_{SRS}$' is such that $k_{SRS} \geq n+4$ and also satisfies the WTRU-specific SRS subframe offset and SRS periodicity configuration parameters $(10 \cdot n_f + k_{SRS} - T_{offset})$ mod $T_{SRS} = 0$. These WTRU-specific subframes may be the same as or different from those configured for periodic SRS transmission.

A value of Ns=1 may be used to indicate a duration of one subframe. In this case a trigger would result in SRS transmission on all antennas in one subframe which is the same as the single transmission case. A predefined value of Ns may be used to indicate continuous transmission or periodic transmission.

As an alternative to transmitting in every subframe, cell-specific subframe, or WTRU-specific subframe, the WTRU may transmit SRS in every Nth subframe, cell-specific subframe, or WTRU-specific subframe.

For the parallel SRS transmission scheme when activation/deactivation is used, given a trigger (activation) in subframe n, the WTRU may transmit SRS for all its antennas simultaneously according to one of the following rules. In accordance with a rule, the WTRU may transmit in each of the next subframes beginning with subframe n+1, until deactivation. In accordance with another rule, the WTRU may transmit in each of the next cell-specific subframes until deactivation, where, for example, each subframe '$k_{SRS}$' is such that $k_{SRS} \geq n+1$ and also satisfies the cell-specific SRS subframe offset and SRS periodicity configuration parameters $\lfloor n_s/2 \rfloor$ mod $T_{SFC} \in \Delta_{SFC}$.

In accordance with another rule, the WTRU may transmit in each of the next WTRU-specific subframes until deactivation, where, for example for FDD, each subframe '$k_{SRS}$' is such that $k_{SRS} \geq n+1$ and also satisfies the WTRU-specific SRS subframe offset and SRS periodicity configuration parameters $(10 \cdot n_f + k_{SRS} - T_{offset})$ mod $T_{SRS} = 0$. These WTRU-specific subframes may be the same as or different from those configured for periodic SRS transmission.

In accordance with another rule, the WTRU may transmit in each of the next cell specific subframes at least four subframes after the triggering subframe until deactivation, where, for example for FDD, each subframe '$k_{SRS}$' is such that $k_{SRS} \geq n+4$ and also satisfies the cell-specific SRS subframe offset and SRS periodicity configuration parameters $\lfloor n_s/2 \rfloor$ mod $T_{SFC} \in \Delta_{SFC}$.

In accordance with another rule, the WTRU may transmit in each of the next WTRU-specific subframes at least four subframes after the triggering subframe until deactivation, where, for example for FDD, each subframe '$k_{SRS}$' is such that $k_{SRS} \geq n+4$ and also satisfies the WTRU-specific SRS subframe offset and SRS periodicity configuration parameters $(10 \cdot n_f + k_{SRS} - T_{offset})$ mod $T_{SRS} = 0$. These WTRU-specific subframes may be the same as or different from those configured for periodic SRS transmission.

As an alternative to transmitting in every subframe, cell-specific subframe, or WTRU-specific subframe, the WTRU may transmit SRS in every Nth subframe, cell-specific subframe, or WTRU-specific subframe.

Described herein are methods for using series transmission schemes. For the series SRS transmission scheme using one antenna at a time, given a trigger in subframe n, the WTRU may transmit SRS for one of its antennas based on one of the following rules. In accordance with a rule, the WTRU may transmit in the next subframe (n+1). In accordance with another rule, it may transmit in the next cell-specific subframe (for example, subframe '$k_{SRS}$' such that $k_{SRS} \geq n+1$ and also satisfies the cell-specific SRS subframe offset and SRS periodicity configuration parameters $\lfloor n_s/2 \rfloor$ mod $T_{SFC} \in \Delta_{SFC}$).

In accordance with another rule, the WTRU may transmit in the next WTRU-specific subframe, (for example for FDD, subframe '$k_{SRS}$' such that $k_{SRS} \geq n+1$ and also satisfies the WTRU-specific SRS subframe offset and SRS periodicity configuration parameters $(10 \cdot n_f + k_{SRS} - T_{offset})$ mod $T_{SRS} = 0$). These WTRU-specific subframes for aperiodic SRS may be the same as or different from those configured for periodic SRS transmission.

In accordance with another rule, the WTRU may transmit in the next cell specific subframe at least four subframes after the triggering subframe, (for example, subframe '$k_{SRS}$' such that $k_{SRS} \geq n+4$ and also satisfies the cell-specific SRS subframe offset and SRS periodicity configuration parameters $\lfloor n_s/2 \rfloor$ mod $T_{SFC} \in \Delta_{SFC}$).

In accordance with another rule, the WTRU may transmit in the next WTRU-specific subframe at least four subframes after the triggering subframe, (for example for FDD, subframe '$k_{SRS}$' such that $k_{SRS} \geq n+4$ and also satisfies the WTRU-specific SRS subframe offset and SRS periodicity configuration parameters $(10 \cdot n_f + k_{SRS} - T_{offset})$ mod $T_{SRS} = 0$). These WTRU-specific subframes for aperiodic SRS may be the same as or different from those configured for periodic SRS transmission.

SRS for the different antennas may be transmitted in sequence (one transmission on one antenna per trigger) such that it is unambiguous to the WTRU and the base station as to which antenna is being used for SRS transmission in a given subframe.

As an alternative to the WTRU transmitting the SRS for the antennas in sequence, the antenna for which the WTRU may transmit SRS may be in accordance with a predefined pattern. For example, it may be based on the frequency hopping parameters, (such as in LTE R8).

For the single transmission, all antennas in sequence series SRS transmission scheme, given a trigger in subframe n, the WTRU may transmit SRS for its Na antennas in sequence, one at a time (one per subframe) according to one of the following rules. The WTRU may transmit SRS for one of the Na antennas, (cycling through them in sequence), in each of the next Na subframes where the starting subframe is subframe n+1. In accordance with another rule, the WTRU may transmit SRS for one of the Na antennas, (cycling through them in sequence), in each of the next Na cell-specific subframes where for example each subframe '$k_{SRS}$' is such that $k_{SRS} \geq n+1$ and also satisfies the cell-specific SRS subframe offset and SRS periodicity configuration parameters $\lfloor n_s/2 \rfloor$ mod $T_{SFC} \in \Delta_{SFC}$.

In accordance with another rule, the WTRU may transmit SRS for one of the Na antennas, (cycling through them in sequence), in each of the next Na WTRU-specific subframes where, for example for FDD, each subframe '$k_{SRS}$' is such that $k_{SRS} \geq n+1$ and also satisfies the WTRU-specific SRS subframe offset and SRS periodicity configuration parameters $(10 \cdot n_f + k_{SRS} - T_{offset})$ mod $T_{SRS} = 0$. These WTRU-specific subframes may be the same as or different from those configured for periodic SRS transmission.

In accordance with another rule, the WTRU may transmit SRS for one of the Na antennas, (cycling through them in sequence), in each of the next Na cell-specific subframes at least four subframes after the triggering subframe, where, for example, each subframe '$k_{SRS}$' is such that $k_{SRS}>=n+4$ and also satisfies the cell-specific SRS subframe offset and SRS periodicity configuration parameters $\lfloor n_s/2 \rfloor$ mod $T_{SFC} \in \Delta_{SFC}$.

In accordance with another rule, the WTRU may transmit SRS for one of the Na antennas, (cycling through them in sequence), in each of the next Na WTRU-specific subframes at least four subframes after the triggering subframe, where, for example, for FDD, each subframe '$k_{SRS}$' is such that $k_{SRS}>=n+4$ and also satisfies the WTRU-specific SRS subframe offset and SRS periodicity configuration parameters $(10 \cdot n_f + k_{SRS} - T_{offset})$ mod $T_{SRS}=0$. These WTRU-specific subframes may be the same as or different from those configured for periodic SRS transmission.

As an alternative to the WTRU transmitting the SRS for the antennas in sequence, the antenna for which the WTRU transmits SRS may be in accordance with a predefined pattern. For example, based on the frequency hopping parameters, (such as for LTE R8).

As an alternative to transmitting in every subframe, cell-specific subframe, or WTRU-specific subframe, WTRU may transmit SRS in every Nth subframe, cell-specific subframe, or WTRU-specific subframe.

For the multiple transmission, all antennas in sequence series SRS transmission scheme and a duration of Ns subframes for transmission, given a trigger in subframe n, the WTRU may transmit SRS for its Na antennas in sequence, one at a time (one per subframe) according to one of the following rules for aperiodic SRS transmission. The WTRU may transmit SRS for one of the Na antennas, (cycling through them in sequence), in each of the next Ns subframes where the starting subframe is subframe n+1. In accordance with another rule, the WTRU may transmit SRS for one of the Na antennas, (cycling through them in sequence), in each of the next Ns cell-specific subframes where, for example, each subframe '$k_{SRS}$' is such that $k_{SRS}>=n+1$ and also satisfies the cell-specific SRS subframe offset and SRS periodicity configuration parameters $\lfloor n_s/2 \rfloor$ mod $T_{SFC} \in \Delta_{SFC}$.

In accordance with another rule, the WTRU may transmit SRS for one of the Na antennas, (cycling through them in sequence), in each of the next Ns WTRU-specific subframes where, for example, for FDD, each subframe '$k_{SRS}$' is such that $k_{SRS}>=n+1$ and also satisfies the WTRU-specific SRS subframe offset and SRS periodicity configuration parameters $(10 \cdot n_f + k_{SRS} - T_{offset})$ mod $T_{SRS}=0$. These WTRU-specific subframes may be the same as or different from those configured for periodic SRS transmission.

In accordance with another rule, the WTRU may transmit SRS for one of the Na antennas, (cycling through them in sequence), in each of the next Ns cell specific subframes at least four subframes after the triggering subframe, where, for example, each subframe '$k_{SRS}$' is such that $k_{SRS}>=n+4$ and also satisfies the cell-specific SRS subframe offset and SRS periodicity configuration parameters $\lfloor n_s/2 \rfloor$ mod $T_{SFC} \in \Delta_{SFC}$.

In accordance with another rule, the WTRU may transmit SRS for one of the Na antennas, (cycling through them in sequence), in each of the next Ns WTRU-specific subframes at least four subframes after the triggering subframe, where, for example for FDD, each subframe '$k_{SRS}$' is such that $k_{SRS}>=n+4$ and also satisfies the WTRU-specific SRS subframe offset and SRS periodicity configuration parameters $(10 \cdot n_f + k_{SRS} - T_{offset})$ mod $T_{SRS}=0$. These WTRU-specific subframes may be the same as or different from those configured for periodic SRS transmission.

A value of Ns=1 may be used to indicate a duration of one subframe. In this case a trigger would result in SRS transmission of one antenna in one subframe, which is the same as the single transmission case. A predefined value of Ns may be used to indicate continuous transmission or periodic transmission.

As an alternative to the WTRU transmitting the SRS for the antennas in sequence, the antenna for which the WTRU may transmit SRS may be in accordance with a predefined pattern. For example, based on the frequency hopping parameters (such as in LTE R8).

As an alternative to transmitting in every subframe, cell-specific subframe, or WTRU-specific subframe, the WTRU may transmit SRS in every Nth subframe, cell-specific subframe, or WTRU-specific subframe.

In another solution for the multiple transmission, all antennas in sequence, series SRS transmission scheme and a duration of Ns subframes for transmission, given a trigger in subframe n, the WTRU may transmit SRS for its Na antennas in sequence, one at a time (one per subframe) according to one of the following rules. The WTRU may transmit SRS for one of the Na antennas, (cycling through them in sequence), in each of the next Na×Ns subframes where the starting subframe is subframe n+1. In accordance with another rule, the WTRU may transmit SRS for one of the Na antennas, (cycling through them in sequence), in each of the next Na×Ns cell-specific subframes where, for example, each subframe '$k_{SRS}$' is such that $k_{SRS}>=n+1$ and also satisfies the cell-specific SRS subframe offset and SRS periodicity configuration parameters $\lfloor n_s/2 \rfloor$ mod $T_{SFC} \in \Delta_{SFC}$.

The WTRU may transmit SRS for one of the Na antennas, (cycling through them in sequence), in each of the next Na×Ns WTRU-specific subframes where, for example, for FDD, each subframe '$k_{SRS}$' is such that $k_{SRS}>=n+1$ and also satisfies the WTRU-specific SRS subframe offset and SRS periodicity configuration parameters $(10 \cdot n_f + k_{SRS} - T_{offset})$ mod $T_{SRS}=0$. These WTRU-specific subframes may be the same as or different from those configured for periodic SRS transmission.

The WTRU may transmit SRS for one of the Na antennas, (cycling through them in sequence), in each of the next Na×Ns cell specific subframes at least four subframes after the triggering subframe, where, for example, each subframe '$k_{SRS}$' is such that $k_{SRS}>=n+4$ and also satisfies the cell-specific SRS subframe offset and SRS periodicity configuration parameters $\lfloor n_s/2 \rfloor$ mod $T_{SFC} \in \Delta_{SFC}$.

The WTRU may transmit SRS for one of the Na antennas, (cycling through them in sequence), in each of the next Na×Ns WTRU-specific subframes at least four subframes after the triggering subframe, where, for example, for FDD, each subframe '$k_{SRS}$' is such that $k_{SRS}>=n+4$ and also satisfies the WTRU-specific SRS subframe offset and SRS periodicity configuration parameters $(10 \cdot n_f + k_{SRS} - T_{offset})$ mod $T_{SRS}=0$. These WTRU-specific subframes may be the same as or different from those configured for periodic SRS transmission.

A value of Ns=1 may be used to indicate a duration of one subframe. In this case a trigger would result in SRS transmission in Na×1=Na subframes. A predefined value of Ns may be used to indicate continuous transmission or periodic transmission.

As an alternative to the WTRU transmitting the SRS for the antennas in sequence, the antenna for which the WTRU may transmit SRS may be according to a predefined pattern. For example, it may be based on the frequency hopping parameters, (such as in LTE R8).

As an alternative to transmitting in every subframe, cell-specific subframe, or WTRU-specific subframe, WTRU may transmit SRS in every Nth subframe, cell-specific subframe, or WTRU-specific subframe.

For the series SRS transmission scheme when activation/deactivation is used, given a trigger (activation) in subframe n, the WTRU may transmit SRS for its Na antennas in sequence, one at a time (one per subframe) according to one of the following rules. The WTRU may transmit SRS for one of the Na antennas, (cycling through them in sequence), in each of the next subframes beginning with subframe n+1, until deactivation. In accordance with another rule, the WTRU may transmit SRS for one of the Na antennas, (cycling through them in sequence), in each of the next cell-specific subframes where for example each subframe '$k_{SRS}$' is such that $k_{SRS} \geq n+1$ and also satisfies the cell-specific SRS subframe offset and SRS periodicity configuration parameters $\lfloor n_s/2 \rfloor \bmod T_{SFC} \in \Delta_{SFC}$, until deactivation.

In accordance with another rule, the WTRU may transmit SRS for one of the Na antennas, (cycling through them in sequence), in each of the next WTRU-specific subframes where, for example for FDD, each subframe '$k_{SRS}$' is such that $k_{SRS} \geq n+1$ and also satisfies the WTRU-specific SRS subframe offset and SRS periodicity configuration parameters $(10 \cdot n_f + k_{SRS} - T_{offset}) \bmod T_{SRS} = 0$. These WTRU-specific subframes may be the same as or different from those configured for periodic SRS transmission, until deactivation.

In accordance with another rule, the WTRU may transmit SRS for one of the Na antennas, (cycling through them in sequence), in each of the next cell specific subframes at least four subframes after the triggering subframe, where, for example, each subframe '$k_{SRS}$' is such that $k_{SRS} \geq n+4$ and also satisfies the cell-specific SRS subframe offset and SRS periodicity configuration parameters $\lfloor n_s/2 \rfloor \bmod T_{SFC} \in \Delta_{SFC}$, until deactivation.

In accordance with another rule, the WTRU may transmit SRS for one of the Na antennas, (cycling through them in sequence), in each of the next WTRU-specific subframes at least four subframes after the triggering subframe, where, for example, for FDD, each subframe '$k_{SRS}$' is such that $k_{SRS} \geq n+4$ and also satisfies the WTRU-specific SRS subframe offset and SRS periodicity configuration parameters $(10 \cdot n_f + k_{SRS} - T_{offset}) \bmod T_{SRS} = 0$. These WTRU-specific subframes may be the same as or different from those configured for periodic SRS transmission.

As an alternative to the WTRU transmitting the SRS for the antennas in sequence, the antenna for which the WTRU may transmit SRS may be according to a predefined pattern. For example, it may be based on the frequency hopping parameters, (such as in LTE R8).

As an alternative to transmitting in every subframe, cell-specific subframe, or WTRU-specific subframe, WTRU may transmit SRS in every Nth subframe, cell-specific subframe, or WTRU-specific subframe.

Described herein are methods for SRS Transmission on fewer antennas than available. Given a WTRU with Na antennas, the WTRU may receive configuration or indication from the base station to use fewer than its Na antennas when transmitting SRS. An LTE-A WTRU with multiple transmit antennas may have two modes of operation, Multiple Antenna Port Mode (MAPM) and Single Antenna Port Mode (SAPM), where a default mode of operation may be SAPM.

For MAPM, whether or not to use fewer antennas than Na when transmitting SRS may be signaled to the WTRU by the base station via physical layer or higher layer signaling. Alternatively, use of fewer than Na antennas for SRS may be predefined. For example, it may be defined that the maximum number of antennas to use for SRS is two.

When operating in MAPM, the WTRU may interpret use of fewer antennas than Na, for example, use of Nb antennas where Nb<Na, to mean operate according to the rules defined for SRS with multiple antennas such as described herein, but using Nb antennas instead of Na.

For SAPM, the WTRU may transmit SRS according to the LTE R8 specification. If the WTRU has parameters configured for SRS for MAPM, upon switching to SAPM, if not reconfigured, the WTRU may use the configured parameters for antenna 1 as its WTRU-specific parameters for SRS transmission in SAPM.

Described herein are methods for handling multiple SRS transmissions resulting from a single trigger (multi-shot transmission). SRS transmission in multiple subframes may be useful for improved measurement performance or for different antennas. SRS transmission in multiple subframes may also be useful for supporting frequency hopping. Given that a trigger may result in more than one SRS transmission, transmission in consecutive subframes may be considered. This may, however present a problem in that unless all subframes are cell-specific subframes, which are subframes in which no WTRU in the cell is permitted to transmit data in the symbol used for SRS, transmission in consecutive subframes may cause excessive interference among WTRUs transmitting SRS and WTRUs transmitting data. In the case all subframes are cell-specific subframes, the last symbol of data will be punctured by all WTRUs transmitting in the cell which may result in reduced performance or reduced capacity. The methods described, in part, provide a means for multi-shot SRS transmission that reduces the potential for interference and the need to puncture the last symbol in every subframe.

Described herein is a solution for managing the use of multiple and/or single transmissions in response to a trigger. In an example, a trigger may command Ns SRS transmissions, (Ns may be 1 or more). In another example, the network may select a value for Ns between 1 and Nmax and assign this value. This value may be a system parameter, a cell-specific parameter, or a WTRU-specific parameter, signaled to the WTRU by the base station. An aperiodic SRS trigger may include the value of Ns. This may require more bits to support the additional information. Alternatively, the value of Ns may be provided by higher layer signaling.

In another solution, let Ns be the number of SRS transmissions to occur as the result of one SRS trigger. Given a trigger, the WTRU may transmit SRS in the next cell-specific subframe and then in each of the next Ns-1 cell specific subframes. For example for FDD, given an SRS trigger in subframe 'n' the WTRU may transmit SRS (starting) in subframe '$k_{SRS}$' such that $k_{SRS} \geq n+1$ and also satisfies the cell-specific SRS subframe offset and SRS periodicity configuration parameters $\lfloor n_s/2 \rfloor \bmod T_{SFC} \in \Delta_{SFC}$. This first SRS transmission is then followed by an SRS transmission in each of the next Ns-1 subframes (after subframe $k_{SRS}$) that satisfy the cell-specific SRS subframe offset and SRS periodicity configuration parameters $\lfloor n_s/2 \rfloor \bmod T_{SFC} \in \Delta_{SFC}$. As an alternative to transmitting in every cell-specific subframe, WTRU may transmit SRS in every Nth cell-specific subframe.

For the case where SRS activation/deactivation may be used as opposed to a trigger resulting in a fixed number of SRS transmissions, in response to the activation, the WTRU may transmit SRS in the next cell-specific subframe and then in each of the next cell specific subframes until deactivation. Upon deactivation, the WTRU may stop transmitting SRS. Note that activation may be viewed as a type of trigger. For example for FDD, given an SRS activation in subframe 'n' the WTRU may transmit SRS (starting) in subframe '$k_{SRS}$' such that $k_{SRS} \geq n+1$ and also satisfies the cell-specific SRS subframe offset and SRS periodicity configuration parameters $\lfloor n_s/2 \rfloor \mod T_{SFC} \in \Delta_{SFC}$. This first SRS transmission is then followed by an SRS transmission in each of the next subframes (after subframe $k_{SRS}$) that satisfy the cell-specific SRS subframe offset and SRS periodicity configuration parameters $\lfloor n_s/2 \rfloor \mod T_{SFC} \in \Delta_{SFC}$. Upon deactivation, the WTRU may stop transmitting SRS. As an alternative to transmitting in every cell-specific subframe, WTRU may transmit SRS in every Nth cell-specific subframe.

The above solutions may be extended to the multiple antenna case. For the multiple antenna case, given a trigger, the WTRU may transmit SRS in the next cell-specific subframe and then in each of the next Ns-1 cell specific subframes. SRS may be transmitted for all antennas in the same subframe. In this case orthogonality may be achieved by cyclic shift multiplexing and/or different comb assignments. Alternatively, SRS may be transmitted for the different configured antennas such that transmission alternates among (cycles through) the configured antennas in each of the Ns subframes. As an alternative to the WTRU transmitting the SRS for the antennas in sequence, the antenna for which the WTRU transmits SRS may be in accordance with a predefined pattern. For example, it may be based on the frequency hopping parameters, (such as in LTE R8). As an alternative to transmitting in every cell-specific subframe, the WTRU may transmit SRS in every Nth cell-specific subframe.

For the multiple antenna case, where SRS activation/deactivation may be used, the WTRU may transmit SRS in the next cell-specific subframe and then in each of the next cell specific subframes until deactivation. SRS may be transmitted for all antennas in the same subframe. In this case, orthogonality may be achieved by cyclic shift multiplexing and/or different comb assignments. Alternatively, SRS may be transmitted for the different configured antennas such that transmission alternates among (cycles through) the configured antennas in each of the cell specific subframes until deactivation. As an alternative to the WTRU transmitting the SRS for the antennas in sequence, the antenna for which the WTRU may transmit SRS may be in accordance with a predefined pattern. For example, it may be based on the frequency hopping parameters, (such as in LTE R8). As an alternative to transmitting in every cell-specific subframe, WTRU may transmit SRS in every Nth cell-specific subframe.

In another solution for handling multiple transmission, let Ns be the number of SRS transmissions to occur as the result of one SRS trigger. Given a trigger in subframe n, the WTRU may transmit SRS in the next cell-specific subframe that is at least 4 subframes after the triggering subframe n (i.e., n+4 or later) and then in each of the next Ns-1 cell specific subframes. For example for FDD, given an SRS trigger in subframe 'n' the WTRU may transmit SRS (starting) in subframe '$k_{SRS}$' such that $k_{SRS} \geq n+4$ and also satisfies the cell-specific SRS subframe offset and SRS periodicity configuration parameters $\lfloor n_s/2 \rfloor \mod T_{SFC} \in \Delta_{SFC}$. This first SRS transmission is then followed by an SRS transmission in each of the next Ns-1 subframes (after subframe $k_{SRS}$) that satisfy the cell-specific SRS subframe offset and SRS periodicity configuration parameters $\lfloor n_s/2 \rfloor \mod T_{SFC} \in \Delta_{SFC}$. As an alternative to transmitting in every cell-specific subframe, the WTRU may transmit SRS in every Nth cell-specific subframe.

For the case where SRS activation/deactivation may be used as opposed to a trigger resulting in a fixed number of SRS transmissions, in response to the activation, the WTRU may transmit SRS in the next cell-specific subframe that is at least four subframes after the triggering subframe n, (i.e., n+4 or later) and then in each of the next cell specific subframes until deactivation. Upon deactivation, the WTRU may stop transmitting SRS. Activation/deactivation may be viewed as a type of trigger. For example for FDD, given an SRS activation in subframe 'n' the WTRU may transmit SRS (starting) in subframe '$k_{SRS}$' such that $k_{SRS} \geq n+4$ and also satisfies the cell-specific SRS subframe offset and SRS periodicity configuration parameters $\lfloor n_s/2 \rfloor \mod T_{SFC} \in \Delta_{SFC}$. This first SRS transmission may then be followed by an SRS transmission in each of the next subframes (after subframe $k_{SRS}$) that satisfy the cell-specific SRS subframe offset and SRS periodicity configuration parameters $\lfloor n_s/2 \rfloor \mod T_{SFC} \in \Delta_{SFC}$. Upon deactivation, the WTRU may stop transmitting SRS. As an alternative to transmitting in every cell-specific subframe, WTRU may transmit SRS in every Nth cell-specific subframe.

The above two examples may be extended to the multiple antenna case. Given a trigger in subframe n, the WTRU may transmit SRS in the next cell-specific subframe that is at least four subframes after the triggering subframe n, (i.e., n+4 or later), and then in each of the next Ns-1 cell specific subframes. SRS may be transmitted for all antennas in the same subframe. In this case, orthogonality may be achieved by cyclic shift multiplexing and/or different comb assignments. Alternatively, SRS may be transmitted for the different configured antennas such that transmission alternates among (cycles through) the configured antennas in each of the Ns subframes. As an alternative to the WTRU transmitting the SRS for the antennas in sequence, the antenna for which the WTRU transmits SRS may be in accordance with a predefined pattern. For example, it may be based on the frequency hopping parameters, (such as in LTE R8). As an alternative to transmitting in every cell-specific subframe, the WTRU may transmit SRS in every Nth cell-specific subframe.

The activation/deactivation case may also be extended to the multiple antenna case. Given a trigger (activation) in subframe n, the WTRU may transmit SRS in the next cell-specific subframe that is at least four subframes after the triggering subframe n (i.e., n+4 or later) and then in each of the next cell specific subframes until deactivation. SRS may be transmitted for all antennas in the same subframe. In this case orthogonality may be achieved by cyclic shift multiplexing and/or different comb assignments. Alternatively, SRS may be transmitted for the different configured antennas such that transmission alternates among (cycles through) the configured antennas in each of the cell specific subframes until deactivation. As an alternative to the WTRU transmitting the SRS for the antennas in sequence, the antenna for which the WTRU transmits SRS may be according to a predefined pattern. For example, it may be based on the frequency hopping parameters, (such as in LTE R8). As an alternative to transmitting in every cell-specific subframe, the WTRU may transmit SRS in every Nth cell-specific subframe.

In another solution for handling multiple transmissions, let Ns be the number of SRS transmissions to occur as the result of one SRS trigger. Given a trigger, the WTRU may transmit SRS in the next WTRU-specific subframe and then in each of the next Ns−1 WTRU-specific subframes. For example for FDD, given an SRS trigger in subframe 'n' the WTRU may transmit SRS (starting) in subframe '$k_{SRS}$' such that $k_{SRS} \geq n+1$ and also satisfies the WTRU-specific SRS subframe offset and SRS periodicity configuration parameters $(10 \cdot n_f + k_{SRS} - T_{offset}) \bmod T_{SRS} = 0$. This first SRS transmission may then be followed by an SRS transmission in each of the next Ns−1 subframes (after subframe $k_{SRS}$) that satisfy the WTRU-specific SRS subframe offset and SRS periodicity configuration parameters $(10 \cdot n_f + k_{SRS} - T_{offset}) \bmod T_{SRS} = 0$. As an alternative to transmitting in every WTRU-specific subframe, the WTRU may transmit SRS in every Nth WTRU-specific subframe.

For the case where SRS activation/deactivation may be used as opposed to a trigger resulting in a fixed number of SRS transmissions, in response to the activation, the WTRU may transmit SRS in the next WTRU-specific subframe and then in each of the next WTRU-specific subframes until deactivation. Upon deactivation, the WTRU stops transmitting SRS. Activation may be viewed as a type of trigger. For example for FDD, given an SRS activation in subframe 'n' the WTRU may transmit SRS (starting) in subframe '$k_{SRS}$' such that $k_{SRS} \geq n+1$ and also satisfies the WTRU-specific SRS subframe offset and SRS periodicity configuration parameters $(10 \cdot n_f + k_{SRS} - T_{offset}) \bmod T_{SRS} = 0$. This first SRS transmission is then followed by an SRS transmission in each of the next subframes (after subframe $k_{SRS}$) that satisfy the WTRU-specific SRS subframe offset and SRS periodicity configuration parameters $(10 \cdot n_f + k_{SRS} - T_{offset}) \bmod T_{SRS} = 0$. Upon deactivation, the WTRU may stop transmitting SRS. As an alternative to transmitting in every WTRU-specific subframe, the WTRU may transmit SRS in every Nth WTRU-specific subframe.

In the two preceding solutions, the WTRU-specific subframes may be the same as those defined for LTE R8 periodic SRS or they may be defined by a new configuration provided by the network to the WTRU for aperiodic SRS. For the solutions given above, if a new aperiodic SRS configuration is used, it is assumed that periodicity and offset parameters may be provided as they are for periodic SRS.

The above solutions may be extended to the multiple antenna case. For the multiple antenna case, given a trigger, the WTRU may transmit SRS in the next WTRU-specific subframe and then in each of the next Ns−1 WTRU-specific subframes. SRS may be transmitted for all antennas in the same subframe. In this case, orthogonality may be achieved by cyclic shift multiplexing and/or different comb assignments. Alternatively, SRS may be transmitted for the different configured antennas such that transmission alternates among (cycles through) the configured antennas in each of the Ns subframes. As an alternative to the WTRU transmitting the SRS for the antennas in sequence, the antenna for which the WTRU transmits SRS may be in accordance with a predefined pattern. For example, it may be based on the frequency hopping parameters, (such as in LTE R8/9). As an alternative to transmitting in every WTRU-specific subframe, the WTRU may transmit SRS in every Nth WTRU-specific subframe.

For the multiple antenna case, where SRS activation/deactivation may be used, the WTRU may transmit SRS in the next WTRU-specific subframe and then in each of the next WTRU-specific subframes until deactivation. SRS may be transmitted for all antennas in the same subframe. In this case, orthogonality may be achieved by cyclic shift multiplexing and/or different comb assignments. Alternatively, SRS may be transmitted for the different configured antennas such that transmission alternates among (cycles through) the configured antennas in each of the WTRU-specific subframes until deactivation. As an alternative to the WTRU transmitting the SRS for the antennas in sequence, the antenna for which the WTRU may transmit SRS may be in accordance with a predefined pattern. For example, it may be based on the frequency hopping parameters, (such as in LTE R8). As an alternative to transmitting in every WTRU-specific subframe, the WTRU may transmit SRS in every Nth WTRU-specific subframe.

The above solutions may be extended to the multiple antenna case in which each antenna may have its own antenna-specific subframe configuration. In this case, given a trigger, the WTRU may transmit SRS for each antenna, (that is configured for SRS), in the next antenna-specific subframe for that antenna and then in each of the next Ns−1 antenna-specific subframes for that antenna. If the subframe parameters are the same for all antennas, SRS may be transmitted for all antennas in the same subframe. In this case orthogonality may be achieved by cyclic shift multiplexing and/or different comb assignments. As an alternative to transmitting in every antenna-specific subframe, the WTRU may transmit SRS in every Nth antenna-specific subframe.

The activation/deactivation solution may be extended to the multiple antenna case in which each antenna has an antenna-specific subframe configuration. In this case, given a trigger (activation), the WTRU may transmit SRS for each antenna, (that is configured for SRS), in the next antenna-specific subframe for that antenna and then in each of the next antenna-specific subframes for that antenna until deactivation. If the subframe parameters are the same for all antennas, SRS may be transmitted for all antennas in the same subframe. In this case orthogonality may be achieved by cyclic shift multiplexing and/or different comb assignments. As an alternative to transmitting in every antenna-specific subframe, the WTRU may transmit SRS in every Nth antenna-specific subframe.

In another solution for handling multiple transmissions, let Ns be the number of SRS transmissions to occur as the result of one SRS trigger. Given a trigger in subframe n, the WTRU may transmit SRS in the next WTRU-specific subframe that is at least four subframes after the triggering subframe n (i.e., n+4 or later) and then in each of the next Ns−1 WTRU-specific subframes. For example for FDD, given an SRS trigger in subframe 'n' the WTRU may transmit SRS (starting) in subframe '$k_{SRS}$' such that $k_{SRS} \geq n+4$ and also satisfies the WTRU-specific SRS subframe offset and SRS periodicity configuration parameters $(10 \cdot n_f + k_{SRS} - T_{offset}) \bmod T_{SRS} = 0$. This first SRS transmission may then be followed by an SRS transmission in each of the next Ns−1 subframes (after subframe $k_{SRS}$) that satisfy the WTRU-specific SRS subframe offset and SRS periodicity configuration parameters $(10 \cdot n_f + k_{SRS} - T_{offset}) \bmod T_{SRS} = 0$. As an alternative to transmitting in every WTRU-specific subframe, the WTRU may transmit SRS in every Nth WTRU-specific subframe.

For the case where SRS activation/deactivation may be used as opposed to a trigger resulting in a fixed number of SRS transmissions, in response to the activation, the WTRU may transmit SRS in the next WTRU-specific subframe that is at least four subframes after the triggering subframe n (i.e., n+4 or later) and then in each of the next WTRU-specific subframes until deactivation. Upon deactivation, the WTRU may stop transmitting SRS. Activation may be viewed as a type of trigger. For example for FDD, given an SRS activation in subframe 'n' the WTRU may transmit SRS (starting) in subframe '$k_{SRS}$' such that $k_{SRS} >= n+4$ and also satisfies the WTRU-specific SRS subframe offset and SRS periodicity configuration parameters $(10 \cdot n_f + k_{SRS} - T_{offset}) \bmod T_{SRS} = 0$. This first SRS transmission may then be followed by an SRS transmission in each of the next subframes (after subframe $k_{SRS}$) that satisfy the WTRU-specific SRS subframe offset and SRS periodicity configuration parameters $(10 \cdot n_f + k_{SRS} - T_{offset}) \bmod T_{SRS} = 0$. Upon deactivation, the WTRU may stop transmitting SRS. As an alternative to transmitting in every WTRU-specific subframe, the WTRU may transmit SRS in every Nth WTRU-specific subframe.

In the above two solutions, the WTRU-specific subframes may be the same as those defined for LTE R8 periodic SRS or they may be defined by another configuration provided by the network to the WTRU for aperiodic SRS.

For the solutions presented above, if a new aperiodic SRS configuration is used, it is assumed that periodicity and offset parameters may be provided as they are for periodic SRS.

The above solutions may be extended to the multiple antenna case. For the multiple antenna case, given a trigger in subframe n, the WTRU may transmit SRS in the next WTRU-specific subframe that is at least four subframes after the triggering subframe n (i.e., n+4 or later) and then in each of the next Ns−1 WTRU-specific subframes. SRS may be transmitted for all antennas in the same subframe. In this case, orthogonality may be achieved by cyclic shift multiplexing and/or different comb assignments. Alternatively, SRS may be transmitted for the different configured antennas such that transmission alternates among (cycles through) the configured antennas in each of the Ns subframes. As an alternative to the WTRU transmitting the SRS for the antennas in sequence, the antenna for which the WTRU transmits SRS may be in accordance with a predefined pattern. For example, it may be based on the frequency hopping parameters, (such as in LTE R8). As an alternative to transmitting in every WTRU-specific subframe, the WTRU may transmit SRS in every Nth WTRU-specific subframe.

For the multiple antenna case, where SRS activation/deactivation may be used, given a trigger (activation) in subframe n, the WTRU may transmit SRS in the next WTRU-specific subframe that is at least four subframes after the triggering subframe n (i.e., n+4 or later) and then in each of the next WTRU-specific subframes until deactivation. SRS may be transmitted for all antennas in the same subframe. In this case, orthogonality may be achieved by cyclic shift multiplexing and/or different comb assignments. Alternatively, SRS may be transmitted for the different configured antennas such that transmission alternates among (cycles through) the configured antennas in each of the WTRU-specific subframes until deactivation. As an alternative to the WTRU transmitting the SRS for the antennas in sequence, the antenna for which the WTRU may transmit SRS may be in accordance with a predefined pattern. For example, it may be based on the frequency hopping parameters, (such as in LTE R8). As an alternative to transmitting in every WTRU-specific subframe, the WTRU may transmit SRS in every Nth WTRU-specific subframe.

The above solutions may be extended to the multiple antenna case in which each antenna may have an antenna-specific subframe configuration. In this case, given a trigger, the WTRU may transmit SRS for each antenna (that is configured for SRS) in the next antenna-specific subframe that is at least four subframes after the triggering subframe n (i.e., n+4 or later) for that antenna and then in each of the next Ns−1 antenna-specific subframes for that antenna. If the subframe parameters are the same for all antennas, SRS may be transmitted for all antennas in the same subframe. In this case orthogonality may be achieved by cyclic shift multiplexing and/or different comb assignments. As an alternative to transmitting in every antenna-specific subframe, the WTRU may transmit SRS in every Nth antenna-specific subframe.

The activation/deactivation solution may be extended to the multiple antenna case in which each antenna has an antenna-specific subframe configuration. In this case, given a trigger (i.e., activation), the WTRU may transmit SRS for each antenna, (that is configured for SRS), in the next antenna-specific subframe that is at least four subframes after the triggering subframe n (i.e., n+4 or later) for that antenna and then in each of the next antenna-specific subframes for that antenna until deactivation. If the subframe parameters are the same for all antennas, SRS may be transmitted for all antennas in the same subframe. In this case orthogonality may be achieved by cyclic shift multiplexing and/or different comb assignments. As an alternative to transmitting in every antenna-specific subframe, the WTRU may transmit SRS in every Nth antenna-specific subframe.

In another solution for handling multiple transmissions, the number of SRS transmissions to occur as a result of one SRS trigger, Ns, may be a configuration parameter provided by the network as part of a modified WTRU-specific configuration to be used by WTRUs supporting aperiodic SRS. Alternatively, it may be provided with the trigger. For example, as part of the DCI format, (e.g., an UL grant), that triggers the SRS.

In another solution for handling multiple transmissions, activation/deactivation may be used such that once SRS transmission is activated, SRS transmission continues until it is deactivated. Different methods of activation/deactivation are defined below. Activation may be viewed as a type of trigger.

In one example method, activation may be a toggle mechanism using a special DCI format, (e.g., a special UL grant), which may be understood by the WTRU to be the activation/deactivation. For example, whenever this DCI format, (e.g., UL grant), may be received, it is understood by the WTRU to mean that if aperiodic SRS is inactive, then activate it and if aperiodic SRS is active, then deactivate it.

In another example method, activation may be one explicit bit indicating activation or deactivation. This bit may be in a DCI format such as a special or modified UL grant. For example, a single bit may be used for activate/deactivate. One state of the bit may represent activate and the other state may represent deactivate. The first time the bit is received in the activate state, the WTRU may interpret it to mean activate aperiodic SRS and begin transmitting SRS, (such as in accordance with any of the solutions relating to handling activation/deactivation described herein). If the bit is received again in the activate state, the WTRU may continue to transmit SRS. If the bit is received in the deactivate state, the WTRU may stop transmitting SRS.

In the solutions described herein that refer to WTRU-specific subframes, these WTRU-specific subframes may be the same as those currently defined for LTE R8 for periodic SRS, or they may be SRS transmission subframes that are specifically defined and configured for aperiodic SRS.

Described herein are methods for handling multiple component carriers (CCs). Aperiodic SRS may be transmitted on the CC associated with the UL grant containing the SRS trigger. However, in support of scheduling decisions for future grants, it may be advantageous to the base station to be able to obtain measurements for a CC different from the one for which it provided an UL grant. Therefore methods are described herein that, in part, may trigger SRS transmission on more than just the CC associated with the UL grant. Moreover, since periodic SRS as defined for LTE R8 may not include support for multiple CCs, the described methods, in part, may handle periodic SRS transmissions in the context of multiple CCs.

In a solution for handling CCs, the WTRU may be configured to transmit on CCs other than the one associated with the UL grant when the UL grant is used as a trigger. For example, the WTRU may be configured to transmit SRS on all active UL CCs. In another example, the WTRU may be configured to transmit SRS on all UL CCs. The network may send RRC signaling to the WTRU to configure on which of the CCs to transmit SRS. The options may include the CC associated with the UL grant, all UL CCs, and all active UL CCs. Alternatively, physical layer signaling such as the DCI format that is (or includes) the trigger may include this configuration. Alternatively, it may be predefined as to whether the WTRU should transmit SRS on all UL CCs or all active UL CCs. The trigger, (e.g., UL grant or other DCI format), or higher layer signaling may designate that transmission of SRS may be cycled through the CCs configured for SRS transmission. In that case, the WTRU may transmit SRS for the configured CCs, cycling through the CCs, in the next subframes that satisfy the defined trigger to transmission subframe relationship.

In another solution for handling CCs, for the case in which there is PUSCH or PUCCH data in the subframe in which SRS may be transmitted, the WTRU may transmit SRS on the same CC(s) as the CC(s) being used for the PUSCH or PUCCH transmission.

In another solution for handling CCs, for the case in which there is no PUSCH and no PUCCH data in the subframe in which the SRS will be transmitted, the WTRU may transmit SRS on the same CC(s) as the CC(s) last used for PUSCH transmission. Alternatively, for the case in which there is no PUSCH and no PUCCH data in the subframe in which the SRS will be transmitted, the WTRU may transmit SRS on the same CC(s) as the CC(s) last used for either PUSCH and/or PUCCH transmission.

Described herein are methods for the specification of the bandwidth (BW) for the SRS transmission. SRS transmission in LTE R10 or LTE-A may be more flexible in locations/bandwidth than LTE R8 periodic SRS. The methods described herein may specify the locations/bandwidth. For the case of an UL grant being used for the aperiodic SRS trigger, the WTRU may interpret the resource allocation in the UL grant to be the location/bandwidth in which the WTRU should transmit SRS. For example, the WTRU may obtain the resource blocks (RBs) in which it should transmit SRS using the resource allocation fields in the DCI format. The WTRU may interpret the UL grant to mean transmit SRS in the subframe, (per the defined relationship of trigger to subframe), in the last symbol within the physical resource blocks (PRBs) assigned in the resource allocation of that UL grant. Within the PRBs, the transmission may still be a comb, (similar to LTE R8), and an assigned cyclic shift may be used for each SRS transmission. One comb and one cyclic shift may be used per SRS transmission. Transmission on multiple antennas may be considered multiple SRS transmissions. The WTRU may interpret these possibilities and perform the SRS transmission accordingly.

Described herein are methods for handling periodic SRS. For periodic SRS, the WTRU may transmit SRS in WTRU-specific subframes as defined for LTE R8. The WTRU may transmit SRS on one antenna or two antennas as defined for LTE R8 even if the WTRU has more than two antennas. Alternatively, the WTRU may transmit on all antennas in sequence, i.e., cycle through the antennas. The antenna on which to transmit may be determined by the subframe number of the WTRU-specific subframe on which the transmission will be made. It may be configurable, such as by RRC signaling from the network, as to whether to follow the LTE R8 rules or to cycle through all the antennas. As an alternative to the WTRU transmitting the SRS for the antennas in sequence, the antenna for which the WTRU transmits SRS may be in accordance with a predefined pattern. For example, it may be based on the frequency hopping parameters, (such as in LTE R8).

In another solution for periodic SRS, in a WTRU-specific subframe, the WTRU may transmit SRS on all active UL CCs, or, alternatively, on all UL CCs. It may be configurable, such as by RRC signaling from the network, as to whether to transmit SRS on all UL CCs or all active UL CCs. Alternatively, whether the WTRU transmits SRS on all active UL CCs, or, alternatively, on all UL CCs may be based on a predefined rule.

In another solution, for the case in which there is PUSCH or PUCCH data in the subframe in which SRS will be transmitted, the WTRU may transmit SRS on the same CC(s) as the CC(s) being used for the PUSCH or PUCCH transmission.

In another solution, for the case in which there is no PUSCH and no PUCCH data in the subframe in which the SRS will be transmitted, the WTRU may transmit SRS on the same CC(s) as the CC(s) last used for PUSCH transmission. Alternatively, for the case in which there is no PUSCH and no PUCCH data in the subframe in which the SRS will be transmitted, the WTRU may transmit SRS on the same CC(s) as the CC(s) last used for either PUSCH and/or PUCCH transmission.

Described herein are solutions that relate to when to transmit SRS in response to a trigger. In one solution, given a trigger in subframe n, (such as an UL grant), the WTRU may transmit SRS in the subframe that is four subframes after the triggering subframe n (i.e., subframe n+4) if and only if that subframe is a WTRU-specific subframe. For example for FDD, an SRS trigger in subframe 'n' results in an SRS transmission in subframe n+4 if and only if subframe n+4 satisfies the WTRU-specific SRS subframe offset and SRS periodicity configuration parameters $(10 \cdot n_f + k_{SRS} - T_{offset}) \bmod T_{SRS} = 0$.

In another solution, given a trigger in subframe n, (such as an UL grant), the WTRU may transmit SRS in the subframe that is four subframes after the triggering subframe n (i.e., subframe n+4) if and only if that subframe is an antenna-specific subframe.

Described herein are methods for extending the LTE R8/9 antenna information elements to support multiple antennas. Antenna information elements that may be used in LTE R8/9 RRC signaling are shown in Table 13.

TABLE 13

```
-- ASN1START
AntennaInfoCommon : :=            SEQUENCE {
    antennaPortsCount             ENUMERATED {an1, an2, an4, spare1}
}
AntennaInfoDedicated : :=         SEQUENCE {
    transmissionMode              ENUMERATED {
                                  tm1, tm2, tm3, tm4, tm5, tm6,
                                  tm7, tm8-v9x0 } ,
    codebookSubsetRestriction         CHOICE {
        n2TxAntenna-tm3               BIT STRING (SIZE (2) ),
        n4TxAntenna-tm3               BIT STRING (SIZE (4) ),
        n2TxAntenna-tm4               BIT STRING (SIZE (6) ),
        n4TxAntenna-tm4               BIT STRING (SIZE (64) ),
        n2TxAntenna-tm5               BIT STRING (SIZE (4) ),
        n4TxAntenna-tm5               BIT STRING (SIZE (16) ),
        n2TxAntenna-tm6               BIT STRING (SIZE (4) ),
        n4TxAntenna-tm6               BIT STRING (SIZE (16) )
    }       OPTIONAL,                                            -- Cond
TM
    ue-TransmittAntennaSelection      CHOICE{
        release                       NULL,
        setup                         ENUMERATED {closedLoop, openLoop}
    }
}
AntennaInfoDedicated-v9x0 : :=    SEQUENCE {
    codebookSubsetRestriction-v9x0    CHOICE {
        n2TxAntenna-tm8-r9            BIT STRING (SIZE (6) ) ,
        n4TxAntenna-tm8-r9            BIT STRING (SIZE (32) )
    }       OPTIONAL                                             -- Cond
PMIRI
}
-- ASN1STOP
```

In LTE R8/9, a WTRU with two antennas may only transmit using one antenna at a time. The IE ue-TransmittAntennaSelection may be used to configure how the WTRU determines from which antenna port to transmit. In one solution for LTE R10, the antenna selection parameter may be used in a manner similar to that used in LTE R8/9, but may be extended to support LTE-A scenarios, such as supporting more than two antennas. In another solution, the antenna selection parameter may be used to specify whether the WTRU may use the parallel, (multiple antennas in one subframe), or series, (one antenna in each subframe), transmission scheme for SRS. For example, one of the two LTE R8/9 values may be redefined to mean parallel and the other may be redefined to mean series.

Described herein are power related solutions for SRS on multiple CCs. The power setting for SRS transmission, (in aperiodic SRS transmission and/or periodic SRS transmission) in subframe i on CC c may be expressed as:

$$P_{SRS}(i, c) = \min\{P_{CMAX}(c), P_{SRS\_offset}(c) + 10\log10(M_{SRS}, c) + P_{O\_PUSCH}(j, c) + \alpha(j, c) \cdot PL + f(i, c)\}$$

Equation 3

If the sum of the SRS power levels on multiple CCs would exceed the WTRU maximum configured transmit power, Pcmax, alternatively Ppowerclass, the WTRU may do one of the following where in all of the solutions, Pcmax may be replaced by the maximum power of the WTRU's powerclass, Ppowerclass. In one solution, the WTRU may reduce the SRS power equally, (or proportional to SRS BW), on each CC to comply with the maximum power limitation, i.e., $$\sum_c P_{SRS}(i, c) \le P_{CMAX}.$$

In another solution, the WTRU may scale the SRS power on each CC such as $$\sum_c w_c \cdot P_{SRS}(i, c) \le P_{CMAX}$$

where $w_c$ is a scaling factor for SRS on CC c subject to $$\sum_c w_c = 1.$$

For example, $w_c$ may be configured by higher layers or the base station.

In another solution, the WTRU may drop the SRS transmission on some of the CCs such that $$\sum_{c' \in \{not\ dropped\ CCs\}} P_{SRS}(i, c') \le P_{CMAX}.$$

Which CC(s) may be dropped may be configured or pre-defined, (for example, based on the priority of the CCs). For example, the WTRU may drop the CC(s) on which there is no PUSCH and/or no PUCCH. Alternatively, the WTRU may autonomously determine which CC(s) needs to be dropped. For example, the WTRU may drop the CC(s) on which there is no PUSCH and/or no PUCCH.

In another solution, the WTRU may transmit SRS only on the CC associated with the UL grant. That is, the WTRU may drop SRS transmission all the other CCs.

Described herein are WTRU procedures for handling SRS and other channel(s) transmissions in carrier aggregation (CA). In LTE R8/9, when a WTRU's SRS transmission and other physical channel transmission happen to coincide in the same (SRS) subframe, there are rules for the WTRU to avoid simultaneously transmitting SRS and other channel(s) in the last OFDM symbol in the same subframe. This maintains the single carrier property, such that when both SRS and PUSCH of a WTRU are scheduled to be transmitted in the same subframe, (which may occur in an SRS cell-specific subframe), the last OFDM symbol of the subframe may not be used for PUSCH transmission by the WTRU. If SRS and PUCCH format 2/2a/2b transmissions of a WTRU happen to coincide in the same subframe, the WTRU may drop SRS. When SRS transmission and PUCCH transmission carrying ACK/NACK and/or positive SR of a WTRU happen to coincide in the same subframe, and the parameter ackNackSRS-SimultaneousTransmission is FALSE, the WTRU may drop SRS. Otherwise, (i.e., ackNackSRS-Simultaneous Transmission="TRUE"), the WTRU may transmit SRS and PUCCH with the shortened format.

In addition, if PUSCH of a WTRU is scheduled to be transmitted in an SRS cell specific subframe and SRS transmission is not scheduled in that subframe for that WTRU, the WTRU may still not transmit PUSCH in the last OFDM symbol of the subframe if the BW of the PUSCH even partially overlaps the BW of the SRS configured in the cell, (this is to avoid interference with an SRS that may be transmitted by another WTRU in the cell). If there is no overlap, the WTRU may transmit the PUSCH in the last OFDM symbol.

In LTE R10, PUCCH may be transmitted only on the primary cell (PCell) by the WTRU and PUSCH may be scheduled on one or more activated serving cell(s). In addition, the WTRU may be configured to transmit SRS on a per serving cell (i.e., CC) basis. If in a given subframe, the WTRU may transmit SRS on one or more serving cells and PUSCH on one or more serving cells and PUCCH on one or more serving cells, (currently allowed only on the primary serving cell), there may be multiple transmissions in the last OFDM symbol which may result in the WTRU exceeding maximum power in that symbol. The methods described herein, in part, avoid or reduce the occurrence of the maximum power condition and/or address the maximum power condition.

Described herein are methods for SRS(s) and PUSCH(s) transmissions. There may be a case where the WTRU is scheduled to transmit PUSCH(s) on one or more serving cell(s) in a subframe and is also scheduled to transmit SRS(s) on one or more serving cell(s) in that subframe and/or the subframe is an SRS cell specific subframe for one or more serving cells for which the WTRU is not scheduled to transmit SRS. For example, the WTRU may be scheduled, (e.g., via UL grant), to transmit PUSCH on the primary cell, (or a secondary cell), and may be scheduled, (e.g., via periodic scheduling or aperiodic trigger), to transmit SRS(s) in the same subframe on a serving cell, (the primary cell or a secondary cell). The methods or solutions described herein, in part, handle these scheduling conflicts. In these examples, two cells are used for illustration purposes, Cell1 and Cell2, where Cell1 and Cell2 may each be any one of the serving cells (primary or secondary); the solutions may be applied to any number of cells.

In a solution, when a WTRU may be scheduled to transmit PUSCH on a serving cell, (for example Cell 1), in a serving cell specific SRS subframe of one or more serving cells, and the WTRU may be scheduled to transmit SRS on at least one of the serving cells in that subframe, then the WTRU may not transmit PUSCH in the last OFDM symbol of the subframe on Cell 1.

In another solution, when a WTRU may be scheduled to transmit PUSCH on a serving cell, (for example Cell 1), in a serving cell specific SRS subframe of one or more serving cells, and the WTRU is not scheduled to transmit SRS on any serving cell in that subframe, then the WTRU may not transmit PUSCH in the last OFDM symbol of the subframe on Cell 1 if the PUSCH resource allocation, (for Cell 1), even partially overlaps with the SRS bandwidth configuration for any of the serving cells for which the subframe is a SRS cell specific subframe.

In another solution, the WTRU may follow one or more rules for one or more of the cases described for this solution. In a first case, PUSCH is on Cell 1 and SRS is on Cell 1. When the WTRU is scheduled to transmit PUSCH on a serving cell, (for example Cell 1), in a serving cell specific SRS subframe of that same cell and the WTRU is also scheduled to transmit SRS for that serving cell (Cell 1) in that subframe, one of the following rules may be used. In accordance with a first rule, there may be no change to the LTE R8/9 rule and as such the WTRU does not transmit PUSCH in the last OFDM symbol of the subframe on Cell 1.

In accordance with a second rule, the LTE R8 rule may be applied with a modification in that the WTRU may not transmit PUSCH in the last OFDM symbol of the subframe on Cell 1 if the PUSCH resource allocation, (for Cell 1), even partially overlaps with the SRS bandwidth configuration for Cell 1. Otherwise, the WTRU may transmit both PUSCH and SRS in the same subframe where the last OFDM symbol may also be used for the PUSCH transmission. In this case a maximum power procedure may be needed to handle simultaneous SRS and PUSCH transmissions as described herein.

In a second case, PUSCH is on Cell 1, SRS is on Cell 2, and the subframe to transmit in is not an SRS cell-specific subframe on Cell 1. When the WTRU is scheduled to transmit PUSCH on a serving cell, (for example Cell 1), in a non-SRS cell specific subframe, (i.e., not a serving cell specific SRS subframe of the same cell) and the WTRU is also scheduled to transmit SRS for another serving cell, (for example Cell 2), in that subframe, one or more of the following rules may be used. In accordance with a first rule, rule 1, the WTRU may not transmit PUSCH in the last OFDM symbol on Cell 1 to avoid potential power issues. In accordance with rule two, the WTRU may prepare to transmit PUSCH in Cell 1 and addresses a maximum power issue in the last OFDM symbol if it occurs or drops SRS, (one or more if there are multiple SRS). In accordance with rule three, the WTRU may prepare to transmit PUSCH in Cell 1 and if there are any maximum power issues in the last symbol, the WTRU may not transmit PUSCH in the last OFDM symbol on Cell 1, (in this case the base station may need to determine what the WTRU did for PUSCH by, for example, blind detection).

In a third case, PUSCH is on Cell 1, the subframe to transmit in is a SRS cell specific subframe for Cell 1, but no SRS transmission is scheduled for this WTRU. When the WTRU is scheduled to transmit PUSCH on a serving cell, (for example Cell 1), in a serving cell specific SRS subframe of that same cell, but is not scheduled to transmit SRS for that serving cell (Cell 1) in that subframe, one or more of the following rules may be used. In accordance with a first rule, the LTE R8/9 rule, described as follows, may be applied. The WTRU does not transmit PUSCH in the last OFDM symbol of the subframe on Cell 1 if the PUSCH resource allocation (for Cell 1) even partially overlaps with the SRS bandwidth configuration for Cell 1. Otherwise, the WTRU may transmit PUSCH normally, (including in the last OFDM symbol) as in LTE R8.

In a fourth case, PUSCH is on Cell 1, the subframe to transmit in is an SRS cell-specific subframe for Cell 2, but not for Cell 1, and no SRS transmission is scheduled. When the WTRU is scheduled to transmit PUSCH on a serving cell, (for example Cell 1), in a non-SRS cell specific subframe, (i.e., not a serving cell specific SRS subframe of the same cell) and the same subframe is a serving cell specific SRS subframe of another serving cell, (for example Cell 2), but no SRS transmission occurs (on Cell 2) in the subframe for this WTRU, then, there is no maximum power issue in this case due to combined PUSCH and SRS. Therefore the WTRU may transmit PUSCH normally.

In a fifth case, PUSCH is on Cell 1, the subframe is an SRS cell specific subframe for both Cell 1 and Cell 2, SRS transmission is scheduled in this subframe for Cell 2, but not Cell 1. When the WTRU is scheduled to transmit PUSCH on a serving cell, (for example Cell 1), in a serving cell specific SRS subframe of that same cell, but is not scheduled to transmit SRS for that serving cell (Cell 1) in that subframe, while the same subframe is a serving cell specific SRS subframe of another serving cell, (for example Cell 2), where this WTRU transmits SRS on that cell (Cell 2), one or more of the following rules may be used. In accordance with a first rule, the WTRU may not transmit PUSCH in the last OFDM symbol of the subframe on Cell 1 if the PUSCH resource allocation, (for Cell 1), even partially overlaps with the SRS bandwidth configuration for Cell 1. Otherwise, the WTRU may transmit PUSCH normally, (including in the last OFDM symbol), on Cell 1. In this case, a maximum power procedure may be needed to handle simultaneous SRS (on Cell 2) and PUSCH transmissions (on Cell 1) as described herein. In accordance with a second rule, to avoid a possible power issue, the WTRU may not transmit PUSCH in the last OFDM symbol of the subframe on Cell 1.

Figure 9:
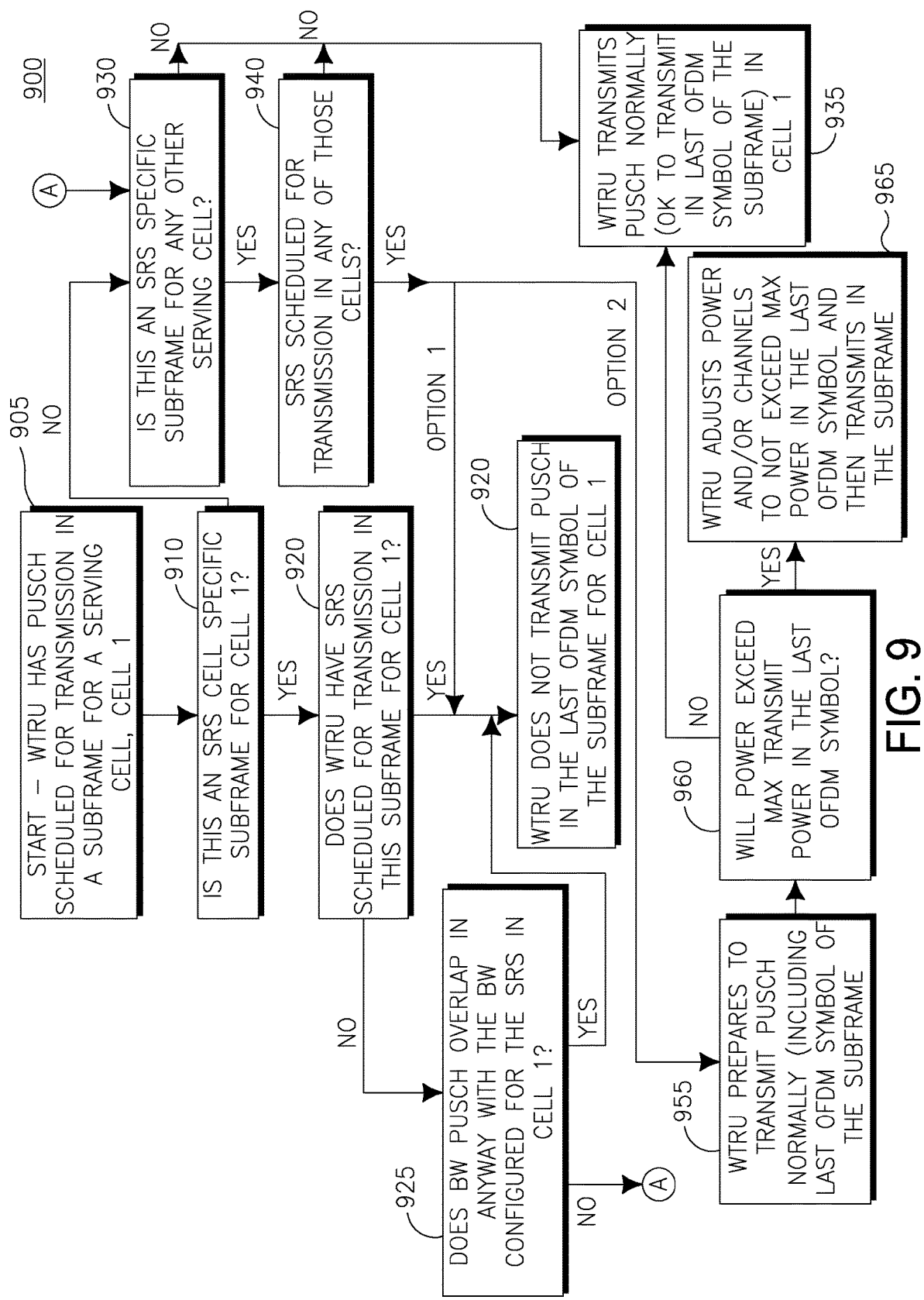
FIG. 9 is a flowchart of an example procedure to handle conflicts between SRS and physical uplink shared channel (PUSCH) transmissions.

FIG. 9 is a flowchart 900 illustrating some of the example methods or solutions described herein for handling potential conflicts between PUSCH and SRS transmissions. Initially, a WTRU may have a PUSCH transmission scheduled in a subframe for a serving cell, for example Cell 1 (905). The WTRU determines if the subframe is an SRS cell specific subframe for Cell 1 (910). If the subframe is an SRS cell specific subframe, then WTRU determines if SRS transmission is scheduled in this subframe for Cell 1 (915). If SRS and PUSCH are scheduled for transmission in the same subframe for Cell 1, then the WTRU does not transmit PUSCH in the last OFDM symbol of the subframe for Cell 1 (920). If an SRS transmission is not scheduled in the subframe for Cell 1, the WTRU then determines if the PUSCH BW overlaps, even partially, with the configured SRS BW for Cell 1 (925). If the PUSCH BW and SRS BW at least partially overlap, then the WTRU does not transmit PUSCH in the last OFDM symbol of the subframe for Cell 1 (920).

If the subframe is an SRS cell specific subframe for Cell 1 but an SRS transmission is not scheduled in the subframe and there is no overlap between the PUSCH BW and the SRS BW, or the subframe is not an SRS cell specific subframe for Cell 1, then the WTRU determines if the subframe is a SRS cell specific subframe for any other serving cell (930). If the subframe is not an SRS cell specific subframe for Cell 1 or any other serving cell, then the WTRU may transmit the PUSCH normally in Cell 1 (935). That is, the PUSCH transmission may occur in the last OFDM symbol for the subframe.

If the subframe is an SRS cell specific subframe for another serving cell, the WTRU then determines if an SRS transmission is scheduled in any of those serving cells (940). If an SRS transmission is not scheduled in any of those serving cells, then the WTRU may transmit the PUSCH normally in Cell 1 (935). If an SRS transmission is scheduled for another serving cell, then the WTRU may have two alternative approaches. In a first option (945), the WTRU may not transmit PUSCH in the last OFDM symbol of the subframe for Cell 1 (920). In a second option (950), the WTRU may prepare to transmit PUSCH normally including in the last OFDM symbol of the subframe (955). The WTRU may then determine whether the power needed to transmit will exceed the maximum transmit power in the last OFDM symbol (960). If the power level will not exceed the maximum power, then the WTRU may transmit the PUSCH normally in Cell 1 (935). That is, the PUSCH transmission may occur in the last OFDM symbol for the subframe. If the power level required will exceed the maximum transmit power in the last OFDM symbol, then the WTRU may adjust power levels and/or the channels to fall below the maximum transmit power in the last OFDM symbol and then transmit in the subframe (965).

Described herein are methods for handling SRS(s) and PUCCH transmissions. In these methods, two cells are used for illustration purposes, Cell1 and Cell2, where Cell1 and Cell2 may each be any one of the serving cells (primary or secondary); the solutions may be applied to any number of cells.

In a first case, when the WTRU transmits PUCCH on the primary cell, (for example Cell 1), in a serving cell specific SRS subframe of that same cell, and the WTRU is also scheduled to transmit SRS for Cell 1, (e.g., primary cell), in that subframe, one or more of the following rules may be used.

In accordance with a first rule, the LTE R8 rules may be applied with respect to transmission, priority, shortened PUCCH format 1/1a/1b, PUCCH format 2/2a/2b, and a shortened PUCCH format 3 may be added. For example, if PUCCH format 2/2a/2b transmission takes place in the same subframe, the WTRU may drop SRS, (that is, PUCCH format 2/2a/2b has priority over SRS). Also, if PUCCH transmission, (with format 1/1a/1b or format 3), carrying acknowledgement/negative acknowledgement (ACK/NACK) and/or positive scheduling request (SR) occurs in the same subframe and if the parameter ackNackSRS-SimultaneousTransmission is FALSE, the WTRU may drop SRS. Otherwise, (i.e., ackNackSRS-Simultaneous Transmission="TRUE"), the WTRU may transmit SRS and PUCCH with the shortened format where with the shortened format, the last OFDM symbol of the subframe, (which corresponds to the SRS location) may be punctured for the PUCCH transmission.

In accordance with a second rule, the WTRU may simultaneously transmit SRS and PUCCH format 3 using a shortened format for PUCCH format 3 when simultaneous ACK/NACK and SRS are allowed. The use of the shortened format for PUCCH format 3, however, may be limited to a small number of ACK/NACK bits, for example, up to N bits, (e.g., N=4) such that it may not be usable in some cases. For example, if the number of ACK/NACK bits to be transmitted is smaller than or equal to N, and if the parameter ackNack-SRS-SimultaneousTransmission is TRUE, (in a serving cell specific subframe), the WTRU may transmit ACK/NACK (and SR) using the shortened PUCCH format. However, if the number of ACK/NACK bits to be transmitted is greater than N or the parameter ackNackSRS-Simultaneous Transmission is FALSE, then the WTRU may drop SRS and transmit the PUCCH with normal format 3 in the subframe. Alternatively, the WTRU may not transmit SRS whenever SRS and PUCCH format 3 transmissions occur in the same subframe. In this case the normal PUCCH format 3 would be used.

In accordance with a third rule, the WTRU may be allowed to transmit PUCCH, (with normal PUCCH format, i.e., without the shortened format), and SRS in the last symbol of that subframe, and the potential maximum power issues may be handled using, for example, the scaling rules described herein.

For a second case, when the WTRU may transmit PUCCH on a serving cell, e.g., the primary cell, (for example Cell 1), in a non-SRS cell specific subframe, (i.e., not a serving cell specific SRS subframe of the same cell) and the WTRU may also be scheduled to transmit SRS for another serving cell, (for example Cell 2), in that subframe, one or more of the following rules may be used. In accordance with a first rule, the WTRU may not transmit PUCCH in last OFDM symbol on Cell 1, (i.e., using the shortened PUCCH format, for example, for PUCCH format 1/1a/1b and PUCCH format 3) to avoid a potential transmit power issue. In accordance with a second rule, the WTRU may prepare to transmit PUCCH in Cell 1 and addresses the maximum power issue in the last OFDM symbol if it occurs using, for example, the scaling rules described herein.

In accordance with a third rule, the WTRU may prepare to transmit PUCCH in Cell 1 and if there are any maximum power issues in the last symbol, (for example, Ppucch+ Psrs>Pmax), the WTRU may not transmit PUCCH in the last symbol of the subframe on Cell 1, (for example using the shortened PUCCH format). In this case, the base station may need to determine what the WTRU did by, for example, using blind detection.

For a third case, when the WTRU may transmit PUCCH on a serving cell, e.g., the primary cell, (for example Cell 1), in a serving cell specific SRS subframe of that same cell, but the WTRU does not transmit SRS for that serving cell, e.g., primary cell (Cell 1) in that subframe, then the following rule may be used. In accordance with the rule, the WTRU may transmit the PUCCH without any constraint, (except for maximum CC (Cell) power limit).

For a fourth case, when the WTRU may transmit PUCCH on a serving cell, e.g., the primary cell, (for example Cell 1), in a non-SRS cell specific subframe, (i.e., not a serving cell specific SRS subframe of the same cell), and the same subframe is a serving cell specific SRS subframe of another serving cell, (for example Cell 2), but the WTRU does not transmit SRS on that cell (on Cell 2) in the subframe for this WTRU, there is no maximum power issue in this case due to combined PUCCH and SRS and the WTRU may transmit PUCCH normally.

For a fifth case, when the WTRU transmits PUCCH on a serving cell, e.g., the primary cell, (for example Cell 1), in a serving cell specific SRS subframe of that same cell, but the WTRU does not transmit SRS for that serving cell (Cell 1) in that subframe, while the same subframe is a serving cell specific SRS subframe of another serving cell, (for example Cell 2), where this WTRU transmits SRS on Cell 2, one or more of the following rules may be used. In accordance with a first rule, the WTRU may not transmit PUCCH in last OFDM symbol on Cell 1, (i.e., using the shortened PUCCH format, for example, for PUCCH format 1/1a/1b and PUCCH format 3) to avoid a potential transmit power issue.

In accordance with a second rule, the WTRU may prepare to transmit PUCCH in Cell 1 and addresses the maximum power issue in the last OFDM symbol if it occurs using, for example, the scaling rules described herein. In accordance with a third rule, the WTRU may prepare to transmit PUCCH in Cell 1 and if there are any maximum power issues in the last symbol, (for example, Ppucch (on Cell1)+ Psrs (on Cell2)>Pmax), the WTRU may not transmit PUCCH in the last symbol of the subframe on Cell 1, (e.g., using the shortened PUCCH format, for example, for PUCCH format 1/1a/1b and PUCCH format 3).

Figure 10:
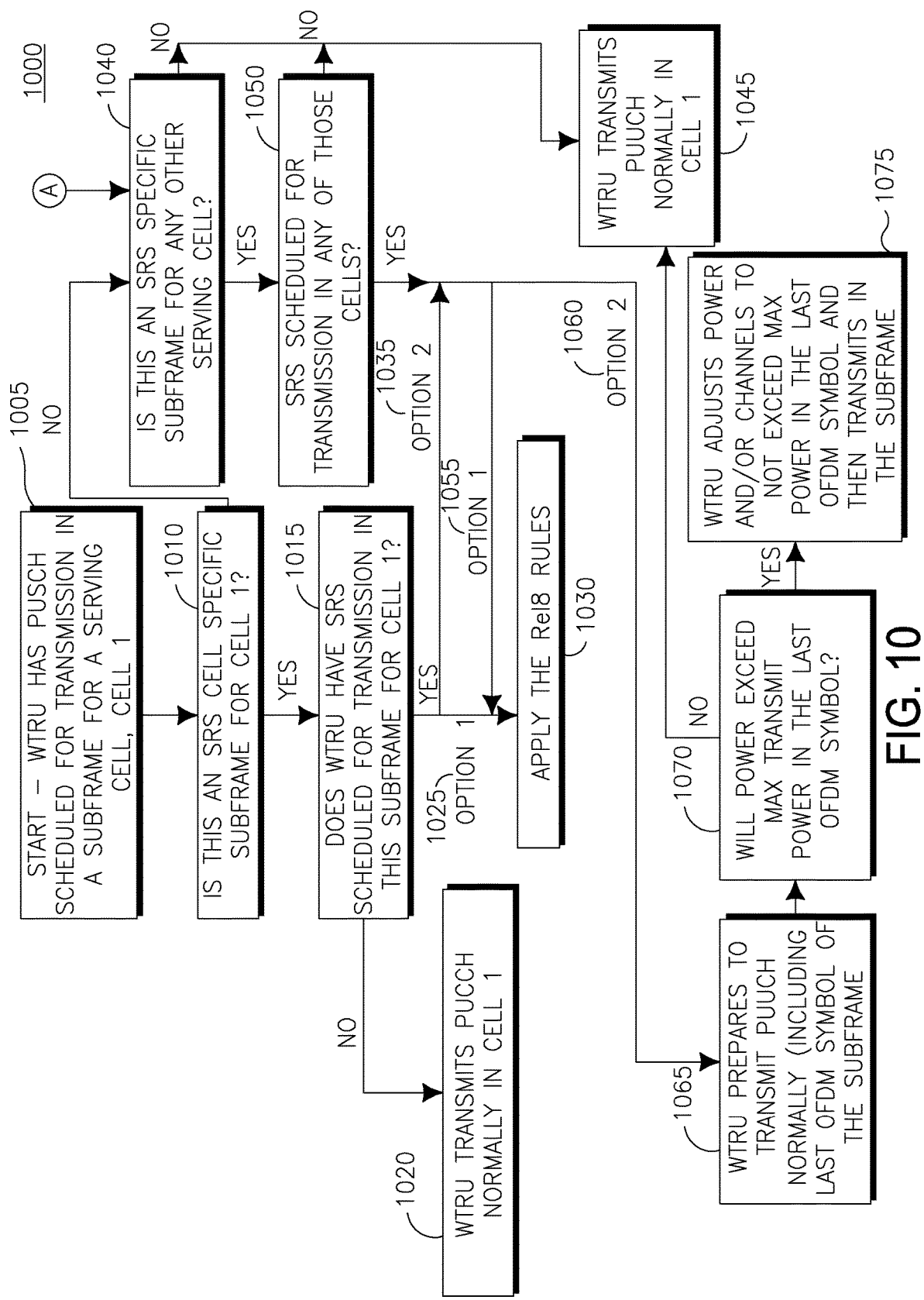
FIG. 10 is a flowchart of an example procedure to handle conflicts between SRS and physical uplink control channel (PUCCH) transmissions.

FIG. 10 is a flowchart 1000 illustrating some of the example methods or solutions described herein for handling potential conflicts between PUCCH and SRS transmissions. Initially, a WTRU may have a PUCCH transmission scheduled in a subframe for a serving cell, for example Cell 1 (1005). The WTRU determines if the subframe is an SRS cell specific subframe for Cell 1 (1010). If the subframe is an SRS cell specific subframe, then WTRU determines if SRS transmission is scheduled in this subframe for Cell 1 (1015). If an SRS transmission is not scheduled in the subframe for Cell 1, then the WTRU may transmit the PUCCH in Cell 1 (1020).

If SRS and PUCCH are scheduled for transmission in the same subframe for Cell 1, then the WTRU may have two options. In a first option (1025), the WTRU may apply the LTE R8 rules for transmission of SRS and PUCCH (1030). In a second option (1035), the WTRU may perform power level checks before any transmission as detailed herein below.

If the subframe is not an SRS cell specific subframe for Cell 1, then the WTRU determines if the subframe is a SRS cell specific subframe for any other serving cell (1040). If the subframe is not an SRS cell specific subframe for Cell 1 or any other serving cell, then the WTRU may transmit the PUCCH normally in Cell 1 (1045).

If the subframe is an SRS cell specific subframe for another serving cell, the WTRU then determines if an SRS transmission is scheduled in any of those serving cells (1050). If an SRS transmission is not scheduled in any of the other serving cells, then the WTRU may transmit the PUCCH normally in Cell 1 (1045). If an SRS transmission is scheduled then the WTRU may have two options. In a first option (1055), the WTRU may apply the LTE R8 rules for PUCCH and SRS (1030). In a second option (1060), (which is also the second option 1035 from above), the WTRU may prepare to transmit PUCCH including in the last OFDM symbol of the subframe (1065). The WTRU may then determine whether the power needed to transmit will exceed the maximum transmit power in the last OFDM symbol (1070). If the power level will not exceed the maximum transmit power, then the WTRU may transmit the PUCCH normally in Cell 1 (1045). If the power level required will exceed the maximum transmit power in the last OFDM symbol, then the WTRU may adjust power levels and/or the channels to fall below the maximum transmit power in the last OFDM symbol and then transmit in the subframe (1075).

Described herein are methods for handling SRS(s) and PUSCH(s)/PUCCH transmissions. If the WTRU is configured to simultaneously transmit PUSCH and PUCCH on either the same cell, (e.g., primary cell) or different cells, (i.e., PUCCH on one cell, e.g., the primary cell and PUSCH on another cell, e.g., a secondary cell), one or a combination of the method(s)/solution(s)/alternative(s)/rule(s) described above may be applied for each channel. The following are further illustrative cases and rules for SRS and simultaneous PUSCH and PUCCH transmission. In these examples, two cells are used for illustration purposes, Cell1 and Cell2, where Cell1 and Cell2 may each be any one of the serving cells (primary or secondary); the solutions may be applied to any number of cells.

In a first case, when the WTRU may transmit both PUSCH and PUCCH on a serving cell, e.g., the primary cell, (for example Cell 1), in a serving cell specific SRS subframe of that same cell and the WTRU may also be scheduled to transmit SRS for the primary (Cell 1) in that subframe, then the following rule may be used. In accordance with the rule, the LTE R8 rule may be applied for the PUSCH transmission. For PUCCH transmission, one or a combination of the rules described above may be applied.

For a second case, when the WTRU may transmit PUCCH on a serving cell, e.g., the primary cell, (for example Cell 1), in a serving cell specific SRS subframe of that same cell, and the WTRU may be scheduled to transmit PUSCH on another serving cell, (for example Cell 2), in the same subframe, (but it is not a serving cell specific SRS subframe of the same cell, Cell 2), and the WTRU may also be scheduled to transmit SRS for (Cell 1) in the same subframe, then one or a combination of the rules described above maybe applied for both PUCCH and PUSCH.

For a third case, when the WTRU may transmit PUCCH on a serving cell, e.g., the primary cell, (for example Cell 1), in a non-SRS cell specific subframe, (i.e., not a serving cell specific SRS subframe of the same cell), and the WTRU may be scheduled to transmit PUSCH on another serving cell, (for example Cell 2), in that subframe, (which is a serving cell specific SRS subframe of the same cell, Cell 2), and the WTRU may also be scheduled to transmit SRS for Cell 2 in the same subframe, then one or a combination of the rules described above may be applied for both PUCCH and PUSCH.

For a fourth case, when the WTRU may transmit both PUSCH and PUCCH on a serving cell, e.g., the primary cell, (for example Cell 1), in a serving cell specific SRS subframe of that same cell while the same subframe is a serving cell specific SRS subframe of another serving cell, (for example Cell 2), where this WTRU may transmit SRS on Cell 2, then one or a combination of the rules described above may be applied for both PUCCH and PUSCH.

In the existing power scaling rules, if simultaneous transmission of all channels scheduled to be transmitted in a subframe would exceed the WTRU maximum configured transmit power, $P_{CMAX}$, alternatively the power of the WTRU power class, Ppowerclass, the WTRU may scale the channel powers before transmission to ensure the maximum is not exceed. The scaling rules are defined such that higher priority channels may not be scaled while lower priority channels may be scaled. The current priorities dictate a priority order from highest to lowest as PUCCH, PUSCH with (i.e., containing) UCI, PUSCH without UCI. The current rules do not address simultaneous transmission of any of these channels with SRS.

Described herein are methods for handling maximum power scaling in case of simultaneous SRS(s) and SRS(s) transmitted simultaneously with PUSCH(s) and/or PUCCH(s) transmissions. In any of the above cases where, in a given cell in a given subframe in which SRS may be transmitted in the last OFDM symbol, and in the same cell and/or another cell, another signal or channel, i.e., PUCCH, PUSCH, or SRS, may be simultaneously transmitted in that same subframe in the last OFDM symbol, the sum of the nominal transmit powers of all such channels or signals may exceed the configured maximum transmit power of the WTRU, alternatively the power of the WTRU's power class, Ppowerclass. Preventing the WTRU from transmitting above the configured maximum transmit power, alternatively Ppowerclass, may be achieved by one or a combination of the following methods.

In one example method, the power scaling rules may be applied separately for all but the last OFDM symbol, and then again for the last OFDM symbol. For the last OFDM symbol, one or more of the following additional or modified rules may be used. In accordance with a rule, the SRS may be specified to have its own unique priority amongst the priorities of the other channel types, for example as shown in Table 14, and then the existing priority-based power scaling may be applied with modification to include SRS. Periodic SRS and aperiodic SRS may have different priorities.

TABLE 14

SRS > PUCCH > PUSCH with UCI > PUSCH without UCI, or
PUCCH > SRS > PUSCH with UCI > PUSCH without UCI, or
PUCCH > PUSCH with UCI > SRS > PUSCH without UCI, or
PUCCH > PUSCH with UCI > PUSCH without UCI > SRS In accordance with another rule, SRS may be specified to have the same priority as one of the other channel types, i.e., PUCCH, PUSCH with UCI, or PUSCH without UCI, and they may be scaled equally with the same-priority channel type.

In accordance with another rule, if there are multiple SRS transmissions across different cells in the same subframe, then the SRSs may be power scaled equally. Alternatively, when periodic SRS(s) and aperiodic SRS(s) are transmitted in the same subframe, (and maximum power may be exceeded in the last OFDM symbol of the subframe), then some (or all) of periodic SRS(s) may be dropped.

In another method, the power scaling rules may be used separately for all but the last OFDM symbol, and then again for the last OFDM symbol, to determine possibly two different weights for each channel or signal, but the smaller of the two weights may be applied for the entire subframe.

In another method, power scaling may be applied for the entire subframe just once, assuming that the power levels of all channels or signals that are present at any time in the subframe are present for the entire subframe.

In another method, if maximum power may be exceeded in the last OFDM symbol in a subframe in which SRS is to be transmitted by a WTRU and there are other channel types to be transmitted in that symbol by the WTRU besides SRS, the WTRU may drop, (i.e., does not transmit), SRS in that subframe.

In another method, if maximum power may be exceeded in the last OFDM symbol in a subframe in which periodic SRS is to be transmitted by a WTRU and there are other channel types to be transmitted in that symbol by the WTRU besides SRS, the WTRU may drop, (i.e., does not transmit), SRS in that subframe.

In general, a method for performing uplink sounding reference signals (SRS) transmissions in a multiple antenna wireless transmit/receive unit (WTRU), comprises receiving a WTRU-specific configuration of WTRU-specific SRS subframes for performing SRS transmissions, receiving a trigger from a base station to transmit SRS for a predetermined number of antennas, and transmitting the SRS for the predetermined number of antennas in predetermined WTRU-specific subframes. The method further comprises transmitting SRS in each of a predetermined duration of WTRU-specific SRS subframes starting a predetermined number of WTRU-specific SRS subframes after a triggering subframe. The predetermined number may be 4. The trigger may be a multi-bit indicator that provides predetermined SRS transmission parameters to the WTRU. A predetermined duration may be received in the WTRU-specific configuration.

The method further comprises receiving a cyclic shift reference value and determining a cyclic shift for an antenna based on at least the cyclic shift reference value. The cyclic shift determined for each antenna provides a maximum distance between cyclic shifts for the antennas transmitting SRS in a same WTRU-specific subframe. Alternatively, the cyclic shift determined for each antenna provides even distribution between cyclic shifts for the antennas transmitting SRS in a same WTRU-specific subframe.

The method may use at least one of cyclic shift multiplexing or different transmission comb assignments may be used for transmission from multiple antennas in the predetermined WTRU-specific subframe. SRS transmissions from multiple antennas in the predetermined WTRU-specific subframe may be done in parallel. The predetermined number of antennas may be less than the number of antennas available on the WTRU. In the method, the WTRU-specific SRS subframes may be different for periodic SRS transmission and aperiodic SRS transmission.

The method may further comprise determining resource allocation overlap between physical uplink shared channel (PUSCH) and the WTRU-specific configuration for SRS and foregoing PUSCH transmission in a last symbol of a subframe on a condition of a partial overlap.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use by a wireless transmit/receive unit (WTRU) for transmitting a sound reference signal (SRS), the method comprising:
   receiving SRS configuration information, wherein the SRS configuration information comprises an indication to perform transmission comb hopping, and wherein the SRS configuration information indicates hopping pattern information for the transmission comb hopping;
   transmitting a first SRS transmission in a first set of resources, wherein the first SRS transmission is transmitted in a first symbol of a slot; and
   transmitting a second SRS transmission in a second set of resources based on the indication to perform transmission comb hopping and the hopping pattern information for the transmission comb hopping, wherein the second SRS transmission is transmitted in a second symbol of the slot.

2. The method of claim 1, wherein the SRS configuration information is received via radio resource control (RRC) signaling.

3. The method of claim 1, wherein the transmission comb hopping is a pattern of subcarriers.

4. The method of claim 1, wherein the indication to perform transmission comb hopping and the hopping pattern information for the transmission comb hopping are for a particular SRS resource.

5. The method of claim 1, wherein the first SRS transmission is transmitted in a symbol of a slot and wherein the second SRS transmission is transmitted in a second symbol of a different slot.

6. The method of claim 1, further comprising:
   receiving trigger information for transmitting an SRS transmission, wherein the trigger information is a downlink control information.

7. The method of claim 1, wherein the SRS configuration information comprises an indication to perform cyclic shift hopping, and wherein the SRS configuration information indicates hopping pattern information for the cyclic shift hopping.

8. The method of claim 7, further comprising:
   transmitting the second SRS transmission based on the hopping pattern information for the cyclic shift hopping.

9. The method of claim 8, wherein a cyclic shift is determined for an antenna port.

10. A wireless transmit/receive unit (WTRU) comprising:
    a receiver; and
    a transmitter, wherein:
    the receiver is configured to receive SRS configuration information, wherein the SRS configuration information comprises an indication to perform transmission comb hopping, and wherein the SRS configuration information indicates hopping pattern information for the transmission comb hopping;
    the transmitter is configured to transmit a first SRS transmission in a first set of resources, wherein the first SRS transmission is transmitted in a first symbol of a slot; and
    the transmitter is further configured to transmit a second SRS transmission in a second set of resources based on the indication to perform transmission comb hopping and the hopping pattern information for the transmission comb hopping, wherein the second SRS transmission is transmitted in a second symbol of the slot.

11. The WTRU of claim 10, wherein the SRS configuration information is received via radio resource control (RRC) signaling.

12. The WTRU of claim 10, wherein the transmission comb hopping is a pattern of subcarriers.

13. The WTRU of claim 10, wherein the indication to perform transmission comb hopping and the hopping pattern information for the transmission comb hopping are for a particular SRS resource.

14. The WTRU of claim 10, wherein the first SRS transmission is transmitted in a symbol of a slot and wherein the second SRS transmission is transmitted in a second symbol of a different slot.

15. The WTRU of claim 10, wherein the receiver is further configured to receive trigger information to transmit an SRS transmission, wherein the trigger information is a downlink control information.

16. The WTRU of claim 10, wherein the SRS configuration information comprises an indication to perform cyclic shift hopping, and wherein the SRS configuration information indicates hopping pattern information for the cyclic shift hopping.

17. The WTRU of claim 16, wherein the transmitter is further configured to transmit the second SRS transmission based on the hopping pattern information for the cyclic shift hopping.

18. The WTRU of claim 17, wherein a cyclic shift is determined for an antenna port.

* * * * *